US012563470B2

(12) United States Patent
Pan et al.

(10) Patent No.: US 12,563,470 B2
(45) Date of Patent: Feb. 24, 2026

(54) METHOD AND APPARATUS PERFORMED BY NODE IN WIRELESS COMMUNICATION SYSTEM

(71) Applicant: Samsung Electronics Co., Ltd., Suwon-si (KR)

(72) Inventors: Yu Pan, Beijing (CN); Weiwei Wang, Beijing (CN); Fuyuan Li, Beijing (CN); Lixiang Xu, Beijing (CN); Hong Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 323 days.

(21) Appl. No.: 18/327,467

(22) Filed: Jun. 1, 2023

(65) Prior Publication Data

US 2023/0397082 A1 Dec. 7, 2023

(30) Foreign Application Priority Data

Jun. 1, 2022 (CN) .......................... 202210623066.0
Apr. 4, 2023 (CN) .......................... 202310356998.8

(51) Int. Cl.
*H04W 36/36* (2009.01)
*H04W 36/00* (2009.01)

(52) U.S. Cl.
CPC ..... *H04W 36/362* (2023.05); *H04W 36/0061* (2013.01)

(58) Field of Classification Search
CPC ........... H04W 36/362; H04W 36/0061; H04W 36/00835; H04W 36/185; H04W 36/06;

H04W 36/34; H04W 36/322; H04W 88/085; H04W 36/0069; H04W 36/0072; H04W 36/08; H04W 36/00695; H04W 76/27; H04W 76/34
See application file for complete search history.

(56) References Cited

U.S. PATENT DOCUMENTS

2020/0137601 A1* 4/2020 Siomina .................. H04W 4/70
2021/0352543 A1 11/2021 Purkayastha et al.
(Continued)

FOREIGN PATENT DOCUMENTS

CN 114430578 A 5/2022
WO 2021/234633 A1 11/2021
WO 2021236003 A2 11/2021

OTHER PUBLICATIONS

Qualcomm Incorporated (Moderator), Summary of Offline Discussion on MRDC2_CPAC, R3-223789, 3GPP TSG-RAN WG3 Meeting #116-e, E-meeting, May 20, 2022.
(Continued)

*Primary Examiner* — Mohamed A Kamara
(74) *Attorney, Agent, or Firm* — Jefferson IP Law, LLP

(57) ABSTRACT

The disclosure relates to a 5G or 6G communication system for supporting a higher data transmission rate. The disclosure provides a method performed by a first node in a wireless communication system is provided. The method includes transmitting, by the first node, a first message to a second node, the first message including first indication information, and transmitting, by the first node, a second message to a third node, the second message including second indication information, wherein the third node is a candidate node configured by network for the second node.

18 Claims, 25 Drawing Sheets

(56) References Cited

U.S. PATENT DOCUMENTS

| | | | | |
|---|---|---|---|---|
| 2022/0386195 A1* | 12/2022 | Ishii | .................. | H04W 36/0069 |
| 2023/0379789 A1* | 11/2023 | Da Silva | ......... | H04W 36/00698 |
| 2024/0056917 A1* | 2/2024 | Kim | ................... | H04W 36/362 |
| 2024/0080742 A1* | 3/2024 | Liu | .................. | H04W 36/0061 |

OTHER PUBLICATIONS

International Search Report and Written Opinion dated Sep. 18, 2023, issued in International Patent Application No. PCT/KR2023/007482.

* cited by examiner

| $C_7$ | $C_6$ | $C_5$ | $C_4$ | $C_3$ | $C_2$ | $C_1$ | $C_0$ | Oct 1 |
| $C_{15}$ | $C_{14}$ | $C_{13}$ | $C_{12}$ | $C_{11}$ | $C_{10}$ | $C_9$ | $C_8$ | Oct 2 |

FIG.2E

METHOD AND APPARATUS PERFORMED BY NODE IN WIRELESS COMMUNICATION SYSTEM

CROSS-REFERENCE TO RELATED APPLICATION(S)

This application is based on and claims priority under 35 U.S.C. § 119(a) of a Chinese patent application number 202210623066.0, filed on Jun. 1, 2022, in the Chinese Intellectual Property Office, and of a Chinese patent application number 202310356998.8, filed on Apr. 4, 2023, in the Chinese Intellectual Property Office, the disclosure of each of which is incorporated by reference herein in its entirety.

BACKGROUND

1. Field

The disclosure relates to a field of wireless communication. More particularly, the disclosure relates to a node in a wireless communication system and a method performed thereby.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a node in a wireless communication system and a method performed thereby.

Additional aspects will be set forth in part in the description which follows and, in part, will be apparent from the description, or may be learned by practice of the presented embodiments.

In accordance with an aspect of the disclosure, a method performed by a first node in a wireless communication system is provided. The method includes transmitting, by the first node, a first message to a second node, the first message including first indication information, and transmitting, by the first node, a second message to a third node, the second message including second indication information, wherein the third node is a candidate node configured by network for the second node.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features and advantages of certain embodiments of the disclosure will be more apparent from the following description taken in conjunction with the accompanying drawings, in which:

FIG. 2E is a structural schematic diagram of a medium access control (MAC) control element (CE) for a candidate cell state indication according to an embodiment of the disclosure;

Throughout the drawings, it should be noted that like reference numbers are used to depict the same or similar elements, features, and structures.

DETAILED DESCRIPTION

Figure 1:
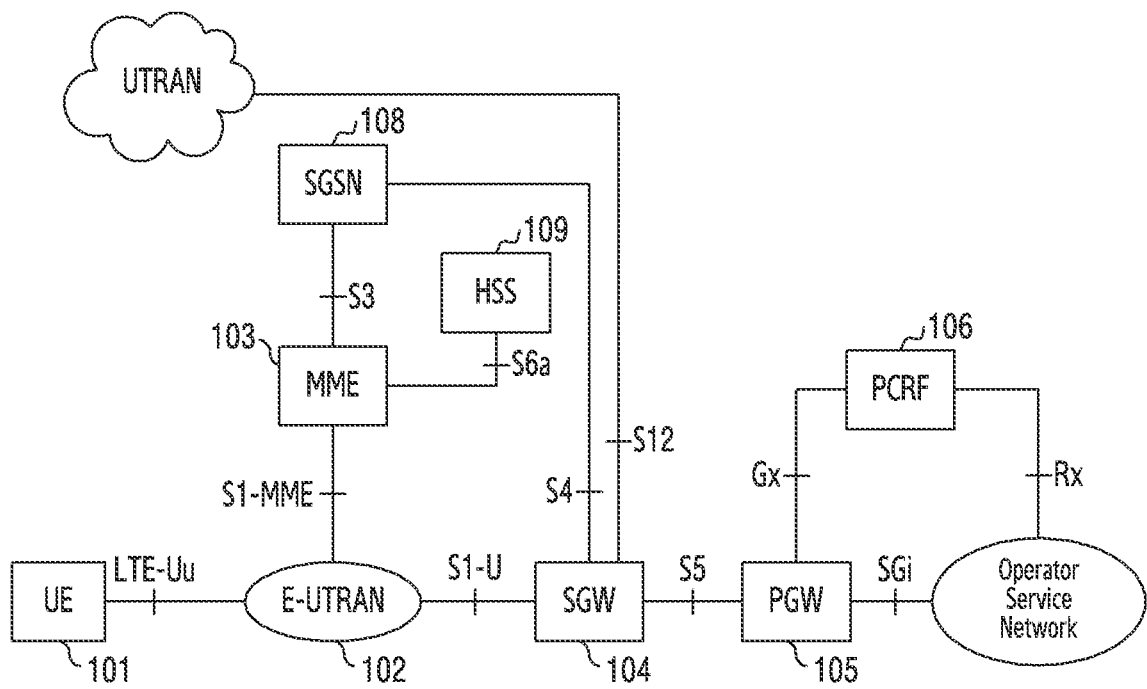
FIG. 1 is a system architecture diagram of system architecture evolution (SAE) according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Those of ordinary skill in the art will recognize that various changes and modifications of the various embodiments described herein may be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. It should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. For example, reference to "a component surface" includes reference to one or more of such surfaces.

Before undertaking the DETAILED DESCRIPTION below, it may be advantageous to set forth definitions of certain words and phrases used throughout this patent document. For example, the term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The term "include" or "may include" refers to the existence of a corresponding disclosed function, operation or component which may be used in various embodiments of the disclosure and does not limit the existence of one or more additional functions, operations, or components. Additionally, the terms such as "include" and/or "have" may be construed to denote a certain characteristic, number, step, operation, constituent element, component or a combination thereof, but may not be construed to exclude the possibility of existence of one or more other characteristics, numbers, steps, operations, constituent elements, components or combinations thereof.

For example, the term "or" used in various embodiments of the disclosure includes any or all of combinations of listed words. For example, the expression "A or B" may include A, may include B, or may include both A and B.

In another example, terms used herein to describe the embodiments of the disclosure are not intended to limit and/or define the scope of the disclosure. For example, unless otherwise defined, the technical terms or scientific terms used in the disclosure shall have the ordinary meaning understood by those with ordinary skills in the art to which the disclosure belongs.

It should be understood that "first", "second" and similar words used in the disclosure do not express any order, quantity or importance, but are only used to distinguish different components.

As used herein, any reference to "an example" or "example", "an implementation" or "implementation", "an embodiment" or "embodiment" means that particular elements, features, structures or characteristics described in connection with the embodiment is included in at least one embodiment. For example, the phrases "in one embodiment" or "in one example" appearing in different places in the specification do not necessarily refer to the same embodiment.

In addition, as used herein, "a portion of" something means "at least some of" the thing, and as such may mean less than all of, or all of, the thing. As such, "a portion of" a thing includes the entire thing as a special case, i.e., the entire thing is an example of a portion of the thing.

Further, as used herein, the term "set" means one or more. Accordingly, a set of items may be a single item or a collection of two or more items.

Additionally, in this disclosure, to determine whether a specific condition is satisfied or fulfilled, expressions, such as "greater than" or "less than" are used by way of example and expressions, such as "greater than or equal to" or "less than or equal to" are also applicable and not excluded. For example, a condition defined with "greater than or equal to" may be replaced with "greater than" (or vice-versa), a condition defined with "less than or equal to" may be replaced by "less than" (or vice-versa), etc.

For example, it will be further understood that similar words such as the term "include" or "comprise" mean that elements or objects appearing before the word encompass the listed elements or objects appearing after the word and their equivalents, but other elements or objects are not excluded. Similar words such as "connect" or "connected" are not limited to physical or mechanical connection, but can include electrical connection, whether direct or indirect. "Upper", "lower", "left" and "right" are only used to express a relative positional relationship, and when an absolute position of the described object changes, the relative positional relationship may change accordingly.

Further, unless defined differently, all terms used herein, which include technical terminologies or scientific terminologies, have the same meaning as that understood by a person skilled in the art to which the disclosure belongs. Such terms as those defined in a generally used dictionary are to be interpreted to have the meanings equal to the contextual meanings in the relevant field of art, and are not to be interpreted to have ideal or excessively formal meanings unless clearly defined in the disclosure.

In addition, when describing the embodiments of the disclosure, description related to technical contents well-known in the art but not directly related to the disclosure may be omitted. Such omission of unnecessary description is intended to prevent confusion of the main idea of the disclosure.

Advantages and features of the disclosure and implementations thereof will be apparent by referring to the following embodiments in detail in conjunction with the accompanying drawings. The disclosure is not limited to the embodiments set forth below, but may be implemented in various forms. The following embodiments are provided only to fully disclose the disclosure and inform those skilled in the art of the scope of the disclosure, and the disclosure is only defined by the scope of the appended claims. Throughout the specification, the same or similar reference numerals refer to the same or similar elements.

It should be understood that each block of flowchart illustrations and combinations of blocks in the flowchart illustrations may be implemented by computer program instructions. These computer program instructions may be provided to a processor of a general-purpose computer, a special-purpose computer or other programmable data processing apparatus to produce a machine, such that the instructions executed via the processor of the computer or other programmable data processing apparatus create means for implementing the functions specified in one or more flowchart blocks. For example, these computer program instructions may also be stored in a computer-usable or computer-readable memory, which may instruct a computer or other programmable data processing apparatus to work in a specific way, so that the instructions stored in the computer-usable or computer-readable memory produce an article of manufacture, which includes instruction means that implement the functions specified in one or more flowchart blocks. Computer program instructions may also be loaded on a computer or other programmable data processing apparatus to cause a series of operations to be performed on the computer or other programmable apparatus to produce a computer-implemented process, so that the instructions executed on the computer or other programmable apparatus provide operations for implementing the functions specified in one or more flowchart blocks.

Each block of the flowchart may represent a module, segment or portion of code, which includes one or more executable instructions for implementing specified logical function(s). It should also be noted that in some alternative implementations, functions shown in the blocks may occur out of order. For example, depending on the functions involved, two blocks shown in succession may actually be performed substantially at the same time, or the blocks may be performed in a reverse order.

Those skilled in the art will understand that the principles of the disclosure can be implemented in any suitably arranged wireless communication system. In an example, although the following detailed description of the embodiments of the disclosure will be directed to LTE and/or 5G communication systems, those skilled in the art will understand that the main points of the disclosure may also be applied to other communication systems with similar technical backgrounds and channel formats with slight modifications without departing from the scope of the disclosure. The technical schemes of the embodiments of the application can be applied to various communication systems, and for example, the communication systems may include global systems for mobile communications (GSM), code division multiple access (CDMA) systems, wideband code division multiple access (WCDMA) systems, general packet radio service (GPRS) systems, long term evolution (LTE) systems, LTE frequency division duplex (FDD) systems, LTE time division duplex (TDD) systems, universal mobile telecommunications system (UMTS), worldwide interoperability for microwave access (WiMAX) communication systems, 5th generation (5G) systems or new radio (NR) systems, etc. In another example, the technical schemes of the embodiments of the application may be applied to future-oriented communication technologies. In addition, the technical schemes of the embodiments of the application can be applied to future-oriented communication technologies.

In order to meet an increasing demand for wireless data communication services since a deployment of 4G communication system, efforts have been made to develop an improved 5G or pre-5G communication system. The 5G or pre-5G communication system is also referred to as "beyond 4G network" or "post LTE system".

Wireless communication is one of the most successful innovations in modern history. Recently, a number of subscribers of wireless communication services has exceeded 5 billion, and it continues growing rapidly. As such, with the increasing popularity of smart phones and other mobile data devices (such as tablet computers, notebook computers, netbooks, e-book readers and machine-type devices) in consumers and enterprises, a demand for wireless data services is growing rapidly. In order to meet rapid growth of mobile data services and support new applications and deployments, it is very important to improve efficiency and coverage of wireless interfaces.

The disclosure presents a method for adding new nodes in a scenario of multi-connectivity and a device thereof.

In R18, the network would provide the UE with long-term valid configuration information for Conditional PSCell Change (CPC)/Conditional Handover (CHO), and pre-configure more CGs (cell groups) for the UE, so as to reduce delay for cell change and signaling overhead for reconfiguration. An increase in a number of pre-configured CGs will cause problems to power consumption, network processing overhead and efficient utilization of resources for the UE.

The disclosure proposes: according to pre-configured CG information in conjunction with a location of a UE or a load state of a candidate cell, the network dynamically indicates the information of the candidate cell list that the UE actually needs to monitor when UE is performing CPC/CHO monitoring; dynamically indicates whether resources reserved by respective candidate cells for the UE come into effect; and determines and indicates whether it is needed to perform data forwarding to a node where the candidate cell is located. Processing overhead for UE and network is reduced, energy for UE is saved, and efficient utilization of resources is improved.

In an embodiment, a method of indicating a cell state comprises the control information delivery among network nodes and between a node and a UE, for dynamically indicating the information of cells on which UE needs to perform CPC/CHO monitoring, for dynamically indicating the information of resources reserved by candidate cells becoming valid/invalid, and for dynamically indicating the information of nodes for data forwarding.

According to another embodiment of the disclosure, there is provided a method performed by a first node in a wireless communication system, includes: transmitting, by the first node, a first message to a second node, the first message including first indication information; and transmitting, by the first node, a second message to a third node, the second message including second indication information, wherein the third node is a candidate node configured by network for the second node.

In an embodiment, there is provided the step of transmitting the second message to the third node by the first node includes: transmitting, by the first node, the second message to the third node, after the third node is added to a set or list of candidate nodes.

In an embodiment, the step of transmitting the second message to the third node by the first node includes: transmitting, by the first node, the second message to the third node, after the second node is switched to the third node; or transmitting, by the first node, the second message to the third node, after the first node receives a reconfiguration complete message transmitted by the second node.

In an embodiment, the first indication information is used to indicate that Conditional PSCell Addition or Change (CPAC) configuration keeps valid for the second node, and the second indication information is used to indicate that CPAC keeps valid for the third node; or wherein the first indication information is used to indicate that Conditional Handover (CHO) configuration keeps valid for the second node, and the second indication information is used to indicate that CHO keeps valid for the third node.

The first node decides whether to transmit the first indication information and the second indication information, or the first node transmits the first indication information and the second indication information after receiving an indication transmitted by a fourth node, or the first node receives the first indication information and the second indication information transmitted by a fourth node, and then transmits the first indication information and the second indication information to the second node and the third node respectively.

According to an embodiment, there is provided transmitting, by the first node, candidate cell information associated with the set of candidate nodes to at least one of the second node and the third node, after all candidate nodes are added to the set or list of candidate nodes; or transmitting, by the first node, the candidate cell information associated with the set of candidate nodes to at least one of the second node and the third node, after the second node is switched to the third node; or transmitting, by the first node, the candidate cell information associated with the set of candidate nodes to at least one of the second node and the third node, after receiving a reconfiguration complete message transmitted by the second node.

At least one of the following steps occur: transmitting, by the first node, third indication information to the second node, the third indication information used to indicate at least one candidate cell state of a third node; and transmitting, by the first node, fourth indication information to the third node, the fourth indication information used to indicate the candidate cell state of the third node.

In an embodiment, the first node transmits the third indication information and the fourth indication information according to the candidate cell state of the third node determined by the first node, or the first node transmits the third indication information and the fourth indication information according to the candidate cell state of the third node obtained from the fourth node.

In an embodiment, the first node transmits the third indication information to the second node either through a MAC CE or through an radio resource control (RRC) message, wherein if a MAC CE manner is applied, when the first node is a source node or a master node with a Centralized Unit (CU)/Distributed Unit (DU) split structure, the third indication information is transmitted to the second node by a DU of the first node, wherein the MAC CE is determined by the DU of the first node according to the candidate cell state information of the third node obtained from the CU/Centralized Unit Control Plane (CU-CP) of the first node.

In an embodiment, the candidate cell state of the third node is determined based on one or more of: a distance between the second node and the third node, a distance between the second node and a cell of the third node, a load state of the third node, and a load state of the cell of the third node.

In an embodiment, after the first node transmits the second message to the third node, further comprising: receiving a response message for the second message from the third node, the response message including information of load state of the cell of the third node; or receiving information of the load state of the cell of the third node transmitted by the third node, the information of the load state of the cell of the third node is transmitted by the third node when a change in the load state of its cell occurs.

In an embodiment, the distance between the second node and the third node and the distance between the second node and the cell of the third node are determined at least based on a location of the second node; wherein the location of the second node is determined by the first node based on a measurement result received from the second node, or the location of the second node is determined by the fourth node based on a measurement result received from the second node and transmitted to the first node.

In an embodiment, the method further comprises: transmitting, by the first node, fifth indication information to the fourth node, wherein the fifth indication information is used to indicate whether the fourth node needs to perform data forwarding to the candidate node; and/or transmitting, by the first node, seventh indication information to a fifth node, the seventh indication information being used to indicate the fifth node to delete stored data, and/or used to indicate the fifth node to transmit eighth indication information to a sixth node, the eighth indication information being used to indicate the sixth node to delete stored data.

In an embodiment, the first node is a source node, or a Centralized Unit (CU) of the source node, or a Centralized Unit-Control Plane (CU-CP) of the source node, the second node is a User Equipment (UE), and the third node is a candidate target node; and/or the first node is a Master Node (MN), or a Centralized Unit (CU) of the master node, or a centralized Unit Control Plane (CU-CP) of the master node, the second node is a User Equipment (UE), the third node is a candidate Target Secondary Node (T-SN), and the fourth node is a Source Secondary Node (S-SN).

According to an embodiment of the disclosure, there is provided a method performed by a second node in a wireless communication system, the method comprising: receiving, by the second node, a first message from a first node, the first message including first indication information; keeping, by the second node according to the first indication information, Conditional PSCell Addition or Change (CPAC) mechanism or Conditional Handover (CHO) mechanism valid, after connecting to a candidate node configured by network for the second node.

According to an embodiment, the first indication information is used to indicate that the CPAC configuration keeps valid for the second node; or wherein the first indication information is used to indicate that the CHO configuration keeps valid for the second node.

According to an embodiment, the first indication information is decided by the first node and transmitted to the second node, or the first indication information is transmitted to the second node by the first node after receiving an indication transmitted by a fourth node, or the first indication information is transmitted to the second node by the first node after receiving the first indication information from a fourth node.

According to an embodiment, there is provided receiving, by the second node, candidate cells information associated with the set of candidate nodes from the first node, after all candidate nodes are added to the set or list of candidate nodes.

According to an embodiment, there is provided receiving, by the second node, third indication information from the first node, wherein the third indication information is used to indicate a candidate cell state of a third node.

Optionally, the third indication information is transmitted to the second node by the first node according to the candidate cell state of the third node determined by the first node, or the third indication information is transmitted to the second node by the first node according to the candidate cell state of the third node obtained from the fourth node.

According to an embodiment, the second node receives the third indication information from the first node either through a MAC CE or through an RRC message, wherein if a MAC CE manner is applied, when the first node is a source node or a master node with a Centralized Unit (CU)/ Distributed Unit (DU) split structure, the third indication information is received from a DU of the first node, wherein the MAC CE is determined by the DU of the first node according to the candidate cell state information of the third node obtained from the CU/Centralized Unit Control Plane (CU-CP) of the first node.

According to an embodiment, the candidate cell state of the third node is determined based on one or more of: a distance between the second node and the third node, a distance between the second node and a cell of the third node, a load state of the third node, and a load state of the cell of the third node.

Optionally, the distance between the second node and the third node and the distance between the second node and the cell of the third node are determined at least based on a location of the second node, wherein the location of the second node is determined by the first node based on a measurement result received from the second node, or the location of the second node is determined by the fourth node based on a measurement result received from the second node, and is transmitted to the first node.

The first node is a source node, the second node is a User Equipment (UE), and the third node is a candidate target node; and/or the first node is a Master Node (MN), the second node is a User Equipment (UE), the third node is a candidate Target Secondary Node (T-SN), and the fourth node is a Source Secondary Node (S-SN).

According to an aspect of the disclosure, there is provided a method performed by a third node in a wireless communication system, the method comprising: receiving, by the third node, a second message from a first node, the second message including second indication information; keeping, by the third node according to the second indication information, Conditional PSCell Addition or Change (CPAC) mechanism or Conditional Handover (CHO) mechanism valid, after a second node accesses the third node; wherein the third node is a candidate node configured by network for the second node.

According to still an embodiment, the step of receiving the second message from the first node by the third node comprises: receiving, by the third node, the second message from the first node, after the third node is added to the set or list of candidate nodes; or receiving, by the third node, the second message from the first node, after the second node is switched to the third node; or receiving, by the third node, the second message from the first node, after the first node receives a reconfiguration complete message transmitted by the second node.

According to an embodiment, the second indication information is used to indicate that CPAC keeps valid; or wherein the second indication information is used to indicate that the CHO keeps valid.

Optionally, the second indication information is decided by the first node to be transmitted to the third node, or the second indication information is transmitted to the third node by the first node after receiving an indication transmitted by the fourth node, or the second indication information is transmitted to the third node by the first node after receiving the second indication information from the fourth node.

In an embodiment, there is provided transmitting a response message for the second message to the first node, after the third node receives the second message from the first node, the response message including information of the load state of a cell of the third node; or transmitting the information of the load state of the cell of the third node to the first node, when the load state of the cell of the third node changes; or determining the information of the load state of the cell of the third node according to state information provided by a Distributed Unit (DU) and/or Centralized Unit (CU) User Plane (CU-UP), if the third node is a candidate target secondary node with a CU/DU split structure.

In an embodiment, there is provided receiving, by the third node, candidate cell information associated with the set of candidate nodes from the first node, after all candidate nodes are added to the set or list of candidate nodes; or receiving, by the third node, candidate cell information associated with the set of candidate nodes from the first node, after the second node is switched to the third node; or receiving, by the third node, candidate cell information associated with the set of candidate nodes from the first node, after the first node receives a reconfiguration complete message transmitted by the second node.

In an embodiment, there is provided receiving fourth indication information from the first node, wherein the fourth indication information is used to indicate the candidate cell state of the third node.

In an embodiment, the fourth indication information is transmitted to the third node by the first node according to the candidate cell state of the third node determined by the first node, or the fourth indication information is transmitted to the third node by the first node according to the candidate cell state of the third node obtained from the fourth node.

In an embodiment, there is provided the candidate cell state of the third node is determined based on one or more of: a distance between the second node and the third node, a distance between the second node and a cell of the third node, a load state of the third node, and a load state of the cell of the third node.

The distance between the second node and the third node and the distance between the second node and the cell of the third node are determined at least based on a location of the second node; wherein the location of the second node is determined by the first node based on a measurement result received from the second node, or the location of the second node is determined by the fourth node based on a measurement result received from the second node, and is transmitted to the first node.

In an embodiment, the first node is a source node, the second node is a User Equipment (UE), and the third node is a candidate target node, or a Centralized Unit (CU) of the candidate target node, or a Centralized Unit Control Plane (CU-CP) of the candidate target node; and/or the first node is a Master Node (MN), the second node is a User Equipment (UE), the third node is a candidate Target Secondary Node (T-SN), or a Centralized Unit (CU) or a Centralized Unit Control Plane (CU-CP) of the candidate target secondary node, and the fourth node is a Source Secondary Node (S-SN).

According to one embodiment of the disclosure, there is provided a method performed by a fourth node in a wireless communication system, the method comprising one of the following steps: determining, by the fourth node, to execute Conditional PSCell Addition or Change (CPAC); transmitting, by the fourth node, first indication information and/or second indication information to a first node; or transmitting, by the fourth node, a trigger indication to a first node for instructing the first node to transmit first indication information to a second node and/or to transmit second indication information to a third node, wherein the third node is a candidate node configured by network for the second node.

In an embodiment, when the third node is taken as a candidate secondary node by the fourth node, the fourth node transmits the first indication information and the second indication information to the first node or transmits the trigger indication to the first node.

In an embodiment, the first indication information is used to indicate that the Conditional PSCell Addition or Change (CPAC) configuration keeps valid, and the second indication information is used to indicate that the CPAC keeps valid.

In an embodiment, there is provided transmitting candidate cell state information of the third node to the first node, wherein the third node is a candidate node configured by network for the second node.

In an embodiment, the candidate cell state of the third node is determined based on one or more of: a distance between the second node and the third node, a distance between the second node and a cell of the third node, a load state of the third node, and a load state of the cell of the third node.

The distance between the second node and the third node and the distance between the second node and the cell of the third node are determined at least based on a location of the second node; wherein the location of the second node is determined by the first node based on a measurement result received from the second node, or the location of the second node is determined by the fourth node based on a measurement result received from the second node, and is transmitted to the first node.

In an embodiment, there is provided receiving fifth indication information from the first node, wherein the fifth indication information is used to indicate whether the fourth node needs to perform data forwarding to the candidate node, wherein if the fourth node is a source secondary node with a Centralized Unit (CU)/Distributed Unit (DU) split structure, a CU/CU Control Plane (CU-CP) of the fourth node transmits the fifth indication information received from the first node to the CU User Plane (CU-UP) of the fourth node, and wherein the fifth indication information is determined based on a candidate cell state of the third node.

In an embodiment, the first node is a Master Node (MN), the second node is a User Equipment (UE), the third node is a candidate Target Secondary Node (T-SN), and the fourth node is a Source Secondary Node (S-SN), or a Centralized Unit (CU) of the source secondary node, or a Centralized Unit Control Plane (CU-CP) of the source secondary node.

In an embodiment, the second message is a secondary node addition request message or a handover request message.

In an embodiment, the second message is a handover success acknowledgement message; or the second message is a secondary node modification request message.

In an embodiment, the candidate cell state of the third node include an activated state and a deactivated state.

The fifth indication information is determined based on the candidate cell state of the third node.

According to another embodiment of the disclosure, there is provided a node in a wireless network, comprising: a transceiver configured to receive and transmit signals and data; and a processor configured to control the transceiver to perform various methods described in the disclosure.

FIGS. 1, 2A to 2I, and 3 to 17 discussed below and various embodiments for describing the principles of the disclosure in this patent document are only for illustration and should not be interpreted as limiting the scope of the disclosure in any way. Those skilled in the art will understand that the principles of the disclosure may be implemented in any suitably arranged system or device.

FIG. 1 is a system architecture 100 of system architecture evolution (SAE) according to an embodiment of the disclosure.

In an embodiment, user equipment (UE) 101 is a terminal device for receiving data. An evolved universal terrestrial radio access network (E-UTRAN) 102 is a radio access network, which includes a macro base station (eNodeB/NodeB) that provides UE with interfaces to access the radio network. A mobility management entity (MME) 103 is responsible for managing mobility context, session context and security information of the UE. A service gateway (SGW) 104 mainly provides functions of user plane, and the MME 103 and the SGW 104 may be in the same physical entity. In an embodiment, a packet data network gateway (PGW) 105 is responsible for functions of charging, lawful interception, etc., and may be in the same physical entity as the SGW 104. A policy and charging rules function entity (PCRF) 106 provides quality of service (QoS) policies and charging criteria. A general packet radio service support node (SGSN) 108 is a network node device that provides routing for data transmission in a universal mobile telecommunications system (UMTS). In an embodiment, a home subscriber server (HSS) 109 is a home subsystem of the UE, and is responsible for protecting user information including a current location of the user equipment, an address of a serving node, user security information, and packet data context of the user equipment, etc.

Figure 2A:
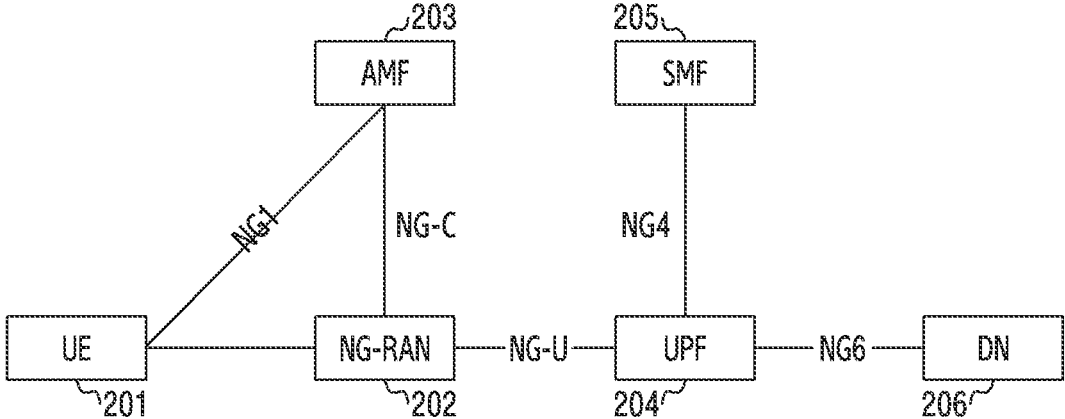
FIG. 2A is a system architecture diagram according to an embodiment of the disclosure.

FIG. 2A is a system architecture 200 according to an embodiment of the disclosure. Other embodiments of the system architecture 200 may be used without departing from the scope of the disclosure.

In an embodiment, user equipment (UE) 201 is a terminal device for receiving data. A next generation radio access network (NG-RAN) 202 is a radio access network, which includes a base station (a generation NodeB (gNB) or an evolved NB (eNB) connected to the 5G core network fifth generation core (5GC), and the eNB connected to the 5GC is also referred to as ng-gNB) that provides UE with interfaces to access the radio network. An access control and mobility management function entity (AMF) 203 is responsible for managing mobility context and security information of the UE. A user plane function entity (UPF) 204 mainly provides functions of user plane. In an embodiment, a session management function entity (SMF) 205 is responsible for session management. A data network (DN) 206 includes, for example, services of operators, access of Internet and services of third parties. However, the components of the UE 201 and the base station are not limited thereto. In an example, the UE 201 and the base station may include more or fewer components than those described above. In addition, the UE 201 corresponds to the UE of the FIG. 17, and the base station corresponds to the base station of the FIG. 16.

An embodiment of the disclosure are further described below with reference to the accompanying drawings.

For example, the text and drawings are provided as examples only to help understand the disclosure. They should not be interpreted as limiting the scope of the disclosure in any way. Although certain embodiments and examples have been provided, based on the disclosure herein, it will be apparent to those skilled in the art that changes may be made to the illustrated embodiments and examples without departing from the scope of the disclosure.

In an embodiment, a detailed illustration of steps irrelevant to the disclosure is omitted in this application. In the following description, descriptions are made taking a 5G system as an example, taking a CU as an example in terms of the centralized unit of the access network, and taking a DU as an example in terms of the distributed unit. The method is also used for corresponding entities in other systems.

In an embodiment, a node may be a complete base station (e.g., gNB, or eNB, or en-gNB, or ng-eNB), a base station including a centralized unit and a distributed unit, or a base station including a Centralized Unit Control Plane (CU-CP), a Centralized Unit User Plane (CU-UP) and a distributed unit.

In an embodiment, names for messages are merely examples, and messages may be named after other names. Sequence numbers for messages do not represent an execution order for messages, but only names for messages.

In an embodiment, in network version Release 15 of New Radio access (NR), Dual Connectivity is introduced to improve network performance and single-user traffic, and the performance of this technology is constantly improved in researches of R16 and R17.

In dual connectivity, a UE would be connected with two nodes, one of which acting as a Master Node (MN) and the other of which acting as a Secondary Node (SN). Wherein, a group of cells serving UE in the MN is referred to as a Master Cell Group (MCG), and a group of cells serving UE in the SN is referred to as an Secondary Cell Group (SCG). The primary cell of the MCG is referred to as a PCell, and the primary cell (SpCell) of the SCG is referred to as a PSCell. An SN ID is considered as an identity of SN, and an SCG ID is considered as a cell group identity (CG ID) of the SCG.

In an embodiment, CHO (Conditional Handover) technology is introduced in R16 to improve reliability and robustness for PCell change. The MN may pre-configure candidate MCG primary cells (PCells) and CHO execution conditions for the UE. When at least one candidate PCell fulfills the execution conditions, after the UE completes a PCell change process, both the network and the UE may stop using CHO mechanism, and configuration information for the candidate PCells and CHO execution conditions may also be released. If a CHO process is to be started, the network needs to transmit a configuration message to the UE, re-initiate the CHO mechanism, and provide information indicating candidate PCells, CHO execution conditions etc.

In an embodiment, based on CHO technology, CPC (Conditional PSCell change) technology is introduced in dual connectivity mode to improve reliability and robustness for primary SCG Cell (PSCell) change. Wherein, a primary secondary cell may also be referred to as either a primary secondary cell group cell, or a SCG primary cell. The MN or SN may pre-configure candidate PSCells and CPC execution conditions for the UE. When at least one candidate PSCell fulfills the execution conditions, the UE starts to execute CPC, and selects one of the candidate PSCells as the target PSCell. After the UE accesses the target PSCell and completes the PSCell change process, then similarly to CHO, both the network and the UE will stop the CPC mechanism and release the configuration information for the candidate PSCells and the CPC execution conditions. If a CPC process is to be started, the network needs to transmit a configuration message to the UE, re-initiate the CPC mechanism, and provide information such as candidate PSCells, CPC execution conditions, etc.

In an embodiment, in order to avoid processing overhead and delay for PCell/PSCell change caused by signaling for which configuration messages needs to be transmitted many times, especially a reduction of coverage area of cell after FR2 is introduced, which may lead to a rise in a frequency for PCell/PSCell change, resulting in a sharp increase in network signaling overhead, it is considered in R18 that CHO and CPC mechanisms continue to keep valid after the PSCell change, without requiring the network to reconfigure or re-initiate CHO or CPC. Currently, as to how to make the CHO and CPC mechanisms continue to keep valid, there are no clear methodologies. If the number of pre-configured candidate cells/CGs is small, the network will need to update information of a list of candidate cells/CGs through reconfiguration, which also increases the signaling overhead. If more candidate cells/CGs are configured, the UE needs to monitor all candidate cells, thus increasing measurements by the UE and requiring the UE to consume more energy.

The disclosure proposes a method of indicating Conditional PSCell Addition or Change (CPAC) keeping valid, so as to reduce unnecessary information interactions and configuration processes between a master base station and a candidate target secondary base station or between a source base station and a candidate target base station, while keeping CPC mechanism valid. In an embodiment, the disclosure also proposes a method of managing candidate cell (candidate CG) states. The serving node, based on location of the UE and load of the candidate cell, changes state of the candidate cell, transmits indication information to the UE, the candidate node and the serving secondary node respectively, dynamically indicates information of the list of the candidate cells/CGs that the UE actually needs to monitor when UE is performing CPC/CHO monitoring, dynamically indicates whether resources reserved by respective candidate cells for the UE come into effect, and indicates whether it is needed to perform data forwarding to the node where the candidate cell is located. While avoiding unnecessary reconfiguration processing and RRC signaling overhead by network equipment and UE, processing overhead for UE and network is reduced, energy for UE is saved, and efficient utilization of resources is improved. Consequently, the above-mentioned problems are solved.

In an embodiment, in CHO, a source base station may also be referred to as a source node. A candidate target base station may also be referred to as a candidate target node. After a handover is successful, a new base station selected by the UE may also be referred to as a target base station or a target node.

In an embodiment, in a CPAC process in dual connectivity, a master base station (MN) may also be referred to as a master node. A secondary base station (SN) may also be referred to as a secondary node. A source secondary base station (S-SN) may also be referred to as a source secondary node. A candidate target secondary base station (T-SN) may also be referred to as a candidate target secondary node, a candidate secondary base station or a candidate secondary node. After the secondary base station is updated, a new secondary base station is also referred to as a target secondary base station or a target secondary node.

The term "candidate node" may refer to a node that may be connected to UE, and may encompass "candidate target node" and/or "candidate target secondary node" and/or "target node" and/or "target secondary node and/or source secondary node", or it is included that, in this document, "candidate node" may be used interchangeably with "candidate base station", "candidate target node" may be used interchangeably with "candidate target base station", "candidate target secondary node" may be used interchangeably with "candidate target secondary base station", "target node" may be used interchangeably with "target base station", "target secondary node" may be used interchangeably with "target secondary base station", and "source secondary node" may be used interchangeably with "source secondary base station".

The disclosure describes:
a method of indicating CPAC keeping valid;
a method of indicating CHO keeping valid;
a method of managing candidate cell states; and
a method of indicating candidate cell state to UE.

Proposed is a method of indicating CPAC keeping valid. The mechanism for CPAC described in the disclosure is applicable for Conditional PSCell Addition (CPA) and/or Conditional PSCell Change (CPC). The following description is given by taking CPC as an example, but this mechanism is also applicable for Conditional PSCell Addition (CPA).

According to a current CPC mechanism, when the network configures a set of candidate PSCells and corresponding measurement configurations for the UE, the UE begins to evaluate whether CPC execution conditions are fulfilled. In an embodiment, when a candidate PSCell fulfills the CPC execution conditions, the UE selects one cell that fulfills the conditions, as the target PSCell, and transmits to the master base station an RRC reconfiguration complete message that contains a reconfiguration complete message transmitted to the target secondary node and information of a PSCell selected by the UE. The master base station may perform the following steps.

In an embodiment, the master base station transmits a secondary node reconfiguration complete message to a secondary base station to which the UE's target PSCell belongs, informs the secondary base station that UE regards this secondary base station as the target secondary base station, and selects one of candidate cells as the target PSCell. After the UE successfully accesses to the target secondary node (or target PSCell), if other candidate PSCells are configured for the UE on this secondary base station, the target secondary base station will release resources allocated to the UE by such cells for CPAC and delete UE context information.

In an embodiment, the master base station transmits a secondary node release message to other candidate secondary base stations, instructing the candidate secondary base stations to release the resources allocated to the UE for CPAC and to delete the UE context information.

In an embodiment, the master base station transmits a UE context information release message to the source secondary base station, to release information of resources allocated to the UE and the UE context information.

After accessing to the target PSCell, the UE will release information related to CPAC configuration and no longer evaluate the CPAC execution conditions.

If the master base station or target secondary base station wants the UE to update the PSCell by CPC, it will be needed to re-initiate a CPC process, re-perform a process for adding a candidate secondary base station for the UE, and instruct the candidate secondary base station to perform selection of candidate PSCells and resource configuration for CPC and to provide a data forwarding address, and the master base station transmits a reconfiguration message to the UE, to configure information related to CPC for the UE, including candidate PSCells information, CPC configuration information and execution conditions.

In an embodiment, if the coverage of the candidate target cell is small, the UE will frequently hand over between cells, and in order to avoid frequent SN addition processes and SN release processes between the MN and the candidate secondary base station, as well as frequent selections of candidate PSCells and configurations of CPC for the UE, and configuration information transmission to the UE. In the disclosure, when the serving node (MN or SN) triggers a CPC process, the serving node applies a CPC keeping valid mechanism in which CPC keeping valid is indicated by transmitting indication information to the UE and the candidate target secondary base station. Consequently, when the UE is likely to be faced with frequent PSCell change, signaling interaction and processing overhead between nodes, caused by the application of the existing mechanisms, is avoided. In an embodiment, if the serving node wants to no longer keep CPC valid, then it performs according to the existing mechanism. If the serving node wants to keep CPC valid, it performs according to the flowchart in FIG. 2B.

Figure 2B:
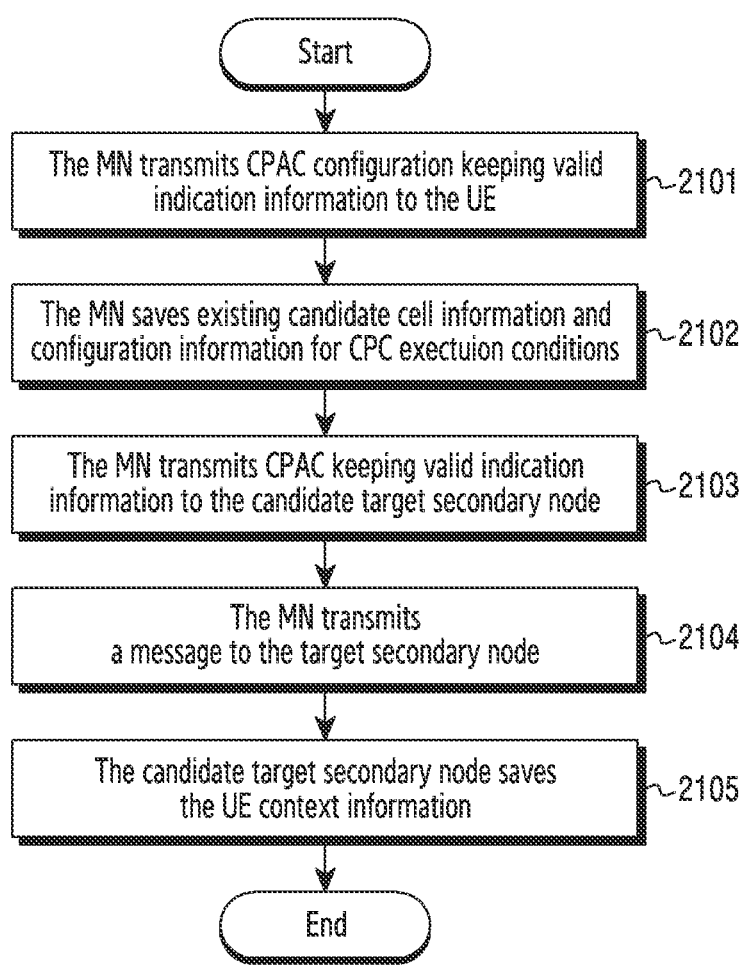
FIG. 2B is a flowchart of a method of indicating conditional PSCell addition or change (CPAC) keeping valid according to an embodiment of the disclosure.

FIG. 2B is a flowchart of a method of indicating CPAC keeping valid according to an embodiment of the disclosure.

Operation 2101: The MN transmits, for example, CPAC configuration keeping valid indication information to the UE. While performing CPC configuration, the MN transmits CPAC configuration keeping valid indication information to the UE, indicating to the UE that CPC mechanism keeps valid after the UE accesses the target PSCell. The UE may save original candidate PSCell information and information related to CPC configuration, and may continue to evaluate CPC execution conditions for candidate PSCells. The indication information may be transmitted to the UE by the MN through an RRCReconfiguration message, an RRCConnectionReconfiguration message, or another message. If CPC mechanism is triggered by the MN (MN initiated CPC), a mechanism for CPAC to keep valid may be triggered by the MN. If CPC mechanism is triggered by the SN (SN initiated CPC), a mechanism for CPAC to keep valid may be triggered by the SN, and candidate PSCells and CPC execution conditions are also generated by the SN. The SN may initiate a conditional SN change process, and transmit information regarding the CPAC keeping valid indication, candidate PSCells and the CPC execution conditions to the MN through an SN CHANGE REQUIRED or SGNB CHANGE REQUIRED message.

Operation 2102: The MN saves, for example, existing candidate cell information and configuration information for CPC execution conditions. When the UE discovers a candidate cell fulfilling the CPC conditions, it transmits to the MN a reconfiguration complete message containing an SN reconfiguration complete message and a target cell identity selected by the UE. The MN saves the existing candidate cell information and the configuration information for the CPC execution conditions. The MN may also decide whether it is needed to change the existing candidate PSCells or CPAC execution conditions according to measurement results reported by the UE, for example, whether it is needed to add a candidate PSCell or to delete an existing PSCell. Consequently, it is determined whether it is needed to delete a candidate secondary node, or to instruct the candidate secondary base station to release the UE context information.

Operation 2103: The MN transmits, for example, CPAC keeping valid indication information to the candidate target secondary node. During a process for adding a candidate target secondary node by the MN, a secondary node addition request message is transmitted. This message may contain CPAC keeping valid indication information to indicate to a candidate target secondary node, which, if selected by the UE as the target secondary node, that the original CPC mechanism continue to be valid, and that the secondary node may not need to re-initiate the CPC process. The secondary node addition request message may be an S-NODE ADDITION REQUEST message, an SGNB ADDITION REQUEST message, or another message. The CPAC keeping valid indication information may also be transmitted, in operation 2104, by the MN to the target secondary node after the UE determines the target secondary node.

In an embodiment, if the secondary node addition request message transmitted by the MN to the SN contains CPAC keeping valid indication information, after the MN adds all candidate target secondary nodes, it will transmit a secondary node modification request message, and transmit the existing candidate cells information and CPC execution conditions information to the candidate target secondary node. This message may be an S-NODE MODIFICATION REQUEST message, an SGNB MODIFICATION REQUEST message, or another message.

In operation 2104, the MN transmits, for example, a message to the target secondary node. When the MN receives SN reconfiguration complete message for a target secondary node transmitted by the UE, it forwards this message to the target secondary node, indicating that the UE has selected this node as the target secondary node, and transmits CPAC keeping valid indication information to the target secondary node, indicating to the target secondary node that the original CPC mechanism continues to be valid, and the target secondary node may not need to re-initiate the CPC process. At the same time, the existing candidate cell information and CPC execution condition information are transmitted to the target secondary node, and the target secondary node uses such information for supporting the SN initiated CPC process. The CPAC keeping valid indication information, as well as the existing candidate cell information and CPC execution condition information may be transmitted by the MN to the target secondary node through an S-NODE RECONFIGURATION COMPLETE message, a SENB RECONFIGURATION COMPLETE message, or another message. If, as described in operation 2103, when the MN selects the node as a candidate target secondary node, the CPAC keeping valid indication information has been transmitted to the candidate target secondary node by a message during the secondary node addition process, then in this step, it is not needed to transmit the CPAC keeping valid indication information.

Operation 2105: The candidate target secondary node saves, for example, the UE context information. If the existing candidate target node will continue to act as a candidate target node for the UE, after receiving the target secondary node SN reconfiguration complete message transmitted by the UE, and thus knowing that the UE has completed the selection of the target secondary node, the MN does not transmit a secondary node release message to other candidate secondary nodes, therefore, the other candidate target secondary nodes will continue to save the UE context information and the configuration information allocated to the UE for CPC. In an embodiment, if the MN or target secondary node selects the source secondary node as a new candidate target secondary node, the MN will not transmit a secondary node release request message or a UE context release message to the source secondary node, but transmit a secondary node modification request message to the source node, indicating that the source node provides candidate PSCells and CG configuration for the UE as a candidate target secondary node. The secondary node modification request message may be an S-NODE MODIFICATION REQUEST message, a SENB MODIFICATION REQUEST message, or another message.

Proposed is a method of indicating CHO keeping valid. According to current CHO mechanism, when the network configures a group of candidate cells PCells and corresponding measurement configuration for the UE, the UE begins to evaluate whether the CHO execution conditions are fulfilled. In an embodiment, when there are candidate cells fulfilling the CHO execution conditions, the UE selects one cell that fulfills the conditions, as the target PCell, and transmits an RRC reconfiguration complete message to the target base station.

In an embodiment, the target base station may transmit a handover success message to the source base station. Upon receiving this message, the source base station may transmit a handover cancellation message to the other candidate target base stations, and the other candidate target base stations may release resources allocated to the UE for CHO and delete UE context information.

After the UE accesses the target PCell, it will release information related to CHO configuration and no longer evaluate the CHO execution conditions.

In an embodiment, if the target base station wants UE to update the PCell by CHO, a CHO process will need to be re-initiated, and the target base station needs to perform a CHO handover preparation process for the UE with the candidate target base stations. The target base station selects candidate PCells for the UE, and transmits to the candidate target base station a handover request to a selected candidate PCell, and requests the candidate target base station to configure resources for CHO and provide a data forwarding address. In an embodiment, the target base station transmits a reconfiguration message to the UE to configure CHO related information for the UE, including candidate PCell information, CHO configuration information and execution conditions.

For example, if the coverage of the candidate target cell is small, the UE frequently hand over between cells, and in order to avoid frequent CHO handover preparation processes between the serving base station and the candidate target base station, selections of candidate PCells and configurations of CHO are performed, and configuration information transmission to the UE. In the disclosure, the network applies a CHO keeping valid mechanism in which CHO keeping valid is indicated by transmitting indication information to the UE and the candidate target base stations, thus avoiding unnecessary reconfiguration processing and RRC signaling overhead by network equipment and UE, while reducing processing overhead for UE and network. If the network wants to no longer keep CHO valid, then it performs according to the original mechanism. If the network wants to keep CHO valid, it performs according to the flowchart in FIG. 2C.

Figure 2C:
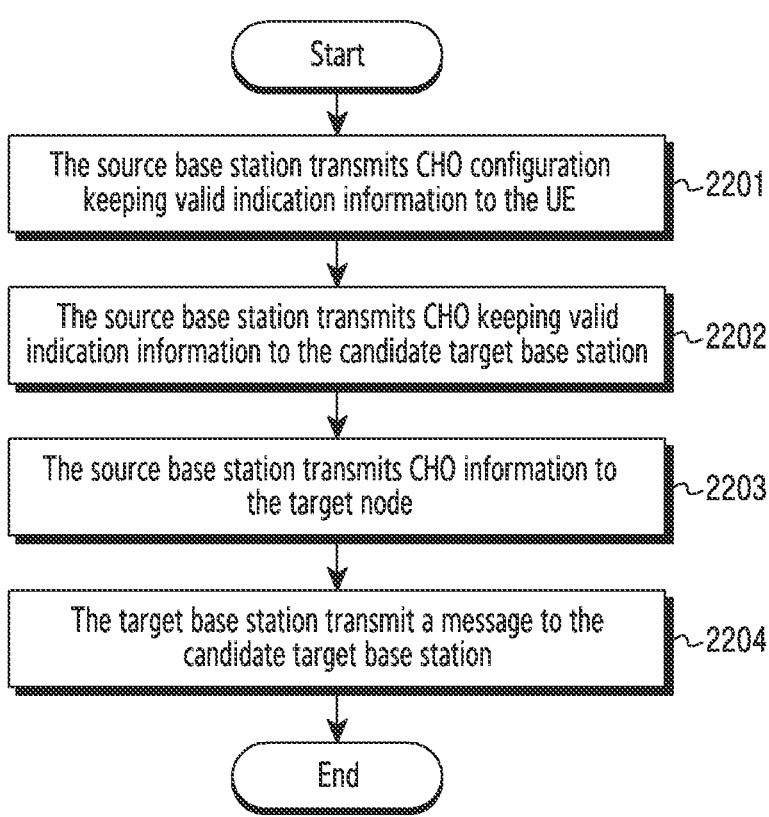
FIG. 2C is a flowchart of a method of indicating conditional handover (CHO) keeping valid according to an embodiment of the disclosure.

FIG. 2C is a flowchart of a method of indicating CHO keeping valid according to an embodiment of the disclosure.

Operation 2201: The source base station transmits, for example, CHO configuration keeping valid indication information to the UE. For example, when performing CHO configuration, the source base station transmits CHO configuration keeping valid indication information to the UE, indicating to the UE that the CHO mechanism keeps valid after accessing the target PCell. The UE may save original candidate PCells information and information related to CHO configuration, and may continue to evaluate CHO execution conditions for candidate PCells. The indication information may be transmitted to the UE by the source base station through an RRCReconfiguration message, an RRC-ConnectionReconfiguration message, or another message.

Operation 2202: The source base station transmits, for example, CHO keeping valid indication information to the candidate target base station. For example, when the source base station transmits a HANDOVER REQUEST message to the candidate target base station, and transmits CHO keeping valid indication information together, to indicate that when the UE selects this candidate target base station as the target base station, the CHO mechanism may continue to be valid, the target node may not need to re-initiate the CHO process. The CHO keeping valid indication information may also be transmitted, in operation 2203, to the target base station by the source base station after learning that the UE has handed over to the target base station.

In an example if a handover request message transmitted by the source base station to the candidate target base station contains CHO keeping valid indication information, after the source base station has completed handover preparation process with all candidate target base stations, it may transmit messages to respective candidate target base stations, indicating existing candidate cell list information, a UE identification information list and configuration information for CHO execution conditions, wherein the existing candidate cell list information includes candidate cell identification information. In an embodiment, the identification information list of UE contains identities of UEs in respective candidate cells, and an identity of UE may be a NG-RAN node UE XnAP ID allocated to the UE by the corresponding candidate cell or the source node, or a NG-RAN node UE XnAP ID allocated to the UE by the candidate target node to which the candidate cell belongs. The configuration information for CHO execution conditions is the configuration information for CHO execution conditions for each candidate cell.

Operation 2203: The source base station transmits, for example, CHO information to the target base station. When the CHO execution conditions are fulfilled, and the UE selects a new PCell and transmits a reconfiguration complete message to the target base station, then the target node indicates to the source base station a handover success message. When the source base station receives this message, if the CHO mechanism keeps valid, then the source base station will transmit existing candidate cell list information, a UE identification information list, and configuration information for CHO execution conditions and/or CHO keeping valid indication information to the target base station. In this regard, the existing candidate cell list information includes candidate cell identification information. In an embodiment, the identification information list of UE contains identities of UEs in respective candidate cells, and an identity of UE may be a NG-RAN node UE XnAP ID allocated to the UE by the corresponding candidate cell or the source node, or a NG-RAN node UE XnAP ID allocated to the UE by the candidate target node to which the candidate cell belongs. The configuration information for CHO execution conditions is configuration information for CHO execution conditions for each candidate cell. The target base station utilizes the above information transmitted by the source base station to establish a connection with the candidate target base station to which the candidate cell belongs, wherein the connection is used for UE-related message interaction, so as to ensure subsequent CHO execution for the UE. In an embodiment, the existing candidate cell list information, UE identification information list, configuration information for CHO execution conditions and/or CHO keeping valid indication information may be transmitted by the source base station to the target base station through a handover success acknowledgement message. The handover success acknowledgement message may be a HANDOVER SUCCESS ACKNOWLEDGEMENT message, or another message.

Operation 2204: The target base station transmits, for example, a message to the candidate target base station. When the CHO execution conditions are fulfilled, the UE selects a new PCell and transmits a reconfiguration complete message to the target base station, then the target base station transmits a message indicating to the candidate target base station that UE has completed CHO, and the PCell/serving node has been updated. The target base station may also establish a connection with the candidate target base station through this message, the connection is used for UE-related message interaction. In an embodiment, the message contains the Identification Information of the UE, which may be an identity allocated to the UE by the corresponding candidate cell or the source node, i.e., the UE XnAP ID of the source base station (NG-RAN node UE XnAP ID), or may be an identity allocated to the UE by the candidate target node to which the candidate cell belongs, i.e., the UE XnAP ID of the candidate target node (NG-RAN node UE XnAP ID). The message may be a HANDOVER REQUEST message, or another message.

In an embodiment, if the target base station regards the source base station as a candidate target base station of the UE, the target base station needs to transmit a message to the source base station for a handover preparation process for CHO, to request for candidate PCells from the source base station, and to request the source base station to allocate resources for CHO for the UE. When the target base station receives a PATH SWITCH REQUEST ACKNOWLEDGE message from the core network, there is no need to transmit a UE CONTEXT RELEASE request message to the source target.

The disclosure provides a method of managing candidate cell states.

In an embodiment, in a current CPAC/CHO mechanism, when the network configures a group of candidate cells and corresponding measurement configuration for the UE, the UE needs to measure the candidate cells, evaluate whether the CPAC/CHO execution conditions are fulfilled, and will not trigger CPAC/CHO execution to access a new serving cell (PSCell/PCell) until a candidate cell fulfills the execution conditions. In an embodiment, when CPAC/CHO is configured, the network selects a group of candidate cells and corresponding CG configuration information for the UE, and the candidate cell needs to reserve resources for the UE, to prepare for the UE to select and access this candidate cell. At the same time, in CPAC/CHO, in order to avoid data loss during a serving cell change, it is also supported that the data of the serving node should be forwarded in advance to the candidate target node. Therefore, with an increase in the number of configured candidate cells, an overhead for data forwarding between the serving node and the candidate node, a reduction in utilization rate of reserved resources in the candidate cells, and an energy consumption caused by an increase in quantity of UE measurement are resulted.

In an embodiment, due to the mobility of UE, especially due to small cell coverage in the area covered by FR2, CG changes easily occur. If the number of pre-configured CGs is small, the network may be needed to update the list information of CGs through reconfiguration, thus increasing signaling overhead. If more CGs are configured, the UE needs to evaluate all PCell/PSCells, thus increasing measurement of the UE and requiring more UE energy consumption.

Provided is a method of managing candidate cell states, wherein the states of candidate cells are set by category, by analyzing a possibility of UE accessing the cell and/or whether the cell is suitable for UE access. The basic idea of candidate cell state setting is as follows:

In an embodiment, the master base station or secondary base station or source base station may determine a distance between the UE and the candidate cell or the candidate base station according to geographic location information of the UE and a geographic location of the candidate cell or the candidate base station (candidate target secondary base station or the candidate target base station), so as to determine the possibility of UE accessing this cell. In an embodiment, if the distance is short, then the UE is more likely to access this cell, otherwise, the UE is less likely to access this cell.

In an embodiment, the master base station or secondary base station or source base station determines a possibility of UE entering this cell according to a load state of the candidate cell or the candidate base station. If the load of the candidate cell or the candidate base station is light, then the UE is suitable for accessing this cell, otherwise, the UE may not be able to access the cell, or the quality of service cannot be guaranteed after accessing this cell, so the UE will not access to this cell.

In an embodiment, the master base station or secondary base station or source base station determines the state of this candidate cell by considering the distance between the UE and the candidate cell or the candidate base station and/or the load state of the candidate cell or the candidate base station jointly. The state of the cell may be set to the activated state or the deactivated state. In an example, if the UE is likely to access this cell and/or this cell is not heavily loaded at present, then the state of this cell may be set to the activated state. If the UE is unlikely to access this cell and/or this cell is heavily loaded at present, then the state of this cell may be set to the deactivated state.

In an embodiment, for a candidate cell in a deactivated state, the UE is not needed to detect and evaluate a signal quality of a synchronization signal block (SSB) or a channel state information reference signal (CSI-RS) of the candidate cell, which reduces processing by UE, thus reducing power consumption for UE. The serving node is not needed to perform data forwarding to the candidate base station to which this candidate cell belongs either, therefore, the number of nodes to which data forwarding is needed is reduced, and thus data transmissions between nodes is decreased and transmission resources between nodes are saved. In an embodiment, The resources reserved for UE by this candidate cell may also be allocated to other users, so that the utilization efficiency of resources may be improved.

Figure 2D:
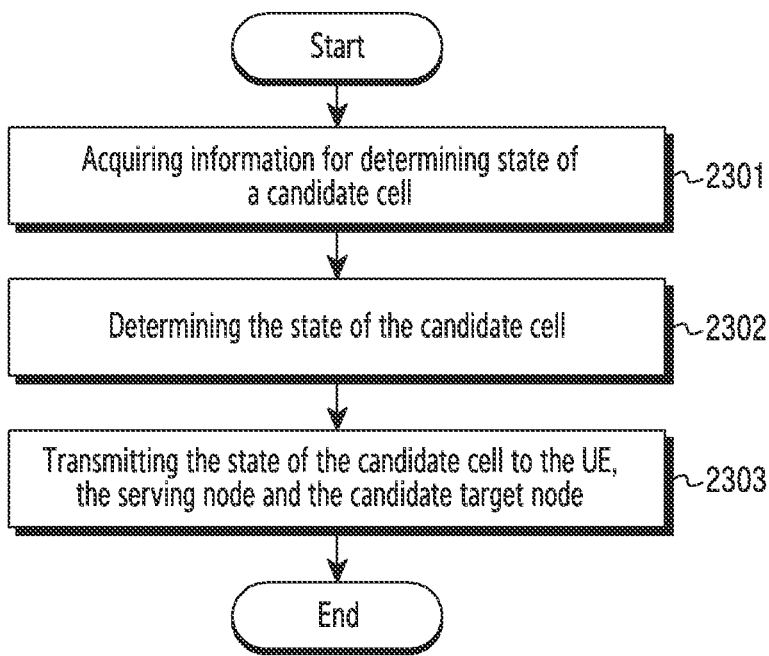
FIG. 2D is a flowchart of a method of managing candidate cell states according to an embodiment of the disclosure.

FIG. 2D is a flowchart of a method of managing candidate cell states according to an embodiment of the disclosure.

This method comprises three steps, and a flowchart of a method of managing cell states is given in FIG. 2D.

Operation 2301: The base station acquires, for example, information for determining the state of a candidate cell. The base station determines the state of candidate cell by acquiring the information for determining the location of the UE, geographic location information of the candidate cell or the candidate base station, and information of the load state of the candidate cell or the candidate base station. The base station may be a master base station or a secondary base station or a source base station. The disclosure focuses on a method of acquiring the information used to determine the location information of UE, and a specific method of how to determine a location of UE with information does not belong to the content of the disclosure.

For example, the base station may acquire the geographical location information of the candidate cell or the candidate base station from OAM or by other method.

There are several methods for the base station to acquire the information for determining the location of the UE:

Method 1: The UE transmits the measurement result to the master base station/source base station, and the base station determines the location information of the UE according to the measurement result of the UE. The UE transmits the measurement result to the master base station/source base station by transmitting a MeasurementReport message or another message.

Method 2: In a dual connectivity structure, the secondary base station may also determine the location information of the UE.

In an embodiment, if the network configures SRB3 for the UE, the UE may directly transmit the measurement result to the secondary base station, and the secondary base station may determine the location information of the UE according to the measurement result of the UE. The secondary base station may also provide the determined UE location information to the master base station. The UE transmits the measurement result to the secondary base station by transmitting a MeasurementReport message or another message.

In an embodiment, if the network does not configure SRB3 for the UE, the measurement result transmitted to the secondary base station may be transmitted by the UE to the master base station, and then forwarded by the master base station to the secondary base station, and then the secondary base station determines the location information of the UE according to the measurement result of the UE. The secondary base station provides the determined UE location information to the master base station. The specific method for determining the UE location information does not belong to the content of the disclosure. The UE transmits the measurement report to the secondary base station to the master base station through an ULInformationTransfer-MRDC message or another message. The master base station transmits the measurement report from the UE to the secondary base station through an RRC TRANSFER message, to the secondary base station in the form of container.

A method for the base station to acquire the information of the load state of the candidate cell or the candidate base station:

In an embodiment, during a process for adding a candidate target secondary base station by the master base station, the candidate target secondary base station or the candidate target base station may transmit information of the load state of the candidate cell and/or candidate target secondary base station to the master base station. During a handover preparation process by the source base station with the candidate target base station, the information of the load state of the candidate cell and/or candidate target base station is transmitted to the source base station.

In an embodiment, when the master base station completes the candidate target secondary base station addition, or the source base station and the target base station complete the handover preparation process, the master base station/source base station instructs the candidate base station to periodically measure and report resource usage of the candidate cell and usage of the transmission network layer, by transmitting a RESOURCE STATUS REQUEST message or another message. The candidate base station may transmit the resource usage of the candidate cell and the usage of the transmission network layer (e.g., information such as the resource occupation level, the percentage of load and capacity, whether it is overload or not etc.), to the master base station/source base station through a RESOURCE STATUS UPDATE message or another message.

In an embodiment, in dual connectivity, the master base station may transmit the obtained information of the load state of the candidate PSCell or candidate target secondary base station to the secondary base station.

In a case that the node is in the CU/DU split structure, the information of the load state of the candidate cell is transmitted by the distributed unit (DU) and/or the centralized unit user plane (CU-UP) of the candidate base station (candidate target secondary base station or the candidate target base station) by way of transmitting the load state indication information to the centralized unit or the centralized unit control plane (CU or CU-CP) of the candidate base station. The information of the load state of the candidate cell is transmitted to the master base station/source base station by the centralized unit or the centralized unit control plane (CU or CU-CP) of the candidate base station.

Operation 2302: The state of the candidate cell is determined.

The base station determines whether the state of the candidate cell is the activated state or the deactivated state by considering the distance between the UE and the candidate cell or the candidate base station and/or the load state of the candidate cell or the candidate base station jointly. The base station may be a master base station or a secondary base station or a source base station.

In an embodiment, if the distance between the UE and the candidate cell or the candidate base station does not exceed the set distance threshold requirement and/or the current load of the cell does not exceed the set load threshold requirement, then the state of this cell is set to the activated state. If the distance between the UE and the candidate cell or the candidate base station exceeds the set distance threshold requirement, and/or the current load of the cell exceeds the set load threshold requirement, then the state of the cell may be set to be deactivated.

In an embodiment, in a dual connectivity structure, the secondary base station may directly provide the determined candidate cell state to the master base station.

Operation 2303: The candidate cell state is transmitted to the UE and/or the serving node/candidate target node to indicate the state of the candidate cell.

In an embodiment, the base station needs to transmit the candidate cell state information determined in operation 2302 to the UE, the candidate target node and/or the serving node respectively. The base station transmits the state of the candidate cell to the UE. When the candidate cell state received by the UE is the activated state, the UE needs to detect the signal quality of the SSB or the CSI-RS of this cell and evaluate whether the execution conditions are fulfilled. When the candidate cell state received by the UE is the deactivated state, the UE is not needed to detect the signal quality of the SSB or the CSI-RS of this cell. The base station may provide the UE with the state indication information of the candidate cell through an RRCReconfiguration message, an RRCConnectionReconfiguration message, or a MAC control element (MAC CE). If the MAC control element (MAC CE) is used to provide the UE with the state indication information of the candidate cell, the structural design of the MAC CE is described in the method of indicating candidate cell state to UE.

In the case that the base station is in the CU/DU split structure, the centralized unit or the centralized unit control plane (CU or CU-CP) of the base station manages the states of the candidate cells. If the MAC CE is used to provide the UE with the state indication information of the candidate cell, the CU/CU-CP of the base station needs to transmit the state indication information of the candidate cell to the distributed unit (DU) of the base station through a state indication message, and then the DU transmits the state indication information to the UE through the MAC CE. The state indication message may be a UE CONTEXT MODI-FICATION REQUEST message, or another message.

In an embodiment, the base station transmits the state of the candidate cell to the candidate target node. When the candidate cell state received by the candidate node is activated, the candidate node may save context information and configuration for the UE on the candidate cell, and reserve resources for the UE, wherein the resources cannot be used by other UEs. When the candidate cell state received by the candidate node is deactivated, the candidate node saves context information and configuration for the UE on the candidate cell, and may temporarily allocate the resources reserved for the UE in this candidate cell to other Ues, so as to improve utilization efficiency for the resources. If there is buffered data of the UE in this cell, the buffered data will be deleted. If the candidate target base station with the CU/DU split structure, when the centralized unit or the centralized unit control plane (CU or CU-CP) of the candidate target base station receives the candidate cell state information, it is needed to transmit this information to the distributed unit (DU) of the candidate target base station.

In an embodiment, according to the state of the candidate cell, the base station determines whether to perform data forwarding to a data forwarding address corresponding to the candidate cell, that is, to set data forwarding indication information for the data forwarding address. If the state of the candidate cell is activated, then the data forwarding indication information corresponding to the data forwarding address is set to Trigger, that is, to perform data forwarding to this address. If the state of the candidate cell is deactivated, then the data forwarding indication information corresponding to the data forwarding address is set to Stop, that is, not to perform data forwarding to this address.

In dual connectivity, according to the state of the candidate cell, the master base station transmits the data forwarding indication information to the source secondary base station, indicating whether it is needed to perform data forwarding to the corresponding address. The master base station/source base station may transmit the data forwarding indication information to the serving node through an Xn-U Address Indication message or another message. If the base station with the CU/DU split structure, and if direct data forwarding is applied, that is, the data is directly forwarded by the source secondary base station to the target secondary node, then the centralized unit or the centralized unit control plane (CU or CU-CP) of the source secondary base station needs to transmit the data forwarding address and the data forwarding indication information to the centralized unit user plane (CU-UP) of the source secondary base station, indicating whether it is needed to perform data forwarding to the corresponding address. If indirect data forwarding is applied, that is, the data of the source secondary base station is forwarded to the candidate target secondary base station through the master base station, then the centralized unit or the centralized unit control plane (CU or CU-CP) of the master base station needs to transmit the data forwarding address and the data forwarding indication information to the centralized unit user plane (CU-UP) of the master base station, indicating whether it is needed to perform data forwarding to the corresponding address.

In a case of a single base station, according to the candidate cell state, the source base station determines whether it is needed to perform data forwarding to the base station to which the candidate cell belongs. If the base station with the CU/DU split mode, the centralized unit or the centralized unit control plane (CU or CU-CP) of the source base station needs to transmit the data forwarding address and the data forwarding indication information to the centralized unit user plane (CU-UP) of the source base station, indicating whether it is needed to perform data forwarding to the corresponding address.

In an embodiment, if the secondary base station may determine the candidate cell state, the secondary base station may directly transmit the candidate cell state information to the UE. If the secondary base station is not configured with SRB3 and needs to transmit the candidate cell state information with an RRC message, then the candidate cell state information is transmitted by the secondary base station to the master base station, and then forwarded by the master base station to the UE. The candidate cell state is transmitted by the secondary base station to the master base station, and then transmitted by the master base station to the candidate target secondary base station.

The disclosure provides a method of indicating candidate cell state to UE.

In an embodiment, the network may transmit the candidate cell state indication to the UE through an RRC message or a MAC control element (CE), wherein the candidate cell state indication indicates whether the UE needs to monitor the candidate cell. The approach applying RRC message has been provided in the description above.

Figure 2E:
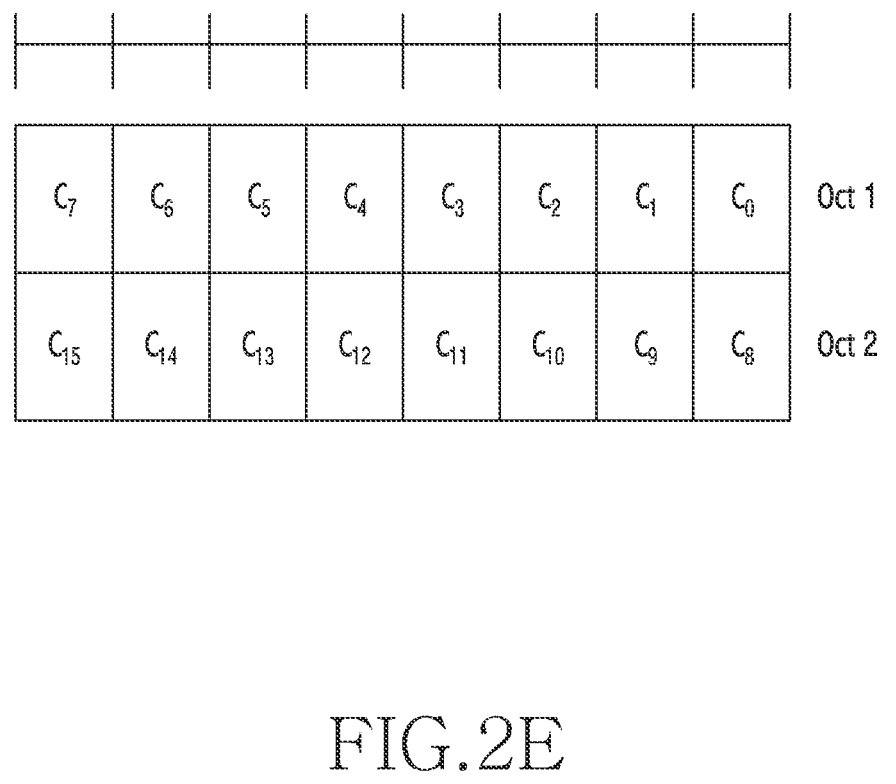

FIG. 2E presents a structural schematic diagram of the MAC CE for the candidate cell state indication according to an embodiment of the disclosure, for a structure of MAC CE for the candidate cell state indication. In the MAC CE: the length is in a unit of byte, which may be 1 byte, 2 bytes or 4 bytes. The number of bytes occupied may be based on the maximum number of the candidate cells that the UE may be configured with. Taking 2 bytes as an example, in which:

The bit location where $C_i$ is located corresponds to an identity of candidate cell, cell Index.

If $C_i$ is 1, it means that the $cell_i$ corresponding to the bit location of I is in an activated state;

If $C_i$ is 0, it means that the $cell_i$ corresponding to the bit location of I is in a deactivated state.

Figure 2F:
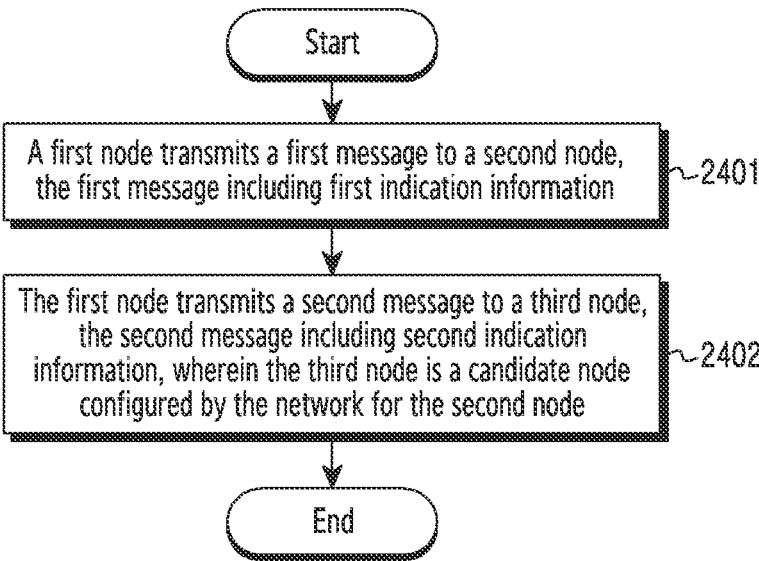
FIG. 2F illustrates a method performed by a first node in a wireless communication system according to an embodiment of the disclosure.

FIG. 2F illustrates a method performed by a first node in a wireless communication system according to an embodiment of the disclosure.

Referring to FIG. 2F, the method comprises that: in operation 2401, a first node transmits a first message to a second node, the first message including first indication information. In operation 2402, the first node transmits a second message to a third node, the second message including second indication information, wherein the third node is a candidate node configured by the network for the second node.

The step of transmitting the second message to the third node by the first node comprises: transmitting, by the first node, the second message to the third node, after the third node is added to a set or list of candidate nodes.

The step of transmitting the second message to the third node by the first node comprises: transmitting, by the first node, the second message to the third node, after the second node is switched to the third node; or transmitting, by the first node, the second message to the second node, after the first node receives a reconfiguration complete message transmitted by the second node.

In an embodiment, the first indication information is used to indicate that Conditional PSCell Addition or Change (CPAC) configuration keeps valid for the second node, and the second indication information is used to indicate that CPAC keeps valid for the third node; or wherein the first indication information is used to indicate that Conditional Handover (CHO) configuration keeps valid for the second node, and the second indication information is used to indicate that CHO keeps valid for the third node.

In an embodiment, the first node decides whether to transmit the first indication information and the second indication information, or the first node transmits the first indication information and the second indication information after receiving an indication transmitted by a fourth node, or the first node receives the first indication information and the second indication information transmitted by a fourth node, and then transmits them to the second node and the third node respectively.

In an embodiment, there is provided transmitting, by the first node, candidate cells information associated with the set of candidate nodes to at least one of the second node and the third node, after all candidate nodes are added to the set or list of candidate nodes; or transmitting, by the first node, the candidate cells information associated with the set of candidate nodes to at least one of the second node and the third node, after the second node is switched to the third node; or transmitting, by the first node, the candidate cells information associated with the set of candidate nodes to at least one of the second node and the third node, after receiving a reconfiguration complete message transmitted by the second node There is provided at least one of the following steps: transmitting, by the first node, third indication information to the second node, the third indication information being used to indicate at least one candidate cell state of the third node; and transmitting, by the first node, fourth indication information to the third node, the fourth indication information being used to indicate the candidate cell state of the third node.

In an embodiment, the first node transmits the third indication information and the fourth indication information according to the candidate cell state of the third node determined by the first node, or the first node transmits the third indication information and the fourth indication information according to the candidate cell state of the third node obtained from the fourth node.

In an embodiment, the first node transmits the third indication information to the second node either through a MAC CE or through an RRC message, wherein if a MAC CE manner is applied, when the first node is a source node or a master node and with a Centralized Unit (CU)/Distributed Unit (DU) split structure, the third indication information is transmitted to the second node through the DU of the first node, wherein the MAC CE is determined by the DU of the first node according to the candidate cell state information of the third node obtained from the CU/Centralized Unit Control Plane (CU-CP) of the first node.

In an embodiment, the candidate cell state of the third node is determined based on one or more of: a distance between the second node and the third node, a distance between the second node and a cell of the third node, a load state of the third node, and a load state of the cell of the third node.

In an embodiment, after the first node transmits the second message to the third node, further comprising: receiving a response message for the second message from the third node, the response message including information of the load state of the cell of the third node; or receiving the information of the load state of the cell of the third node transmitted by the third node, wherein the information of the load state of the cell of the third node is transmitted by the third node when a load status of its cell is changed.

In an embodiment, the distance between the second node and the third node and the distance between the second node and the cell of the third node are determined at least based on a location of the second node; wherein the location of the second node is determined by the first node based on a measurement result received from the second node, or the location of the second node is determined by the fourth node based on a measurement result received from the second node, and is transmitted to the first node.

In an embodiment, the method further comprises: transmitting, by the first node, fifth indication information to the fourth node, wherein the fifth indication information is used to indicate whether the fourth node needs to perform data forwarding to the candidate node.

The first node is a source node, or a centralized unit (CU) of the source node, or a centralized unit control plane (CU-CP) of the source node, the second node is a user equipment (UE), and the third node is a candidate target node; and/or the first node is a master node (MN), or a centralized unit (CU) of the master node, or a centralized unit control plane (CU-CP) of the master node, the second node is a user equipment (UE), the third node is a candidate target secondary node (T-SN), and the fourth node is a source secondary node (S-SN).

The second message is a secondary node addition request message or a handover request message.

The second message is a handover success acknowledgement message; or the second message is a secondary node modification request message.

Optionally, the candidate cell state of the third node include an activated state and a deactivated state.

The fifth indication information is determined based on the candidate cell state of the third node.

Figure 2G:
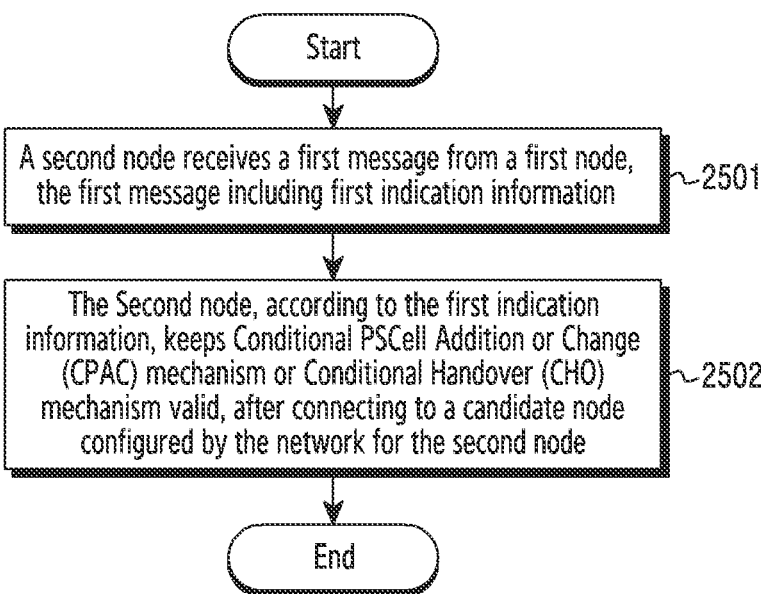
FIG. 2G illustrates a method performed by a second node in a wireless communication system according to an embodiment of the disclosure.

FIG. 2G illustrates a method performed by a second node in a wireless communication system according to an embodiment of the disclosure.

Referring to FIG. 2G, the method comprises: in operation 2501, a second node receives a first message from a first node, the first message including first indication information. In operation 2502, according to the first indication information, the second node keeps Conditional PSCell Addition or Change (CPAC) mechanism or Conditional Handover (CHO) mechanism valid, after connecting to a candidate node configured by network for the second node.

In an embodiment, the first indication information is used to indicate that the CPAC configuration keeps valid for the second node; or wherein the first indication information is used to indicate that the CHO configuration keeps valid for the second node.

The first indication information is decided by the first node and transmitted to the second node, or the first indication information is transmitted to the second node by the first node after receiving an indication transmitted by a fourth node, or the first indication information is transmitted to the second node by the first node after receiving the first indication information from a fourth node.

In an embodiment, there is provided receiving, by the second node, candidate cell information associated with the set of candidate nodes from the first node, after all candidate nodes are added to the set or list of candidate nodes.

There is provided receiving, by the second node, third indication information from the first node, wherein the third indication information is used to indicate a candidate cell state of a third node.

In an embodiment, the third indication information is transmitted to the second node by the first node according to the candidate cell state of the third node determined by the first node, or the third indication information is transmitted to the second node by the first node according to the candidate cell state of the third node obtained from the fourth node.

In an embodiment, the second node receives the third indication information from the first node either through a MAC CE or through an RRC message, wherein if a MAC CE manner is applied, when the first node is a source node or a master node and with a Centralized Unit (CU)/Distributed Unit (DU) split structure, the third indication information is received from a DU of the first node, wherein the MAC CE is determined by the DU of the first node according to the candidate cell state information of the third node obtained from the CU/Centralized Unit Control Plane (CU-CP) of the first node.

The candidate cell state of the third node is determined based on one or more of: a distance between the second node and the third node, a distance between the second node and a cell of the third node, a load state of the third node, and a load state of the cell of the third node.

The distance between the second node and the third node and the distance between the second node and the cell of the third node are determined at least based on a location of the second node, wherein the location of the second node is determined by the first node based on a measurement result received from the second node, or the location of the second node is determined by the fourth node based on a measurement result received from the second node, and is transmitted to the first node.

The first node is a source node, the second node is a User Equipment (UE), and the third node is a candidate target node; and/or the first node is a Master Node (MN), the second node is a User Equipment (UE), the third node is a candidate Target Secondary Node (T-SN), and the fourth node is a Source Secondary Node (S-SN).

In an embodiment, the second message is a secondary node addition request message or a handover request message.

In an embodiment, the second message is a handover success acknowledgement message; or the second message is a secondary node modification request message.

Optionally, the candidate cell state of the third node include an activated state and a deactivated state.

In an embodiment, the fifth indication information is determined based on the candidate cell state of the third node.

Figure 2H:
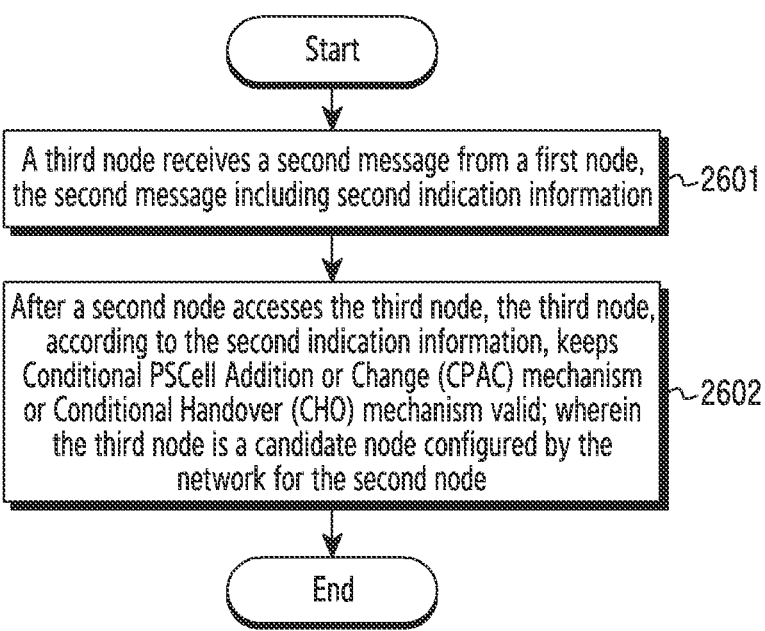
FIG. 2H illustrates a method performed by a third node in a wireless communication system according to an embodiment of the disclosure.

FIG. 2H illustrates a method performed by a third node in a wireless communication system according to an embodiment of the disclosure.

Referring to FIG. 2H, the method comprises: in operation 2601, the third node receives a second message from the first node, the second message including second indication information. In operation 2602, after a second node accesses the third node, according to the second indication information, the third node keeps Conditional PSCell Addition or Change (CPAC) mechanism or Conditional Handover (CHO) mechanism valid; wherein the third node is a candidate node configured by network for the second node.

In an embodiment, the step of receiving the second message from the first node by the third node comprises: receiving, by the third node, the second message from the first node, after the third node is added to a set or list of candidate nodes; or receiving, by the third node, the second message from the first node, after the second node is switched to the third node; or receiving, by the third node, the second message from the first node, after the first node receives a reconfiguration complete message transmitted by the second node.

In an embodiment, the second indication information is used to indicate that CPAC keeps valid; or wherein the second indication information is used to indicate that the CHO keeps valid.

The second indication information is decided and transmitted to the third node by the first node, or the second indication information is transmitted to the third node by the first node after receiving an indication transmitted by the fourth node, or the second indication information is transmitted to the third node by the first node after receiving the second indication information from the fourth node.

There is provided transmitting a response message for the second message to the first node, after the third node receives the second message from the first node, the response message including information of the load state of a cell of the third node; or transmitting the information of the load state of the cell of the third node to the first node, when the load state of the cell of the third node changes; or determining the information of the load state of the cell of the third node according to state information provided by a Distributed Unit (DU) and/or Centralized Unit (CU) User Plane (CU-UP), if the third node is a candidate target secondary node with the CU/DU split structure.

There is provided receiving, by the third node, candidate cell information associated with the set of candidate nodes from the first node, after all candidate nodes are added to the set or list of candidate nodes; or receiving, by the third node, the candidate cell information associated with the set of candidate nodes from the first node, after the second node is switched to the third node; or receiving, by the third node, the candidate cell information associated with the set of candidate nodes from the first node, after the first node receives a reconfiguration complete message transmitted by the second node.

There is provided receiving fourth indication information from the first node, wherein the fourth indication information is used to indicate the candidate cell state of the third node.

In an embodiment, the fourth indication information is transmitted to the third node by the first node according to the candidate cell state of the third node determined by the first node, or the fourth indication information is transmitted to the third node by the first node according to the candidate cell state of the third node obtained from the fourth node.

In an embodiment, the candidate cell state of the third node is determined based on one or more of: a distance between the second node and the third node, a distance between the second node and a cell of the third node, a load state of the third node, and a load state of the cell of the third node.

In an embodiment, the distance between the second node and the third node and the distance between the second node and the cell of the third node are determined at least based on a location of the second node; wherein the location of the second node is determined by the first node based on a measurement result received from the second node, or the location of the second node is determined by the fourth node based on a measurement result received from the second node, and is transmitted to the first node.

In an embodiment, the first node is a source node, the second node is a User Equipment (UE), and the third node is a candidate target node, or a Centralized Unit (CU) of the candidate target node, or a Centralized Unit Control Plane (CU-CP) of the candidate target node; and/or the first node is a Master Node (MN), the second node is a User Equipment (UE), the third node is a candidate Target Secondary Node (T-SN), or a Centralized Unit (CU) or a Centralized Unit Control Plane (CU-CP) of the candidate target secondary node, and the fourth node is a Source Secondary Node (S-SN).

Optionally, the second message is a secondary node addition request message or a handover request message.

The second message is a handover success acknowledgement message; or the second message is a secondary node modification request message.

The candidate cell state of the third node include an activated state and a deactivated state.

Optionally, the fifth indication information is determined based on the candidate cell state of the third node.

Figure 2I:
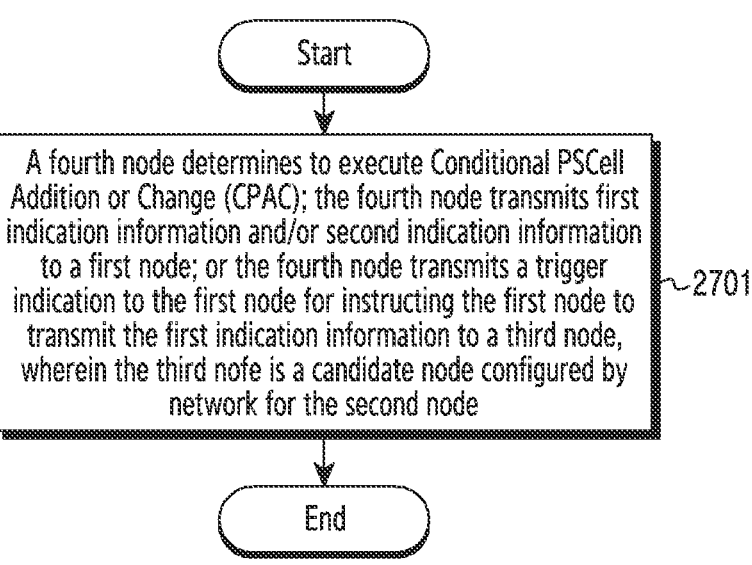
FIG. 2I illustrates a method performed by a fourth node in a wireless communication system according to an embodiment of the disclosure.

FIG. 2I illustrates a method performed by a fourth node in a wireless communication system according to an embodiment of the disclosure.

Referring to FIG. 2I, the method comprises: in operation 2701, the fourth node determines to execute Conditional PSCell Addition or Change (CPAC); the fourth node transmits a first indication information and/or a second indication information to a first node; or the fourth node transmits a trigger indication to a first node for instructing the first node to transmit a first indication information to a second node and/or to transmit a second indication information to a third node, wherein the third node is a candidate node configured by network for the second node.

In an embodiment, when the third node is taken as a candidate secondary node by the fourth node, the fourth node transmits the first indication information and the second indication information to the first node or transmits the trigger indication to the first node.

In an embodiment, the first indication information is used to indicate that the Conditional PSCell Addition or Change (CPAC) configuration keeps valid, and the second indication information is used to indicate that the CPAC keeps valid.

There is provided transmitting candidate cell state information of the third node to the first node, wherein the third node is a candidate node configured by network for the second node.

The candidate cell state of the third node is determined based on one or more of: a distance between the second node and the third node, a distance between the second node and a cell of the third node, a load state of the third node, and a load state of the cell of the third node.

The distance between the second node and the third node and the distance between the second node and the cell of the third node are determined at least based on a location of the second node; wherein the location of the second node is determined by the first node based on a measurement result received from the second node, or the location of the second node is determined by the fourth node based on a measurement result received from the second node, and is transmitted to the first node.

There is provided receiving fifth indication information from the first node, wherein the fifth indication information is used to indicate to the fourth node whether it is needed to perform data forwarding to the candidate node, wherein if the fourth node is a source secondary node with a Centralized Unit (CU)/Distributed Unit (DU) split structure, then a CU/CU Control Plane (CU-CP) of the fourth node transmits the fifth indication information received from the first node to the CU User Plane (CU-UP) of the fourth node, and wherein the fifth indication information is determined based on a candidate cell state of the third node.

In an embodiment, the first node is a Master Node (MN), the second node is a User Equipment (UE), the third node is a candidate Target Secondary Node (T-SN), and the fourth node is a Source Secondary Node (S-SN), or a Centralized Unit (CU) of the source secondary node, or a Centralized Unit Control Plane (CU-CP) of the source secondary node.

In an embodiment, the second message is a secondary node addition request message or a handover request message.

Optionally, the second message is a handover success acknowledgement message; or the second message is a secondary node modification request message.

The candidate cell state of the third node include an activated state and a deactivated state.

The fifth indication information is determined based on the candidate cell state of the third node.

Several examples of applying the method described above are given below.

Example 1: Process for Indicating Candidate Cell State During CPC Configuration FIG. 3 is a schematic diagram of a process for indicating candidate cell states during a CPC configuration according to an embodiment of the disclosure.

Figure 3:
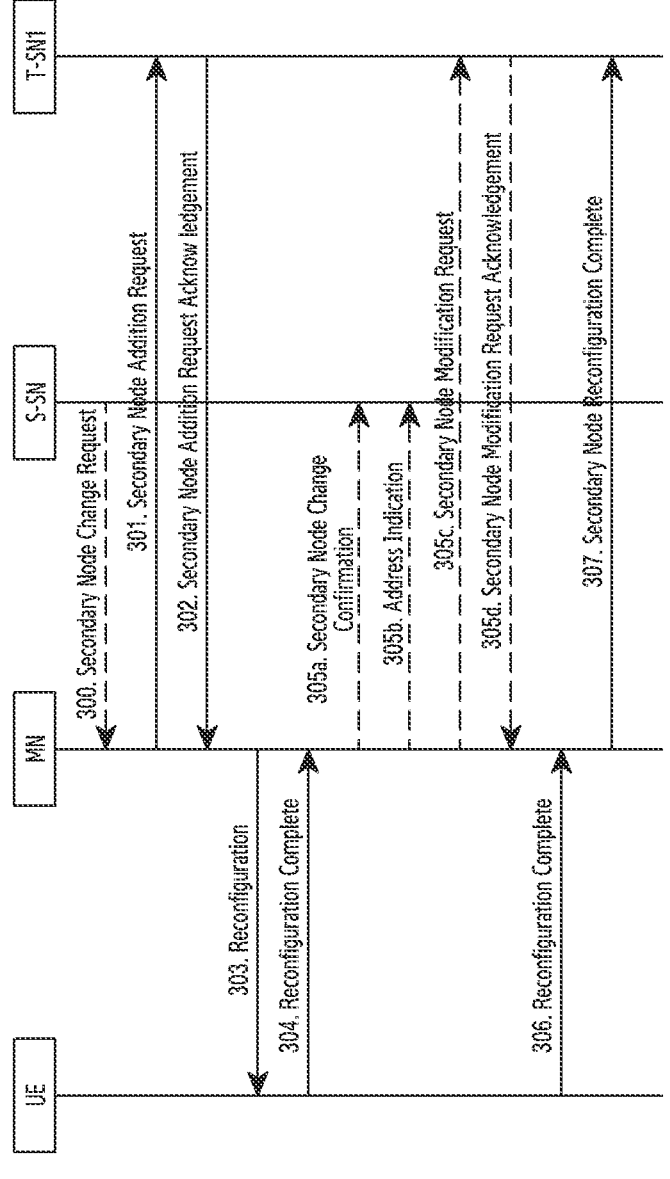
FIG. 3 is a schematic diagram of a process for indicating candidate cell states during a conditional PSCell change (CPC) configuration according to an embodiment of the disclosure.

FIG. 3 presents a schematic diagram of a method in which an MN indicates PSCell state information and/or CPAC keeping valid indication information to a candidate secondary node (SN) and a UE, and describes a process in which the MN configures a target candidate secondary node, during the process the MN decides the state of the candidate PCSells and/or whether the CPAC keeps valid, and transmits such information to the candidate secondary node and/or the UE. By this method, unnecessary reconfiguration processing and RRC signaling overhead by the network equipment and the UE may be avoided, and measurements by the UE may be reduced, and energy for the UE may be saved.

Referring to FIG. 3, the network configures dual connectivity for the UE, wherein the first node is the master base station (MN), the second node is the terminal (UE), the third node is the secondary base station S-SN, and the MN needs to add the fourth node T-SN1 as a candidate secondary base station. Wherein, the CPC mechanism is applied to initiate a secondary base station change, which may be triggered either by the master node autonomously, or by the source secondary base station (through operation 300). For a CPAC keeping unchanged mechanism, it is needed to indicate the candidate secondary base stations to keep CPAC valid and provide a list of all the candidate cells. There are two methods of providing indication information and list information. Method 1: the provision may be implemented when the candidate secondary base station is initially added; Method 2: the provision may be made by the master base station to the target secondary base station, after the UE determines to establish a connection with the target secondary base station. If Method 1 is applied, and a secondary node addition request transmitted by the master base station contains indication that a CPC process is to be performed subsequently with CPAC kept, then the master base station will provide candidate cells information of all candidate secondary base stations to the candidate secondary base stations after completing the addition of all candidate secondary base stations, that is, operations 305c and 305d would be needed to be performed. If Method 2 is applied, and the UE determines to establish a connection with the target secondary base station and then the master base station provides it to the target secondary base station, then operations 305c and 305d are not needed to be performed.

Operation 300: The source secondary base station transmits a secondary node change request message (S-NODE CHANGE REQUIRED or SGNB CHANGE REQUIRED) or another message to the master base station, indicating that the master node triggers the CPC mechanism for changing a secondary node and applies the CPAC mechanism. This message contains at least one piece of the following information:

Identification Information of the UE, including an identity of UE on the master base station (M-NG-RAN node UE XnAP ID) and an identity of the UE on the secondary base station (S-NG-RAN node UE XnAP ID).

CPC Related Information, which may be set as a CPC information request (Conditional PSCell Change Information Request) IE. The CPC information request information element contains information of a list of a plurality of candidate target secondary nodes, including:

Identity of Node, i.e., a node ID of the candidate secondary node, which may be a Global NG-RAN Node ID.

Maximum Number of PSCells to Prepare, indicating a maximum number of candidate PSCells that the candidate secondary node may provide. This information may be the maximum number of PSCells prepared;

Estimated Arrival Probability, indicating a possibility that the UE will access the candidate secondary node. This information may be set to a value between 1 and 100. The higher the value, the higher the possibility that the UE will access to candidate secondary node.

Candidate PSCell List Information, including identification information of respective candidate PSCells, which may be a PSCell ID, a cell global identity (CGI) or other identification information. This may indicate that the secondary node continues to regard such cells as candidate PSCells of the UE, and saves UE context information as well as information of CPC resources allocated to the UE on the candidate PSCells.

CPC Execution Condition Information, i.e., CPC execution conditions for each candidate PSCell. When the execution conditions of the candidate PSCell are fulfilled, the UE may perform a process for PSCell change.

CPAC Keep-Valid Indication Information. If this indication information exists and is set to Trigger, it indicates that the UE will continue to apply the CPC mechanism for PSCell changing, after the UE completes the CPC execution and accesses the target secondary node (or a new PSCell), and the network will not be needed to re-initiate the CPC process. If this indication information exists and is set to Stop, then the UE will not continue to apply the CPC mechanism for PSCell changing after the UE completes the CPC execution and accessing the target secondary node (or a new PSCell). And the target secondary node will follow the existing mechanism, and if the CPC mechanism needs to be applied, then configuration will be needed to re-initiate the CPC process. In an embodiment, as to the way in which the CPAC keeping valid indication information may be transmitted, the indication information may be directly transmitted to the MN as trigger indication information, to indicate that the CPAC configuration keeping valid indication information to be transmitted to the UE and the CPAC keeping valid indication information to be transmitted to the candidate secondary node are respectively formed by the MN. Alternatively, the CPAC configuration keeping valid indication information to be transmitted to the UE and the CPAC keeping valid indication information to be transmitted to the candidate secondary node are directly formed by the source secondary node, and transmitted to the MN, and then transmitted to the UE and the candidate secondary node respectively by the MN.

State Indication Information of the Candidate PSCell, indicating the state of a candidate PSCell configured by the candidate target secondary node for the UE. If an activated state is indicated, the candidate target secondary node sets up context information for the candidate PSCell selected for the UE and reserves resources for the UE, wherein the resources cannot be used to other Ues. If a deactivated state is indicated, the candidate target secondary node sets up context information for the candidate PSCell selected for the UE and reserves resources for the UE, wherein the resources may be temporarily used to other Ues.

Operation 301: The MN transmits a secondary node addition request message to a candidate secondary node T-SN1, instructing the candidate secondary node to config-ure CPAC for the UE, and requesting the candidate second-ary node to allocate resources for the UE. The MN may decide autonomously whether it is needed to change the secondary node and initiate the CPC process. Alternatively, the change of the secondary node may be triggered by the source secondary node by applying the CPC mechanism through operation 300. This message contains at least one piece of the following information:

Identification Information of the UE, indicating an iden-tity of the UE on master base station, i.e., a master NG-RAN node UE XnAP ID (M-NG-RAN node UE XnAP ID).

CPAC Related Information, which may be set as a CPA information request (Conditional PSCell Addition Informa-tion Request) IE. The message contains such an information element that instructs the candidate target node to allocate CPAC resources for the UE. The CPA information request information element contains:

Maximum Number of PSCells to Prepare, indicating a maximum number of candidate PSCells that the can-didate secondary node may provide. This information may be the maximum number of PSCells prepared;

Estimated Arrival Probability, indicating a possibility that the UE will access the candidate secondary node. This information may be set to a value between 1 and 100. The higher the value, the higher the possibility that the UE will access to the candidate secondary node.

CPAC Keep-Valid Indication Information. If this indica-tion information exists and is set to Trigger, it indicates that the UE will continue to apply the CPC mechanism for PSCell changing after completing the CPC execution and accessing the target secondary node (or a new PSCell), and the network will not be needed to re-initiate the CPC process. If this indication information exists and is set to Stop, then the UE will not continue to apply the CPC mechanism for PSCell changing after completing the CPC execution and accessing to the target secondary node (or a new PSCell). The target secondary node will follow the existing mechanism, and if the CPC mechanism needs to be applied, configuration will be needed to re-initiate the CPC process.

State Indication Information of the Candidate PSCell, indicating the state of the candidate PSCell configured by the candidate target secondary node for the UE. If an activated state is indicated, it indicates that the candidate target secondary node sets up context information for the candidate PSCell selected for the UE and reserves resources for the UE, wherein the resources cannot be used by other Ues. If a deactivated state is indicated, it indicates that the candidate target secondary node sets up context information for the candidate PSCell selected for the UE and reserves resources for the UE, wherein the resources may be tempo-rarily used by other Ues.

The secondary node addition request message may be an S-NODE ADDITION REQUEST message, an SGNB ADDITION REQUEST message, or another message.

Operation 302: The candidate target SN (T-SN1) trans-mits a secondary node addition request acknowledgement message to the MN, for transmitting configuration informa-tion and state information of candidate cells selected by T-SN1 for the UE, e.g., information such as a load state. This message contains at least one piece of the following infor-mation:

Identification Information of the UE, including an identity of the UE on the master base station (M-NG-RAN node UE XnAP ID) and an identity of the UE on the secondary base station (S-NG-RAN node UE XnAP ID).

CPAC Request Acknowledgement Information, indicat-ing information of candidate Primary Secondary Cells selected by the candidate secondary node for the UE. This acknowledgement information may be a CPA information acknowledgement (Conditional PSCell Addition Informa-tion Acknowledgment) information element, which contains information of the list of candidate Primary Secondary Cells selected by the candidate secondary node for the UE, and the information of the list contains PSCell IDs, which may be a NR CGI containing information of a PLMN Identity and a NR Cell Identity.

Information on the load state of the candidate PSCell, indicating the load state of the candidate PSCell. For example, the load state may indicate information such as a level of load, a percentage of load and capacity, and whether it is overloaded or not.

Container from Secondary Node to Master Node, con-taining a cell group candidate list message (CG-Candidat-eList) or a cell group configuration message (CG-Config), which contains information such as CG configuration for the UE on the candidate PSCell. Such information is transmitted in a form of the container by the candidate secondary node, and then transmitted to the UE by the master node.

Data Forwarding Address Information, indicating trans-port layer address information for data forwarding, contain-ing an IP address and a tunnel identity. This is used for the serving node to perform data forwarding to the candidate secondary node.

The secondary node addition request acknowledgement message may be an S-NODE ADDITION REQUEST ACKNOWLEDGE message, an SGNB ADDITION REQUEST ACKNOWLEDGE message, or another mes-sage.

The MN may obtain the load state of candidate Primary Secondary Cell through state indication information pro-vided by T-SN1, and may obtain the location information of the UE through a measurement report of the UE or a measurement of a UE uplink signal by the MN. Through such information, the MN may determine the state of the candidate PSCell. For example, according to the current location of the UE, if the MN knows the geographical location of the candidate PSCell or the candidate secondary base station. If the geographical location is far away from the UE, and the UE would not select and switch to the cell soon, then MN may set the candidate cell state as deacti-vated, and the UE will not detect and evaluate signal quality of SSB or CSI-RS of this cell upon receiving the state information, processing for UE is reduced, thus power consumption for UE is decreased. Otherwise, if the geo-graphical location of the candidate cell is close to the UE's current location, and the load of the candidate cell is not heavy, the MN sets this candidate cell state to the activated state. Through operation 303, the MN informs the UE of the state of the candidate PSCell, indicates whether the UE needs to detect and evaluate signal quality of the candidate cell, therefore unnecessary detection and evaluation of sig-nal quality of this candidate cell by UE is reduced, thereby reducing power consumption for UE. The MN determines the state of the candidate PSCell, and needs to notify the candidate secondary base station of the candidate PSCell state information through a secondary base station modification request process. The notification process is detailed in Example 2, and is omitted here.

Operation 303: The master node transmits an RRC reconfiguration message to the UE and transmits configuration information for CPC to the UE. This message contains at least one piece of the following information:

SCG Configuration Message, contained in an mrdc-SecondaryCellGroup information element. This message is generated by the candidate secondary node and transmitted to the master node in a form of container, and then transmitted to the UE by the master node. It contains SCG radio resource configuration information for the candidate Primary Secondary Cell selected by the secondary node for the UE.

CPAC Configuration Keep-Valid Indication Information. The CPAC configuration refers to information of conditions triggering CPC execution and information of resources allocated by the candidate secondary node for the traffic bearer of the UE in this candidate PSCell. If this indication information exists and is set to Trigger, it indicates that the UE will not delete the existing configuration information related to CPC after completing CPC execution and accessing the target secondary node (or a new PSCell), that is, CPC configuration information stored in a conditional reconfiguration variable (VarConditionalReconfig or VarConditionalReconfiguration) at UE side will not be deleted and will continue to be saved, and indicates that the UE will continue to apply the CPC mechanism for PSCell changing, and the network is not needed to transmit a reconfiguration message or re-initiate the CPC process. If this indication information exists and is set to Stop, it indicates that the UE will delete the existing configuration information related to CPC after completing CPC execution and accessing the target secondary node (or a new PSCell). The candidate PSCell list information, including identification information of respective candidate PSCells, may be a conditional configuration identity condReconfigId or PSCell ID or CGI or other identification information.

CPC Execution Condition, indicating a condition that a measurement result of the candidate secondary cell needs to fulfill when the UE executes CPC.

Candidate PSCell State Indication Information, indicating a PSCell state. According to the state indication information, the UE decides whether it is needed to monitor the candidate PSCell. If this information indicates that the PSCell is in an activated state, the UE needs to execute CPC monitoring on this cell; or if this information indicates that the PSCell is in a deactivated state, the UE is not needed to execute CPC monitoring on this cell. Unnecessary detection and evaluation of signal quality of candidate cells by the UE may be reduced, thereby reducing power consumption for UE.

The reconfiguration message may be an RRCReconfiguration message, an RRCConnectionReconfiguration message, or another message.

Operation 304: The UE transmits a reconfiguration complete message to the master node, indicating that the UE has completed a configuration except for CPC according to the configuration information transmitted by the MN, and saved configuration information for CPC.

The reconfiguration complete message may be an RRCReconfigurationComplete message, an RRCConnectionReconfigurationComplete message, or another message.

If this CPC process is triggered by the source secondary base station (i.e., through operation 300), then operation 305a needs to be executed, and operation 305b doesn't need to be executed. If it is triggered by the master base station, then operation 305a doesn't need to be executed, and operation 305b needs to be executed.

Operation 305a: The master base station transmits a secondary node change confirmation message (S-NODE CHANGE CONFIRM or SGNB CHANGE CONFIRM) or another message to the source secondary base station, indicating that CPC is ready. If early data forwarding is supported, the source secondary node performs data forwarding according to the received address information.

Operation 305b: The master base station transmits an address indication message to the source secondary node. When the MN receives a reconfiguration complete message of the UE, it provides the source secondary node with address information for data forwarding, indicating to initiate the CPC process. If early data forwarding is supported, the source secondary node performs data forwarding according to the received address information. If direct data forwarding is applied in data forwarding, that is, the source SN (S-SN) transmits to respective candidate secondary nodes T-SN1 directly, MN transmits data forwarding address information and data forwarding indication information of the candidate secondary node T-SN1 to the S-SN through this message. If indirect data forwarding is applied in data forwarding, that is, the data of the S-SN is forwarded to the candidate secondary node through the MN, then the MN transmits the data forwarding address information of the MN to the S-SN through this message.

This message contains at least one piece of the following information:

Data Forwarding Address Information, indicating transport layer address information for data forwarding, including an IP address and a tunnel identity.

Data Forwarding Indication Information, indicating whether it is needed to perform data forwarding to this address. If the indication information is Stop, data forwarding to the address is not needed, or if the indication information is Trigger, data forwarding to the address is needed. Whether the indication information is Stop or Trigger is determined according to the state of the candidate cell. If the candidate cell is in an activated state, the data forwarding indication information of the data forwarding address corresponding to the candidate cell is Trigger, and if the candidate cell is in a deactivated state, the data forwarding indication information of the data forwarding address corresponding to the candidate cell is Stop.

The address indication message may be an Xn-U Address Indication message, or another message.

Operation 305c: The master base station transmits a secondary node modification request message (S-NODE MODIFICATION REQUEST or SGNB MODIFICATION REQUEST) or another message to the candidate secondary base station, and the master base station transmits all candidate cells information of candidate target secondary nodes to the candidate secondary nodes. This message contains at least one piece of the following information:

Candidate PSCell List Information, including identification information of respective candidate PSCells of the current UE, which may be a PSCell ID, a CGI or other identification information and/or data forwarding information. Wherein, the data forwarding information contains at least one piece of the following information:

Data forwarding address information, indicating the transport layer address information for data forwarding, including an IP address and a tunnel identification. If early data forwarding is supported, when the candidate target secondary node is used as the target node, it performs data forwarding to said address.

Data forwarding indication information, indicating whether it is needed to perform data forwarding to said address when the candidate target secondary node is used as the target node. If the indication information is "stop", then the target node will not perform data forwarding to said address. If the indication information is "trigger", then the target node will perform data forwarding to said address.

Operation 305*d*: The candidate secondary base station transmits a secondary node modification request acknowledgement message (S-NODE MODIFICATION REQUEST ACKNOWLEDGE or SGNB MODIFICATION REQUEST ACKNOWLEDGE) or another message to the master base station, and the candidate secondary base station indicates to the master base station that it has received corresponding information.

Operation 306: The UE transmits a reconfiguration complete message to the master node, indicating that there are candidate PSCells fulfill the CPC execution conditions, and the UE has selected the target PSCell. This message contains at least one piece of the following information:

SCG Response Information Element, which may be a scg-Response, containing an RRC reconfiguration complete message of a target PSCell selected by the UE.

Identification Information of Target PSCell, indicating an identity of a PSCell selected by the UE, which may be a conditional configuration identity condReconfigId or a PSCell ID or a CGI or other identification information.

The reconfiguration complete message may be an RRCReconfigurationComplete message, an RRCConnectionReconfigurationComplete message, or another message.

Operation 307: The master node transmits the secondary node reconfiguration complete message to the target secondary node, forwards the secondary node reconfiguration complete message transmitted by the UE to the target secondary node, indicates to the target secondary node that the UE selects one of the candidate PSCells belonging to the target secondary node as the target PSCell, and indicates to the target secondary node whether CPC keeps valid and/or data forwarding information. If this target secondary base station configures other candidate PSCells for the UE in addition to the target PSCell, and if such cells continue to act as candidate PSCells for the UE after UE accessing to the target PSCell, the MN will instruct the target secondary node to continue to save the UE context information in these cells, and save information of CPC resources allocated to the UE in the candidate PSCells and state indication information of the candidate PSCell. This message contains at least one piece of the following information:

CPAC Keep-Valid Indication Information, indicating to the target secondary node that CPC has been configured for the UE and the UE continues to apply CPC mechanism for PSCell changing after accessing the target secondary node.

Candidate PSCell List Information, including identification information of respective candidate PSCells, which may be a PSCell ID, a CGI or other identification information. This may indicate that the target secondary node continue to regard such cells as candidate PSCells of the UE, and save UE context information as well as information of CPC resources allocated to the UE on the candidate PSCells.

State Indication Information of the Candidate PSCell, indicating a state of a candidate PSCell. If an activated state is indicated, the target secondary node saves the context information and configuration of the UE in this candidate PSCell, and reserve resources for the UE which cannot be used by other Ues. If a deactivated state is indicated, the target secondary node saves the context information and configuration of the UE in this PSCell, and may temporarily allow the resources reserved for the UE in this candidate PSCell to be used by other users; if there is buffered data of the UE, the buffered data will be deleted.

CPAC Execution Condition Information. If it is a CPC process triggered by the SN, the master node transmits the CPAC execution conditions of the source secondary node to the target secondary node.

The data forwarding information, containing at least one piece of the following information:

Data forwarding address information, indicating the transport layer address information for data forwarding, including an IP address and a tunnel identification. It is used in performing data forwarding to said address by the T-SN1 when early data forwarding is supported.

Data forwarding indication information, indicating whether it is needed to perform data forwarding to said address. If the indication information is "stop", then the T-SN1 will not perform data forwarding to said address. If the indication information is "trigger", then the T-SN1 will perform data forwarding to said address.

The secondary node reconfiguration complete message may be S-NODE RECONFIGURATION COMPLETE, or another message.

Example 2: Process for Indicating Candidate PSCell State Update

Figure 4:
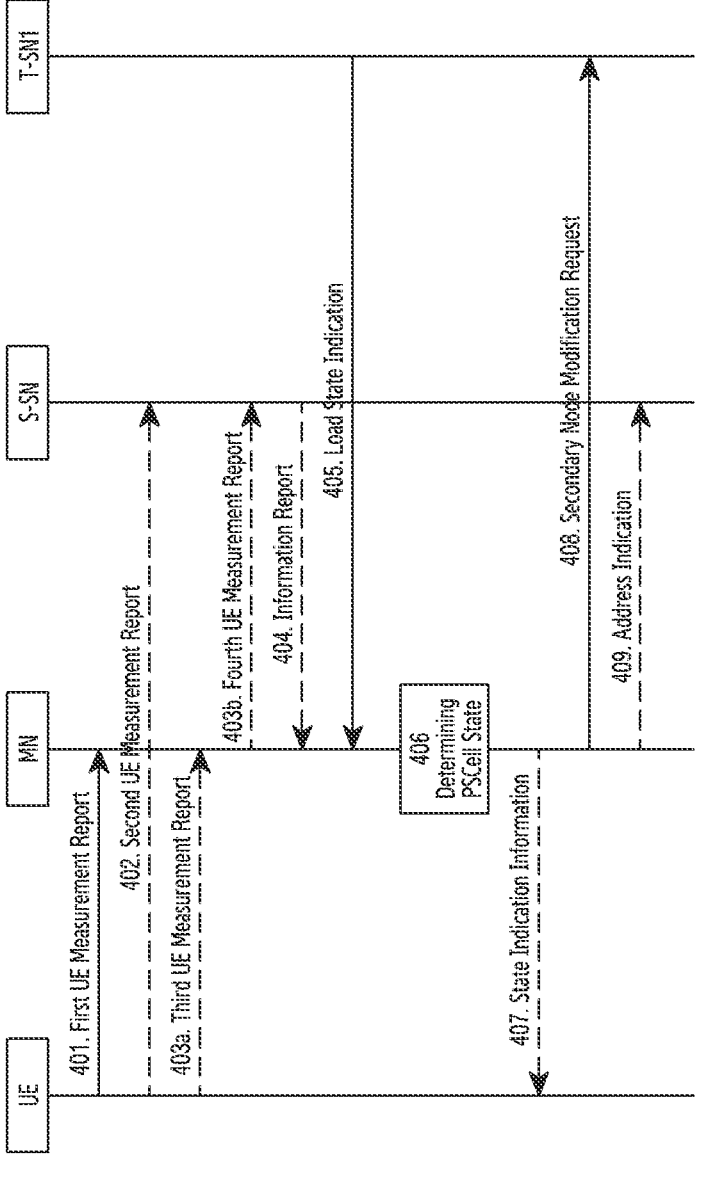
FIG. 4 is a schematic diagram of a process for indicating cell state updates for a candidate PSCell according to an embodiment of the disclosure.

FIG. 4 is a schematic diagram of a process for indicating cell state updates for a candidate PSCell according to an embodiment of the disclosure.

FIG. 4 shows a schematic diagram of a process in which the master node indicates PSCell state information to the candidate secondary node, the source secondary node and the UE when the location of the UE changes or the load of the candidate target PSCell or the load state of the candidate secondary node changes, and describes that the master node determines the location of the UE according to the measurement result transmitted by the UE or through the measurement of the UE uplink signal by the master node or through the UE location information provided by the source secondary node. According to the location information of the UE, the master node determines the distance between UE and the candidate secondary node or candidate PSCell, and determines a possibility of UE accessing to the candidate PSCell, so as to determine the state of the candidate PSCell, alternatively, according to the received load information of the candidate PSCell or the candidate secondary node transmitted by the candidate secondary node, the master node determines the state of the candidate PSCell, and transmits the state information to the candidate secondary node and/or the UE and/or the source secondary node. Wherein, the source secondary node determines the location of the UE through the measurement result reported by the UE. If there is an SRB3 configured, the measurement result will be transmitted by the UE to the source secondary node; or if there is no SRB3 configured, the measurement result will be transmitted by the UE to the master node, and then forwarded to the source secondary node by the master node. By this method, unnecessary network processing overhead caused by data forwarding is reduced, measurements by the UE are reduced, and energy for the UE is saved, and efficient utilization of cell resources is also improved.

In an embodiment, the master node may, through operation 401, directly obtain the measurement result of the UE or measure the uplink signal of the UE to determine the location information of the UE, or through operation 404, obtain the location information of the UE provided by the source secondary node. According to the location information of the UE, the master node determines the location of the UE and the candidate PSCell or the candidate secondary node, thereby determining the state of the candidate PSCell, and deciding whether it is needed to transmit a message to the UE and/or the candidate target node and/or the source secondary node to indicate the state of the candidate PSCell.

In an embodiment, the source secondary node may, through operation 402, directly obtain a measurement result reported by the UE (if SRB3 is configured), or may, through operations 403*a* and 403*b*, obtain the measurement result of the UE forwarded through the master node (if SRB3 is not configured). The source secondary node determines location information of the UE according to the obtained measurement result of the UE, and transmits the location information of the UE to the master node through operation 404, for determining the state of the candidate PSCell.

Operation 401: The UE transmits a first UE measurement report message to the master node (MN), providing a measurement result of candidate cells. According to the measurement result of the candidate cell provided by the UE, the MN determines a current distance of the UE from the candidate cell and estimates a probability for UE to access the candidate cell, and determines whether the state of the candidate PSCell needs to be changed. This message contains at least one piece of the following information:

Cell List Information, containing identities of respective candidate cells, which may be a physical cell identity PhysCellId or another identity.

Cell Measurement Result, which may be an SSB measurement result of the cell or a CSI-RS measurement result of the cell.

The first UE measurement report message may be a MeasurementReport message, or another message.

Operation 402: The UE transmits a second UE measurement report message to the source secondary node S-SN, providing the measurement result of the candidate cell. According to the measurement result of the candidate cell provided by the UE, the S-SN determines a current location of the UE from the candidate cell and provides the location information to the MN. This message contains at least one piece of the following information:

Cell List Information, containing identities of respective candidate cells, which may be a physical cell identity PhysCellId or another identity.

Cell Measurement Result, which may be an SSB measurement result of the cell or a CSI-RS measurement result of the cell.

The second UE measurement report message may be a MeasurementReport message, or another message.

Operation 403*a*: The UE transmits a third UE measurement report to the master node, and forwards the measurement report message to the source secondary node through the master node. This message may be a ULInformationTransferMRDC message, or another message.

Operation 403*b*: The master node transmits a fourth UE measurement report to the source secondary node, and forwards the measurement report message from the UE to the source secondary node. This message may be an RRC TRANSFER message, or another message.

The source secondary node receives the measurement report message from the UE, and the content of the measurement report message and the processing by the secondary node are the same as those in operation 402, and will not be detailed here.

Operation 404: The source secondary node transmits an information report message to the master node, for transmitting the location information of the UE or the candidate cell state information to the master node. This message contains at least one piece of the following information:

Location Information of UE, which may be an identity of the secondary cell where the UE is located, and may indicate a CGI of a cell or another identity.

Candidate Cell State Information, indicating whether the candidate cell is in an activated state or a deactivated state. According to such information, the master node may determine the candidate cell state information to be transmitted to the UE and the candidate secondary node respectively. The source secondary node determine the location of the UE from the candidate cell according to the measurement result of the UE obtained in operation 402 or 403*b*, thereby determining the candidate cell state.

The UE information report message may be an S-NODE MODIFICATION REQUIRED message, or another message.

Operation 405: The candidate secondary node T-SN1 transmits a load state indication message to the master node (MN), indicating the cell load state of the T-SN1. The MN determines the state of the candidate PSCell of UE which is in the T-SN1 according to the cell load state of the T-SN1. When the MN is in a process for adding a candidate secondary node, the candidate secondary node may provide the load state of its cells or nodes. If the cell load state or node load state of the candidate secondary node changes, the information of the load state needs to be provided to the MN. This message contains at least one piece of the following information:

Cell Identification Information, which may be a Cell ID or a Global NG-RAN Cell Identity or other identity information, including information of a PLMN Identity and an NR Cell Identity.

Cell Load State Information, which indicates the load state of the cell. For example, the load state may indicate a level of load, a percentage of load and capacity, and whether it is overloaded or not.

This message may be a RESOURCE STATUS UPDATE message, or another message.

Operation 406: The master node determines a state of the candidate PSCell according to the location information of the UE or the load state of the candidate cell or the candidate secondary node, and decides whether it is needed to transmit a message to the UE and/or the candidate target node and/or the source secondary node to indicate the state of the candidate PSCell.

The master node may, through operation 401, directly obtain the measurement result of the UE and determine the location information of the UE, or through operation 404, obtain the location information of the UE from the source secondary node, or alternatively, the master node may determine the location information of the UE by measuring the uplink signal of the UE. According to the location information of the UE, the master node determines the locations of the UE to the candidate PSCell or the candidate secondary node, and determines the state of the candidate PSCell. The master node may also obtain the cell load state or node load state of the candidate secondary node according to operation 405, so as to obtain the load state of the candidate PSCell of the UE or the load state of the candidate secondary node. The master node determines the state of the candidate PSCell according to the location of the UE and/or the load state of the candidate PSCell or the candidate secondary node, and decides whether it is needed to transmit a message to the UE and/or the candidate target secondary node and/or the source secondary node to indicate the state of the candidate PSCell. If the UE is not far from the candidate cell or the candidate target secondary base station and the current load of the cell is not heavy, then the state of this cell is set to the activated state. If the UE is far away from the candidate cell or the candidate target secondary base station, or the current load of the cell is heavy, then the state of this cell may be set to be deactivated.

Operation 407: The master node transmits state indication information to the UE, indicating state information of the candidate PSCell. This message contains at least one piece of the following information:

Candidate PSCell List Information, including identification information of respective candidate PSCells, which may be a conditional configuration identity condReconfigId or a Cell Index or a CGI or other identification information.

State Indication Information of the Candidate PSCell, indicating the state of the PSCell. According to the state indication information, the UE decides whether it is needed to monitor the candidate PSCell. If this information indicates that the PSCell is in an activated state, the UE needs to execute CPC monitoring on this cell; or if this information indicates that the PSCell is in a deactivated state, the UE is not needed to execute CPC monitoring on this cell. Unnecessary detection and evaluation of signal quality of candidate cells by the UE may be reduced, thus reducing power consumption for UE. The state indication information may be transmitted either through an RRC message or through MAC.

If it is transmitted through an RRC message, an RRCReconfiguration message, an RRCConnectionReconfiguration or another message may be applied.

If it is transmitted through MAC, a MAC control element (MAC CE) may be applied to transfer the candidate cell state information. The specific structure of MAC CE is given in "A Method of Indicating Candidate Cell State to UE".

Operation 408: The master node transmits a secondary node modification request message to the candidate secondary node, indicating the candidate PSCell state information. This message contains at least one piece of the following information:

Candidate PSCell List Information, including identification information of respective candidate PSCells, which may be a PSCell ID or a CGI or other identification information.

State Indication Information of the Candidate PSCell, indicating a state of a candidate PSCell. If an activated state is indicated, the candidate secondary node saves the context information and configuration of the UE in this candidate PSCell, and the resources reserved for the UE cannot be allocated to other Ues. If a deactivated state is indicated, the candidate secondary node saves the context information and configuration of the UE in this PSCell, and may temporarily allocate the resources reserved for the UE in this candidate PSCell to other users for use; if there is buffered data of the UE, the buffered data will be deleted.

CPAC Keep-Valid Indication Information. If this indication information exists and is set to Trigger, it indicates that the UE will continue to apply the CPC mechanism for PSCell changing after completing the CPC execution and accessing to the target secondary node (or a new PSCell), and the network will not be needed to re-initiate the CPC process. If this indication information exists and is set to Stop, then the UE will not continue to apply the CPC mechanism for PSCell changing after completing the CPC execution and accessing to the target secondary node (or a new PSCell). The target secondary node will follow the existing mechanism, and if the CPC mechanism needs to be applied, configuration will be needed to re-initiate the CPC process.

The secondary node modification request message may be an S-NODE MODIFICATION REQUEST message, a SENB MODIFICATION REQUEST message, or another message.

Operation 409: The master node transmits an address indication message to the source secondary node (S-SN), for transmitting a data forwarding address and data forwarding indication information to the S-SN. The MN indicates whether the S-SN needs to transmit data to the data forwarding address according to the PSCell state. If direct data forwarding is applied in data forwarding, that is, the data is directly transmitted to the candidate secondary node through the source secondary node (S-SN), the master node transmits the data forwarding address provided by the candidate secondary node to the S-SN. If indirect data forwarding is applied in data forwarding, that is, the data of the S-SN is forwarded to the candidate secondary node through the MN, then the MN transmits the data forwarding address information of the MN to the S-SN through this message. This message contains at least one piece of the following information:

Data Forwarding Address Information, indicating transport layer address information for data forwarding, including an IP address and a tunnel identity.

Data Forwarding Indication Information, indicating whether the source secondary node needs to perform data forwarding to this address. If the indication information is Stop, then the source secondary node will not perform data forwarding to this address, or if the indication information is Trigger, then the source secondary node will perform data forwarding to this address.

The address indication message may be an Xn-U Address Indication message, or another message.

Example 3: Process for Indicating Cell State after Secondary Node Change

Figure 5:
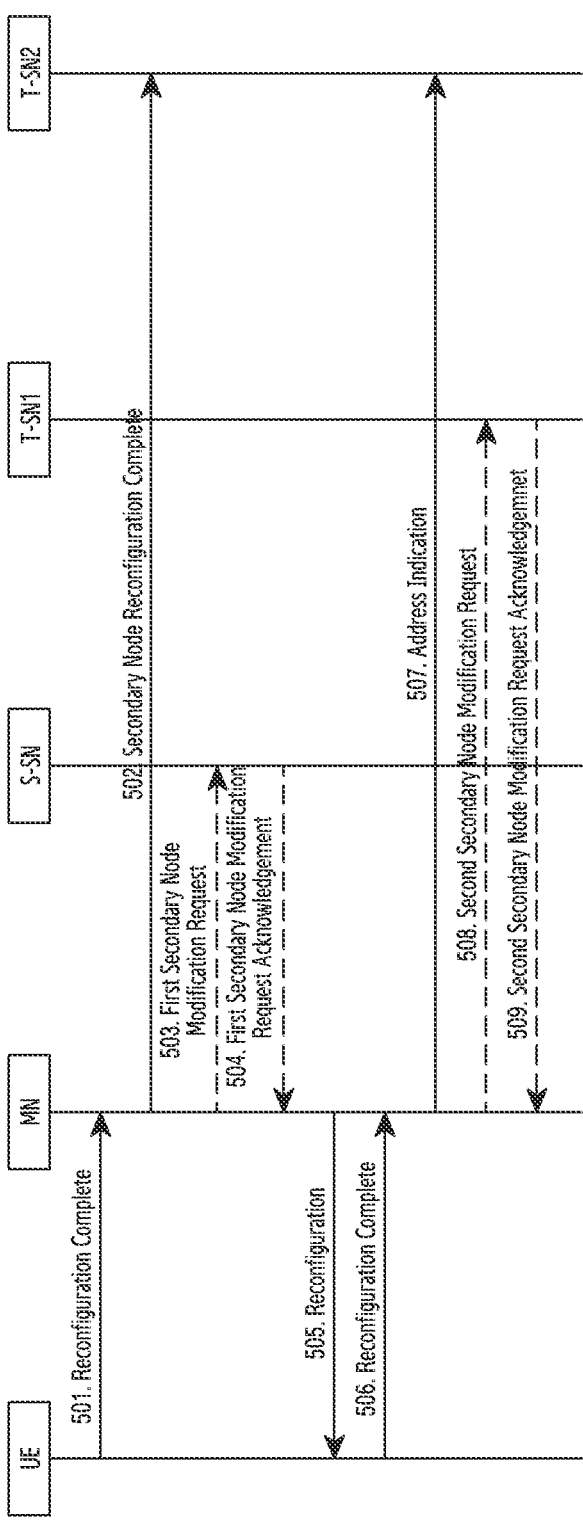
FIG. 5 is a schematic diagram of a process for indicating candidate cell states after a secondary node change according to an embodiment of the disclosure.

FIG. 5 is a schematic diagram of a process for indicating candidate cell states after a secondary node change according to an embodiment of the disclosure.

FIG. 5 shows a process for indicating a PSCell state where a serving PSCell change causes a candidate PSCell state change.

When the CPC execution conditions are fulfilled, and the UE selects a new PSCell and transmits a reconfiguration complete message to the MN, the MN needs to indicate to the target secondary node whether CPAC come into effect directly. If early data forwarding is supported, the MN also needs to transmit the data forwarding address to the target secondary node. If the MN regards the source secondary node as the candidate secondary node of the UE, the MN needs to instruct the source secondary node to configure a candidate PSCell, CPC configuration information and a data forwarding address for the UE. The MN transmits the candidate PSCell list information and CPC configuration information provided by the source secondary node to the UE, and transmits the data forwarding address information to the target secondary node for data forwarding. If the state of the candidate PSCell changes, the MN also needs to transmit the state indication information of the candidate PSCell of the node to the UE and/or other secondary nodes, and transmit the data forwarding indication information to the new secondary node. Through this process, unnecessary reconfiguration processing and RRC signaling overhead by network equipment and UE are avoided, while unnecessary network processing overhead caused by data forwarding is reduced, energy for UE is saved, and efficient utilization of resources is improved.

Operation 501: The UE transmits a reconfiguration complete message to the MN, indicating that a candidate PSCell fulfills the CPC execution conditions, and the UE has selected a target PSCell. The MN determines a corresponding target secondary node T-SN2 according to the target PSCell information provided by the UE. This message contains at least one piece of the following information:

SCG Response (Scg-Response) information element, which contains an RRC reconfiguration complete message of a target PSCell selected by the UE.

Identification Information of the Target PSCell, indicating an identity of a PSCell selected by the UE, which may be a conditional configuration identity condReconfigId or a PSCell ID or a CGI or other identification information.

The reconfiguration complete message may be an RRCReconfigurationComplete message, an RRCConnectionReconfigurationComplete message, or another message.

Operation 502: The master node transmits a secondary node reconfiguration complete message to the target secondary node T-SN2, forwards the secondary node reconfiguration complete message transmitted by the UE to the target secondary node, indicates to the target secondary node that the UE selects one of the candidate PSCells belonging to the target secondary node as the target PSCell, and at the same time, indicates to the target secondary node whether CPC keeps valid and/or data forwarding information. If this target secondary node configures other candidate PSCells for the UE in addition to the target PSCell, if these cells may continue to act as candidate PSCells for the UE after the UE accesses to the target PSCell, the MN will instruct T-SN2 to save the UE context information and the UE's CPC configuration information of these candidate PSCells. The MN may also provide T-SN2 with the state indication information of these candidate PSCells. This message contains at least one piece of the following information:

CPAC Keep-Valid Indication Information, indicating to the target secondary node that CPC has been configured for the UE and the UE continues to apply CPC mechanism for PSCell changing after accessing the target secondary node.

CPAC Keep-Valid Indication Information. If this indication information exists and is set to Trigger, it indicates that CPC has been configured for the UE and the UE continues to apply CPC mechanism for PSCell changing after accessing to the target secondary node. If this indication information exists and is set to Stop, it indicates to the target secondary node that the UE will not continue to apply the CPC mechanism for PSCell changing, after completing CPC execution and accessing to the target secondary node (or a new PSCell). The target secondary node will follow the existing mechanism, and if the CPC mechanism needs to be applied, configuration will be needed to re-initiate the CPC process.

Candidate PSCell List Information, including identification information of respective candidate PSCells, which may be a PSCell ID, a CGI or other identification information. This may indicate that the target secondary node continue to regard such cells as candidate PSCells of the UE, and save UE context information as well as information of CPC resources allocated to the UE on the candidate PSCells.

State Indication Information of the Candidate PSCell, indicating a state of a candidate PSCell. If an activated state is indicated, the target secondary node saves the context information and configuration of the UE in this candidate PSCell, and reserve resources for the UE which cannot be used by other Ues. If a deactivated state is indicated, the target secondary node saves the context information and configuration of the UE in this PSCell, and may temporarily allow the resources reserved for the UE in this candidate PSCell to be used by other users; if there is buffered data of the UE, the buffered data will be deleted.

CPAC Execution Conditions. If it is a CPC process triggered by the SN, the master node transmits the CPAC execution conditions of the source secondary node to the target secondary node.

The data forwarding information, containing at least one piece of the following information:

Data forwarding address information, indicating the transport layer address information for data forwarding, including an IP address and a tunnel identification. It is used in performing data forwarding to said address by the T-SN2 when early data forwarding is supported.

Data forwarding indication information, indicating whether the T-SN2 needs to perform data forwarding to said address. If the indication information is "stop", then the T-SN2 will not perform data forwarding to said address. If the indication information is "trigger", then the T-SN2 will perform data forwarding to said address.

The secondary node reconfiguration complete message may be S-NODE RECONFIGURATION COMPLETE, or another message.

Operation 503: The MN transmits a first secondary node modification request message to the S-SN. If the MN selects the source secondary node as the candidate secondary node of the UE, the MN may transmit a secondary node modification request message instead of a secondary node release message to the source secondary node, indicating to the source secondary node SN (S-SN) that the UE has selected a new PSCell and to stop transmitting data to the UE. It will also instruct the source secondary node, as the candidate target node of the UE, to select the candidate PSCell for the UE, and allocate and provide configuration information for CPC and a data forwarding address. This message contains at least one piece of the following information:

Identification Information of the UE, including an identity of the UE on the master base station (M-NG-RAN node UE XnAP ID) and an identity of the UE on the secondary base station (S-NG-RAN node UE XnAP ID).

Serving PSCell Change Indication Information, indicating that the UE has selected a new PSCell as the serving PSCell.

Selected PSCell Identity, identifying a new PSCell selected by the UE, which may be a PSCell ID, a CGI or other identification information.

CPAC-Related Information, which may be set as a CPA information request (Conditional PSCell Addition Information Request) IE. The message contains this information element, instructing the source secondary node, as the candidate secondary node of the UE, to allocate necessary resources for the UE. The CPA information request information element contains:

Maximum Number of PSCells to Prepare, indicating a maximum number of candidate PSCells that the secondary node T-SN1 may provide. This information may be the maximum number of PSCells prepared;

Estimated Arrival Probability, indicating a possibility that a UE will access to this secondary node T-SN1. This information may be set to a value between 1 and 100. The higher the value, the higher the possibility that the UE will access to this candidate target secondary node.

CPAC Keep-Valid Indication Information. If this indication information exists and is set to Trigger, it indicates that the UE will continue to apply the CPC mechanism for PSCell changing after completing the CPC execution and accessing the target secondary node (or a new PSCell), and the network will not be needed to re-initiate the CPAC process. If this indication information exists and is set to Stop, then the UE will not continue to apply the CPC mechanism for PSCell changing after completing the CPC execution and accessing to the target secondary node (or a new PSCell). The target secondary node will follow the existing mechanism, and if the CPC mechanism needs to be applied, configuration will be needed to re-initiate the CPC process.

State Indication Information of the Candidate PSCell, indicating the state information of the candidate PSCell configured by the candidate target secondary node for the UE. If an activated state is indicated, the candidate target secondary node sets up context information for the candidate PSCell selected for the UE and reserves resources for the UE, wherein the resources cannot be used by other Ues. If a deactivated state is indicated, the candidate target secondary node sets up context information for the candidate PSCell selected for the UE and reserves resources for the UE, wherein the resources may be temporarily used by other Ues.

The first secondary node modification request message may be an S-NODE MODIFICATION REQUEST message, a SENB MODIFICATION REQUEST message, or another message.

Operation 504: The S-SN transmits a first secondary node modification request acknowledgement message to the MN. The S-SN, as a candidate secondary node, transmits candidate PSCell and CPC configuration information selected for the UE, state information of the candidate cell, such as load state information, and data forwarding address to the MN through this message. This message contains at least one piece of the following information:

Identification Information of the UE, including an identity of UE on the master node (M-NG-RAN node UE XnAP ID) and an identity of UE on the source secondary node (S-NG-RAN node UE XnAP ID).

CPAC requests acknowledgement information, indicating cell information of PSCell selected for the UE by the source secondary node as the candidate secondary node. This acknowledgement information may be a CPA information acknowledgement (Conditional PSCell Addition Information Acknowledgment) information element, which contains PSCell list information selected by the candidate secondary node for the UE, wherein the list information contains a PSCell ID that may be set as a NR CGI.

Candidate PSCell Configuration Information, indicating SCG radio resource configuration of the candidate Primary Secondary Cell selected by the secondary node for the UE. This information may be the load state indication information of PSCell, which indicates the load state of the candidate PSCell. For example, the load state may indicate a level of load, a percentage of load and capacity, and whether it is overloaded or not.

Container from Secondary Node to Master Node, containing a cell group candidate list message (CG-Candidat-eList) or a cell group configuration message (CG-Config), which is transmitted to the master node in a form of container by the candidate secondary node, and then transmitted to the UE by the master node.

Data Forwarding Address Information, indicating transport layer address information for data forwarding, containing an IP address and a tunnel identity. As a candidate secondary node, the source node needs to provide a data forwarding address for the serving node to perform data forwarding to the candidate target node.

The secondary node addition request confirmation message may be an S-NODE MODIFICATION REQUEST ACKNOWLEDGE message, a SENB MODIFICATION REQUEST ACKNOWLEDGE message, or another message.

Operation 505: The master node transmits a reconfiguration message to the UE, for transmitting an identity of candidate PSCell, state information of PSCell and configuration information for CPC to the UE. This message contains at least one piece of the following information:

SCG Configuration Message, contained in an mrdc-SecondaryCellGroup information element. This message is generated by the candidate secondary node and transmitted to the master node in a form of container, and then transmitted to the UE by the master node. It contains SCG radio resource configuration information for the candidate Primary Secondary Cell selected by the secondary node for the UE.

Candidate PSCell List Information, including identification information of respective candidate PSCells, which may be a conditional configuration identity condReconfigId or a PSCell ID or a CGI or other identification information.

CPC Execution Condition, indicating a condition that a measurement result of the candidate secondary cell needs to fulfill when the UE executes CPC.

Candidate PSCell State Indication Information, indicating a PSCell state. According to the state indication information, the UE decides whether it is needed to monitor the candidate PSCell. If this information indicates that the PSCell is in an activated state, the UE needs to execute CPC monitoring on this cell; or if this information indicates that the PSCell is in a deactivated state, the UE is not needed to execute CPC monitoring on this cell. Unnecessary detection and evaluation of signal quality of candidate cells by the UE may be reduced, thereby reducing power consumption for UE.

The reconfiguration message may be an RRCReconfiguration message, an RRCConnectionReconfiguration message, or another message.

Operation 506: The UE transmits a reconfiguration complete message to the master node, indicating that the UE has updated and saved the configuration information for CPC and the state information of candidate PSCells according to the configuration information transmitted by the MN.

The reconfiguration complete message may be an RRCReconfigurationComplete message, an RRCConnectionReconfigurationComplete message, or another message.

Operation 507: The MN transmits an address indication message to T-SN2. When the MN receives a reconfiguration complete message of the UE, it provides address information for data forwarding to the target secondary node, indicating to initiate a CPC process. If early data forwarding is supported, the target secondary node T-SN2 performs data forwarding according to the received address information. If direct data forwarding is applied in data forwarding, that is, the target secondary node T-SN2 transmits to the candidate secondary node, the MN transmits the data forwarding address information of the candidate secondary node and the CPC data forwarding indication information to the T-SN2 through this message. If indirect data forwarding is applied in data forwarding, that is, data of T-SN2 is forwarded to the candidate secondary node through the MN, then the MN transmits the data forwarding address information of the MN to T-SN2 through this message. This message contains at least one piece of the following information:

Data Forwarding Address Information, indicating transport layer address information for data forwarding, including an IP address and a tunnel identity.

Data Forwarding Indication Information, indicating whether the source secondary node needs to perform data forwarding to this address. If the indication information is Stop, then the source secondary node will stop performing data forwarding to this address, or if the indication information is Trigger, then the source secondary node will perform data forwarding to this address.

The address indication message may be an Xn-U Address Indication message, or another message.

Operation 508: The MN transmits a second secondary node modification request message to T-SN1. When the PSCell of the UE changes, if the candidate PSCell state changes, the MN transmits PSCell state indication information to the candidate secondary node to which the candidate PSCell belongs, and/or indicates to the T-SN1 that the UE has accessed to the target PSCell, and indicates the T-SN1 to discard or delete stored UE data. The stored UE data is the data forwarded by the S-SN. Wherein, the data forwarded by the S-SN is transmitted to the T-SN1 by the S-SN using a direct data forwarding mode, or is transmitted to the T-SN1 by the MN using an indirect data forwarding mode. If the TSN1 is in the CU/DU split mode, when T-SN1 CU-CP receives the indication to discard or delete the stored UE data, it will transmit the indication information to T-SN1 CU-UP, to indicate it to discard or delete the stored UE data. The indication information may be transmitted through a BEARER CONTEXT MODIFICATION REQUEST or other messages. This message contains at least one piece of the following information:

Candidate PSCell List Information, including identification information of respective candidate PSCells, which may be a PSCell ID or a CGI or other identification information.

State Indication Information of the Candidate PSCell, indicating a state of a candidate PSCell. If an activated state is indicated, the candidate secondary node saves the context information and configuration of the UE in this candidate PSCell, and the resources reserved for the UE cannot be allocated to other Ues. If a deactivated state is indicated, the candidate secondary node saves the context information and configuration of the UE in this PSCell, and may temporarily allocate the resources reserved for the UE in this candidate PSCell to other users for use; if there is buffered data of the UE, the buffered data will be deleted.

CPAC Keep-Valid Indication Information. If this indication information exists and is set to Trigger, it indicates that the UE will continue to apply the CPC mechanism for PSCell changing after completing the CPC execution and accessing to the target secondary node (or a new PSCell), and the network will not be needed to re-initiate the CPC process. If this indication information exists and is set to Stop, then the UE will not continue to apply the CPC mechanism for PSCell changing after completing the CPC execution and accessing to the target secondary node (or a new PSCell). The target secondary node will follow the existing mechanism, and if the CPC mechanism needs to be applied, configuration will be needed to re-initiate the CPC process.

Target Cell Identity, which indicates that the UE has accessed to the target PSCell and that the T-SN1 may discard or delete the stored UE data.

Data Discarding or Deleting Indication. The T-SN1 may discard or delete the stored UE data.

The second secondary node modification request message may be an S-NODE MODIFICATION REQUEST message, a SENB MODIFICATION REQUEST message, or another message.

Operation 509: T-SN1 transmits a second secondary node modification request acknowledgement message to the MN, indicating that T-SN1 has received the state information of the candidate PSCell and/or that the T-SN1 has completed discarding or deleting the stored UE data.

The second secondary node modification request acknowledgement message may be an S-NODE MODIFICATION REQUEST ACKNOWLEDGE message, a SENB MODIFICATION REQUEST ACKNOWLEDGE message, or another message.

When the UE accesses to the target PSCell, it will report the measurements of the PSCell candidate cell according to the requirements of the MN or the target SN. The MN or the target SN determines whether the UE needs to trigger the CPC process according to the measurement results of the UE. If the MN or the target SN determines that the CPC process needs to be triggered, it transmits an indication message to the UE to trigger the UE to start monitoring the CPC execution conditions. The indication message may be status indication information or other messages. At this time, when the UE receives the indication message, it starts to monitor the CPC execution conditions.

If the indication message is transmitted by the MN to the UE, the MN will transmit a message to instruct the target SN to perform early data forwarding, to transmit data to the candidate SN;

If the indication message is transmitted by the target SN to the UE, the target SN performs early data forwarding to transmit data to the candidate SN;

Wherein, if the target SN is a CU/DU split structure, when the target SN performs early data forwarding, the target SN CU-CP indicates the SN CU-UP to transmit data to the candidate SN.

Example 4: Process for Indicating Candidate Cell State During CPC Configuration with a CU/DU Split Structure FIG. 6 is a schematic diagram of a process for indicating candidate cell states during a CPC configuration with a Centralized Unit (CU)/Distributed Unit (DU) split structure according to an embodiment of the disclosure.

Figure 6:
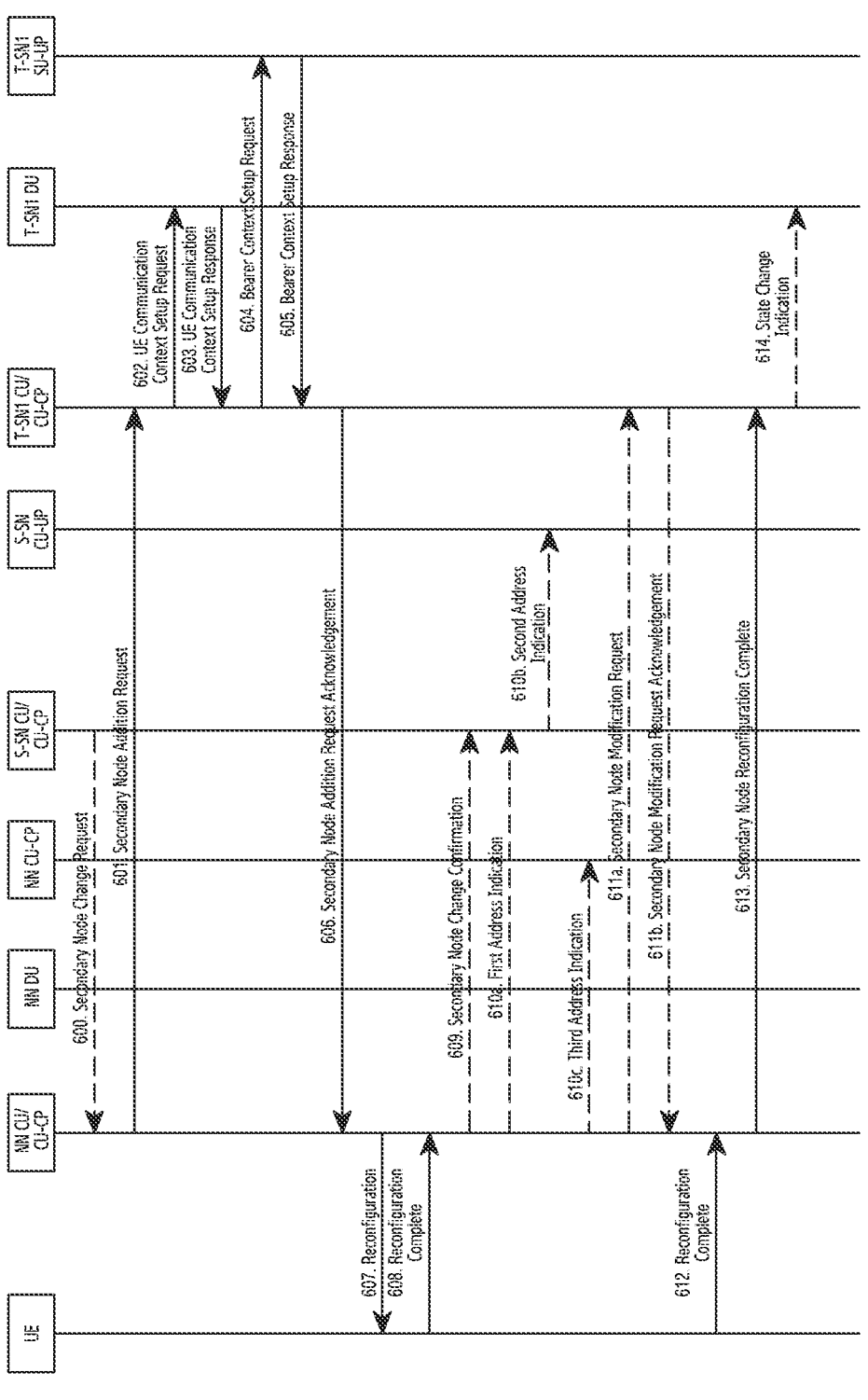
FIG. 6 is a schematic diagram of a process for indicating candidate cell states during a CPC configuration with a Centralized Unit (CU)/Distributed Unit (DU) split structure according to an embodiment of the disclosure.

FIG. 6 shows a schematic diagram of a process in which the MN indicates PSCell state information and/or CPAC Keep-Valid indication information to the candidate secondary node (SN) and the UE when the network node is a CU/DU split structure, and describes a method in which the MN decides the candidate PCSell state and/or whether the CPAC configuration keeps valid and transmits such information to the candidate secondary node and/or the UE during a process for configuring target candidate secondary node by the MN. By this method, unnecessary reconfiguration processing and RRC signaling overhead by network equipment and UE may be avoided, measurements by the UE are reduced, and energy for the UE is saved.

Referring to FIG. 6, the network configures a dual connectivity for the UE, in which a first node is the master base station (MN), a second node is the terminal (UE), a third node is the source secondary base station (S-SN), and the MN needs to add a fourth node T-SN1 as the candidate secondary base station. Wherein, CPC mechanism is applied to initiate a secondary base station change, which may be triggered either by the master node or by the source secondary base station (through operation 600). For a CPAC keeping unchanged mechanism, it is needed to indicate the CPAC keeping unchanged mechanism to the candidate secondary base station and provide a list of all candidate cells. There are two methods of providing the indication information and the list information, and the specific method is the same as that in Example 1, which will not be detailed here.

Operation 600: The S-SN CU or S-SN CU-CP transmits a secondary node change request message (S-NODE CHANGE REQUIRED or SGNB CHANGE REQUIRED) or another message to the master base station, instructing the master node to initiate the CPC mechanism for secondary node change and to apply the CPAC mechanism. This operation is the same as operation 300, and will not be detailed here.

Operation 601: The MN CU or MN CU-CP transmits a secondary node addition request message to the candidate target secondary node T-SN1, indicating that the candidate secondary node will configure CPAC for the UE and requesting the candidate secondary node to allocate resources for the UE. This operation is the same as operation 301, and will not be detailed here.

If T-SN1 is in a CU/DU split structure, operations 602-605 are needed to be further executed, to complete the setup of UE communication context between the CU-CP and the DU in T-SN1, the setup of bearer context between the CU-CP and the UP, to obtain the load state indication information provided by the DU and the CU-UP.

Operation 602: The T-SN1 CU/CU-CP transmits a UE communication context setup request message (UE CONTEXT SETUP REQUEST), or another message, to the T-SN1 DU, indicating a candidate PSCell ID used for CPC to T-SN1 DU, and instructing T-SN1 DU to set up a communication context for the UE and provide the setup bearer information as well as candidate PSCell state indication. This message contains at least one piece of the following information:

Candidate PSCell Information, indicating an identity of PSCell, which may be a PSCell ID, a CGI or another identity.

State Indication Information of the Candidate PSCell, indicating whether a state of PSCell is activated or deactivated. If an activated state is indicated, the candidate secondary node T-SN1 DU sets up context information and configuration for the UE in this candidate PSCell, and the resources reserved for the UE cannot be allocated to other Ues. If a deactivated state is indicated, the T-SN1 DU sets up context information and configuration for the UE on this PSCell, and the resources reserved for the UE may be temporarily allocated to other users.

Operation 603: The T-SN1 DU transmits a UE communication context setup response message (UE CONTEXT SETUP RESPONSE) or another message to the T-SN1 CU/CU-CP. The CG configuration information for the UE in the candidate PSCell and the information of the load state of the candidate PSCell are transmitted. This message contains at least one piece of the following information:

Candidate PSCell Information, indicating an identity of PSCell, which may be a PSCell ID, a CGI or another identity.

RRC information from DU to CU includes information such as CG configuration of the UE in the candidate PSCell.

Candidate PSCell Load State Information, indicating the load state of the candidate PSCell. For example, the load state may indicate a level of load, a percentage of load and capacity, and whether it is overloaded or not.

Operation 604: The T-SN1 CU/CU-CP transmits a bearer context setup request message (BEARER CONTEXT SETUP REQUEST) or another message to the T-SN1 CU-UP, requesting the T-SN1 CU-UP to provide traffic plane configuration, data forwarding address information and the state of the CU-UP.

Operation 605: The T-SN1 CU-UP transmits a bearer context setup response message (BEARER CONTEXT SETUP RESPONSE) or another message to the T-SN1 CU/CU-CP. The traffic plane configuration, as well as the information of data forwarding address and the load state of the CU-UP are transmitted. This message contains at least one piece of the following information:

Data Forwarding Address Information, indicating transport layer address information for data forwarding, including an IP address and a tunnel identity.

Load State Information, indicating the load state of the CU-UP. For example, the load state may indicate a level of load, a percentage of load and capacity, and whether it is overloaded or not.

Operation 606: The candidate target SN (T-SN1) transmits a secondary node addition request acknowledgement message (S-NODE ADDITION REQUEST ACKNOWLEDGE) or another message to the MN, and the T-SN1 transmits configuration information and state information, such as load state information, of the candidate cell selected for the UE to the MN CU/MN CU-CP. The MN obtains the load state of the candidate PSCell through the state indication information provided by the T-SN1, and obtains the location information of the UE through a measurement report of the UE or measurement of a UE uplink signal by the MN. Through such information, the MN may determine the state of candidate PSCell. How to determine the state of the candidate PSCell is the same as that in operation 302, and will not be detailed here.

Operation 607: The MN CU/CU-CP transmits a reconfiguration message to the UE, for transmitting configuration information for CPC to the UE. The reconfiguration message may be an RRCReconfiguration message, an RRCConnectionReconfiguration message, or another message. This step is the same as operation 303, and will not be detailed here.

Operation 608: The UE transmits a reconfiguration complete message to the MN CU/CU-CP, indicating that the UE has completed configuration except for CPC according to the configuration information transmitted by the MN, and saved the configuration information for CPC.

The reconfiguration complete message may be an RRCReconfigurationComplete message, an RRCConnectionReconfigurationComplete message, or another message.

If this CPC process is triggered by the source secondary base station (i.e., through operation 600), then operation 609 needs to be executed, and operation 610*a* doesn't need to be executed. If it is triggered by the master base station, then operation 600 does not need to be executed, and operation 610*a* needs to be executed.

Operation 609: The MN (MN CU/CU-CP) transmits a secondary node change confirmation message (S-Node CHANGE CONFIRM or SGNB CHANGE CONFIRM) or another message to the S-SN (S-SN CU/CU-CP), indicating that the CPC is ready. If early data forwarding is supported, the source secondary node performs data forwarding according to the received address information.

Operation 610*a*: The MN (MN CU/CU-CP) transmits a first address indication message (Xn-U Address Indication) or another message to the S-SN (S-SN CU/CU-CP). When the MN receives the reconfiguration complete message of the UE, it provides the S-SN with address information for data forwarding, indicating to initiate the CPC process. If early data forwarding is supported, the source secondary node performs data forwarding according to the received address information.

If direct data forwarding is applied in data forwarding, that is, the S-SN directly transmits data to the candidate secondary node T-SN1, the MN transmits the data forwarding address information and data forwarding indication information of the candidate secondary node T-SN1 to the S-SN through this message, and then the S-SN CU/CU-CP executes operation 610*b* to transmit the address information to the S-SN CU-UP, and the S-SN CU-UP transmits the data to the corresponding candidate secondary nodes according to the address information and the forwarding indication information. If indirect data forwarding is applied in data forwarding, that is, the data of the S-SN is forwarded to the candidate secondary node through the MN, then the MN transmits the data forwarding address information of the MN to the S-SN through this message, and the MN CU/CU-CP executes operation 610*c* to transmit the data forwarding address information and data forwarding indication information of the candidate secondary node T-SN1 to the MN CU-UP, and the MN CU-UP forwards the data forwarded by the S-SN to the corresponding candidate secondary nodes according to the address information and the forwarding indication information.

Operation 610*b*: The S-SN CU-CP transmits a second address indication message to the S-SN CU-UP, indicating the data forwarding address and the data forwarding state indication information. This message contains at least one piece of the following information:

Data Forwarding Address Information, indicating transport layer address information for data forwarding, including an IP address and a tunnel identity.

Data Forwarding Indication Information, indicating whether it is needed to perform data forwarding to this address. If the indication information is Stop, data forwarding to the address is not needed to be performed, or if the indication information is Trigger, data forwarding to the address needs to be performed.

The second address indication message may be a BEARER CONTEXT MODIFICATION REQUEST message, or another message.

Operation 610*c*: The MN CU/CU-CP transmits a third address indication message to the MN CU-UP, indicating the data forwarding address and the data forwarding indication information. This message contains at least one piece of the following information:

Data Forwarding Address Information, indicating transport layer address information for data forwarding, including an IP address and a tunnel identity.

Data Forwarding Indication Information, indicating whether it is needed to perform data forwarding to this address. If the indication information is Stop, data forwarding to the address is not needed to be performed, or if the indication information is Trigger, data forwarding to the address needs to be performed.

The third address indication message may be a BEARER CONTEXT MODIFICATION REQUEST message, or another message.

Operation 611*a*: The MN (MN CU/CU-CP) transmits a secondary node modification request message (S-NODE MODIFICATION REQUEST) or another message to the T-SN (T-SN1 CU/CU-CP), and the master base station transmits the candidate cell information of all candidate target secondary nodes to the candidate secondary node. This message contains at least one piece of the following information:

Candidate PSCell List Information, including identification information of respective candidate PSCells of the current UE, which may be a PSCell ID, a CGI or other identification information and/or data forwarding information, wherein the details of the data forwarding information are shown in 305*c*, and are not repeated here.

Operation 611*b*: The T-SN1 (T-SN1 CU/CU-CP) transmits a secondary node modification request acknowledgement message (S-NODE MODIFICATION REQUEST ACKNOWLEDGE) or another message to the MN (MN CU/CU-CP), and the candidate secondary base station indicates to the master base station that it has received corresponding information.

Operation 612: The UE transmits a reconfiguration complete message to the MN CU/CU-CP, indicating that a candidate PSCell fulfills the CPC execution conditions and the UE has selected a target PSCell. This operation is the same as operation 306, and will not be detailed here.

Operation 613: The MN CU/CU-CP transmits a secondary node reconfiguration complete message to the target secondary node T-SN1 CU/CU-CP, and forwards the secondary node reconfiguration complete message transmitted by the UE to T-SN1, indicating to T-SN1 that the UE has selected one of the candidate PSCells belonging to T-SN1 as the target PSCell, and indicating to the T-SN1 whether the CPC keeps valid. If this target secondary node configures other candidate PSCells for the UE in addition to the target PSCell, if such cells may continue to be candidate PSCells for the UE after UE accessing to the target PSCell, the MN will instruct T-SN1 to save the UE context information and the CPC configuration information of the UE in these candidate PSCells. The MN may also provide T-SN1 with state indication information of these candidate PSCell. This step is the same as operation 307, and will not be detailed here.

For a T-SN1 with a CU/DU split structure, the T-SN1 DU is responsible for allocating CPC resources for the UE. Therefore, if the target secondary base station allocates other candidate PSCells for the UE in addition to the target PSCell, if such candidate cells will also serve as candidate PSCells for the UE, the T-SN1 CU/CU-CP will decide whether to transmit indication information to the T-SN1 DU according to the candidate PSCell state indication information received from operation 613. If the received candidate PSCell state is different from the stored state, then operation 614 needs to be executed, otherwise no processing is needed.

Operation 614: The T-SN1 CU/CU-CP transmits a state change indication message to the T-SN1 DU, providing indication information of the candidate PSCell state. This message contains at least one piece of the following information:

Candidate PSCell Identification Information, which may be a PSCell ID or a CGI or cellIndex or other identification information.

Candidate PSCell State Indication Information, indicating a state of a candidate PSCell. According to this information, the T-SN1 DU obtains the state of the candidate PSCell and determines whether the reserved resources for the UE may be temporarily allocated to other users. If an activated state is indicated, the T-SN1 DU saves the context information and configuration of the UE in this candidate PSCell, and the resources reserved for the UE cannot be allocated to other Ues. If a deactivated state is indicated, the T-SN1 DU saves the context information and configuration of the UE in this PSCell, and the resources reserved for the UE in this candidate PSCell may temporarily be allocated to other users.

The state change indication message may be a UE CONTEXT MODIFICATION REQUEST message, or another message.

Example 5: Process for Indicating Candidate PSCell State Update with CU/DU Split Structure FIG. 7 is a schematic diagram of a process for indicating cell state updates for a candidate PSCell with a CU/DU split structure according to an embodiment of the disclosure.

Figure 7:
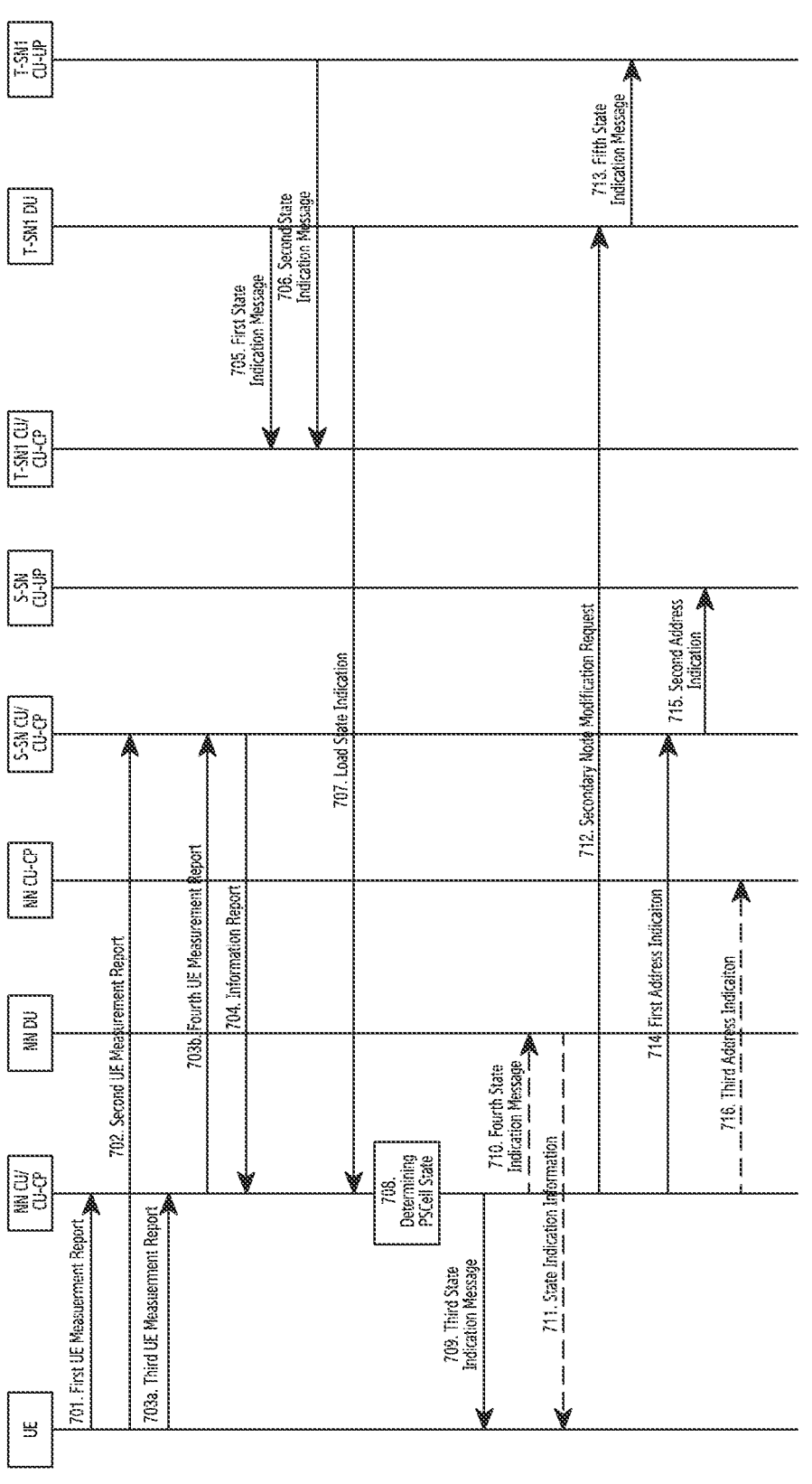
FIG. 7 is a schematic diagram of a process for indicating cell state updates for a candidate PSCell with a CU/DU split structure according to an embodiment of the disclosure.

FIG. 7 shows a schematic diagram of a process in which the MN CU/CU-CP indicates PSCell state information to the candidate secondary node, the source secondary node and the UE when the location of UE changes or the load of candidate target PSCell or the load state of candidate secondary node changes with a CU/DU split structure, and describes a method in which the MN CU/CU-CP determines the location of UE according to a measurement result transmitted by the UE or measurement of a UE uplink signal by the master node, determines the distance between UE and the candidate secondary node or candidate PSCell, and determines a possibility for UE to access the candidate PSCell, thereby determining the state of candidate PSCell, or alternatively, the MN CU/CU-CP receives load information of the candidate PSCell or the candidate secondary node transmitted by the candidate secondary node, determines the state of the candidate PSCell, and transmits this state information to the candidate secondary node and/or the UE and/or the source secondary node. Wherein, a measurement result report by the UE may either be directly transmitted to the master node, or may be transmitted to the source secondary node first, and then transmitted to the master node by the source secondary node. By this method, unnecessary network processing overhead caused by data forwarding is reduced, measurements by the UE are reduced, energy for the UE is saved, and efficient utilization of cell resources is also improved.

In an embodiment, the MN CU/CU-CP may, through operation 701, directly obtain the measurement result of the UE or measure UE uplink signal to determine the location information of the UE, or through operation 704, obtain the location information of the UE from the source secondary node S-SN CU/CU-CP. According to the location information of the UE, the MN CU/CU-CP determines the locations of the UE and the candidate PSCell or the candidate secondary node, thereby determining the state of the candidate PSCell, and deciding whether it is needed to transmit a message to the UE and/or the candidate target node and/or the source secondary node to indicate the state of the candidate PSCell.

The source secondary node S-SN CU/CU-CP may, through operation 702, directly obtain a measurement result reported by the UE (if SRB3 is configured), or may, through operations 703a and 703b, obtain the measurement result of the UE forwarded through the MN CU/CU-CP (if SRB3 is not configured). The S-SN CU/CU-CP determines location information of the UE according to the obtained measurement result of the UE, and transmits the location information of the UE or the candidate cell state information to the MN CU/CU-CP through operation 704 for determining the state of the candidate PSCell.

Operations 701-704: a process for obtaining UE location information by the MN CU/CU-CP is described, which is the same as that in operations 401-404, and will not be detailed here.

Operations 705-707: It is described that after the candidate secondary node T-SN1 CU/CU-CP obtains load state indication from the T-SN1 DU and/or the T-SN1 CU-UP, it determines the load state of the candidate PSCell or the candidate secondary node, and transmits the load state to the master node MN CU/CU-CP.

Operation 705: The T-SN1 DU transmits a first state indication message to the T-SN1 CU/CU-CP, for transmitting information of the load state related to the cell of T-SN1. This message contains at least one piece of the following information:

Cell Identification Information, which may be a Cell ID or a Global NG-RAN Cell Identity or CGI or another identity, including information of a PLMN Identity and an NR Cell Identity.

Cell Load State Information, which indicates the load state of the Cell. For example, the load state may indicate a level of load, a percentage of load and capacity, and whether it is overloaded or not.

The first state indication message may be a RESOURCE STATUS UPDATE message, a GNB-DU STATUS INDICATION message, or another message.

Operation 706: The T-SN1 CU-UP transmits a second state indication message to the T-SN1 CU/CU-CP, for transmitting the load information of the T-SN1 CU-UP. This message contains at least one piece of the following information:

Load State Indication Information, indicating the load state of the CU-UP of the candidate target node, for example, the load state may indicate a level of load, a percentage of load and capacity, whether it is overloaded or not, among other information.

The second state indication message may be a GNB-CU-UP STATUS INDICATION message, or another message.

Operation 707: The T-SN1 CU/CU-CP transmits a load state indication message to the MN CU/CU-CP, indicating the load state of the Cell of T-SN1. The MN determines the state of the UE in the candidate PSCell of T-SN1 according to the load state of the Cell of T-SN1. This message contains at least one piece of the following information:

Cell List Information, the identification information may be a Cell ID or a Global NG-RAN Cell Identity or a CGI or another identity, containing information of a PLMN Identity and an NR Cell Identity.

Cell Load State Information, indicating the load state of the Cell. For example, the load state may indicate a level of load, a percentage of load and capacity, and whether it is overloaded or not.

The load state indication message may be a RESOURCE STATUS UPDATE message, or another message.

Operation 708: The MN CU/CU-CP determines the state of the candidate PSCell according to the location information of the UE or the load state of the candidate cell or the candidate secondary node, and decides whether it is needed to transmit a message to the UE and/or the candidate target node and/or the source secondary node to indicate the state of the candidate PSCell.

The MN CU/CU-CP may, through operation 701, directly obtain the measurement result of the UE and determine the location information of the UE, or through operation 704, obtain the location information of the UE from the S-SN CU/CU-CP, or alternatively, the MN CU/CU-CP determines the location information of the UE by measuring the uplink signal of the UE. According to the location information of the UE, the MN CU/CU-CP determines the locations of the UE and the candidate PSCell or the candidate secondary node, and determines the state of the candidate PSCell. The MN CU/CU-CP may also obtain the cell load state or node load state of the candidate secondary node according to operation 707, so as to obtain the load state of the candidate PSCell of the UE or the load state of the candidate secondary node. The MN CU/CU-CP determines the state of the candidate PSCell of the UE according to the location of the UE and/or the load state of the candidate PSCell or the candidate secondary node, and decides whether it is needed to transmit a message to the UE and/or the candidate target node and/or the source secondary node to indicate the state of the candidate PSCell.

There are two ways for the MN CU/CU-CP to transmit the state indication information of the candidate PSCell to the UE, through either an RRC message or a MAC CE. If the state indication information of the candidate PSCell is transmitted to the UE through an RRC message, then operation 709 will be executed. If the state indication information of the candidate PSCell is transmitted to the UE through a MAC CE, then operations 710 and 711 will be executed when the MN with the CU/DU split structure.

Operation 709: The MN transmits a third state indication message to the UE, indicating a state of a candidate PSCell. This message contains at least one piece of the following information:

Candidate PSCell List Information, including identification information of respective candidate PSCells, which may be a conditional configuration identity condReconfigId or a PSCell ID or a CGI or other identification information.

State Indication Information of the Candidate PSCell, indicating the state of the PSCell. According to this state indication information, the UE decides whether it is needed to monitor the candidate PSCell. If this information indicates that the PSCell is in an activated state, the UE is needed to execute CPC monitoring on this cell; or if this information indicates that the PSCell is in a deactivated state, the UE is not needed to execute CPC monitoring on this cell.

The third state indication message may be an RRCReconfiguration message, an RRCConnectionReconfiguration message, or another message.

Operation 710: The MN CU/CU-CP transmits a fourth state indication message to the MN DU, indicating a state of a candidate PSCell. This message contains at least one piece of the following information:

Identification Information of the Candidate PSCell, which may be a PSCell ID or a CGI or other identification information.

State Indication Information of the Candidate PSCell, indicating whether a state of PSCell is activated or deactivated.

The MN DU fills in corresponding information according to a format of candidate cell state MAC CE.

The fourth state indication message may be a UE CONTEXT MODIFICATION REQUEST message, or another message.

Operation 711: The MN DU transmits state indication information to the UE, for transmitting indication information of the candidate PSCell state to the UE. This indication information is transmitted through a MAC CE, and the MN DU fills in corresponding information according to a format of candidate cell state MAC CE, and the corresponding information includes:

Candidate PSCell List Information, including identification information of respective candidate PSCells, which may be a conditional configuration identity condReconfigId or a Cell Index or a CGI or other identification information.

State Indication Information of the Candidate PSCell, indicating whether a state of PSCell is activated or deactivated. According to the state indication information, the UE decides whether it is needed to monitor the candidate PSCell. If this information indicates that the PSCell is in an activated state, the UE needs to execute CPC monitoring on this cell; or if this information indicates that the PSCell is in a deactivated state, the UE is not needed to execute CPC monitoring on this cell.

The specific structure of the format of the candidate cell state MAC CE is given in "A Method of Indicating Candidate Cell State to UE".

Operation 712: The MN CU/CU-CP transmits a secondary node modification request message to the T-SN1 CU/CU-CP, indicating the candidate PSCell state. Operation 712 is the same as operation 408, and will not be detailed here.

Operation 713: The T-SN1 CU/CU-CP transmits a fifth state indication message to the T-SN1 DU, indicating candidate PSCell state. This message contains at least one piece of the following information:

Identification Information of the Candidate PSCell, which may be a PSCell ID or a cellIndex or a CGI or other identification information.

State Indication Information of the Candidate PSCell, indicating the state of the candidate PSCell. If an activated state is indicated, the candidate secondary node T-SN1 DU saves the context information and configuration of the UE in this candidate PSCell, and the resources reserved for the UE cannot be allocated to other Ues. If a deactivated state is indicated, the T-SN1 DU saves the context information and configuration of the UE in this PSCell, and the resources reserved for the UE in this candidate PSCell may temporarily be allocated to other users for use.

The fifth state change indication message may be a UE CONTEXT MODIFICATION REQUEST message, or another message.

If direct data forwarding is applied in data forwarding, that is, the S-SN performs data forwarding to the candidate target secondary node T-SN1, operations 714 and 715 need to be executed. If indirect data forwarding is applied in data forwarding, that is, the MN performs data forwarding to the candidate target secondary node T-SN1, operation 716 will be executed.

Operation 714: The MN CU/CU-CP transmits a first address indication message to the S-SN CU/CU-CP, and transmits the data forwarding address and the data forwarding indication information to S-SN. The MN CU/CU-CP indicates whether the S-SN needs to transmit data to the data forwarding address according to the PSCell state. If direct data forwarding is applied in data forwarding, that is, the data is directly transmitted to the candidate secondary node through the source secondary node S-SN, the MN CU/CU-CP transmits the data forwarding address provided by the candidate secondary node to the S-SN. If indirect data forwarding is applied in data forwarding, that is, the data of the S-SN is forwarded to the candidate secondary node through the MN, then the MN transmits the data forwarding address information of the MN to the S-SN through this message. This message contains at least one piece of the following information:

Data Forwarding Address Information, indicating transport layer address information for data forwarding, including an IP address and a tunnel identity.

Data Forwarding Indication Information, indicating whether the source secondary node needs to perform data forwarding to this address. If the indication information is Stop, then the source secondary node will not perform data forwarding to this address, or if the indication information is Trigger, then the source secondary node will perform data forwarding to this address.

The first address indication message may be an Xn-U Address Indication message, or another message.

Operation 715: The S-SN CU/CU-CP transmits a second address indication message to the S-SN CU-UP, indicating the data forwarding address and the data forwarding indication information. This message contains at least one piece of the following information:

Data Forwarding Address Information, indicating transport layer address information for data forwarding, including an IP address and a tunnel identity.

Data Forwarding Indication Information, indicating whether the S-SN CU-UP needs to perform data forwarding to this address. If the indication information is Stop, then the S-SN CU-UP will not perform data forwarding to this address, or if the indication information is Trigger, then the S-SN CU-UP will perform data forwarding to this address.

The second address indication message may be a BEARER CONTEXT MODIFICATION REQUEST message, or another message.

Operation 716: The MN CU/CU-CP transmits a third address indication message to the MN CU-UP, indicating a data forwarding address and data forwarding indication information. If indirect data forwarding is applied in the data forwarding of the S-SN, the forwarding is performed to the candidate target secondary node through the MN. Then the MN CU-UP will decide whether to forward the data from the S-SN to a node to which the candidate cell belongs according to the state of the candidate cell. This message contains at least one piece of the following information:

Data Forwarding Address Information, indicating transport layer address information for data forwarding, including an IP address and a tunnel identity.

Data Forwarding Indication Information, indicating whether the MN CU-UP needs to forward the data of the S-SN to this address. If the indication information is Stop, then the MN CU-UP will not forward the data of the S-SN to this address, or if the indication information is Trigger, then the MN CU-UP will forward the data of the S-SN to this address.

The third address indication message may be a BEARER CONTEXT MODIFICATION REQUEST message, or another message.

Example 6: Process for Indicating Cell State after Secondary Node Change with CU/DU Split Structure FIG. 8 is a schematic diagram of a process for indicating candidate cell states after a secondary node change with a CU/DU split structure according to an embodiment of the disclosure.

Figure 8:
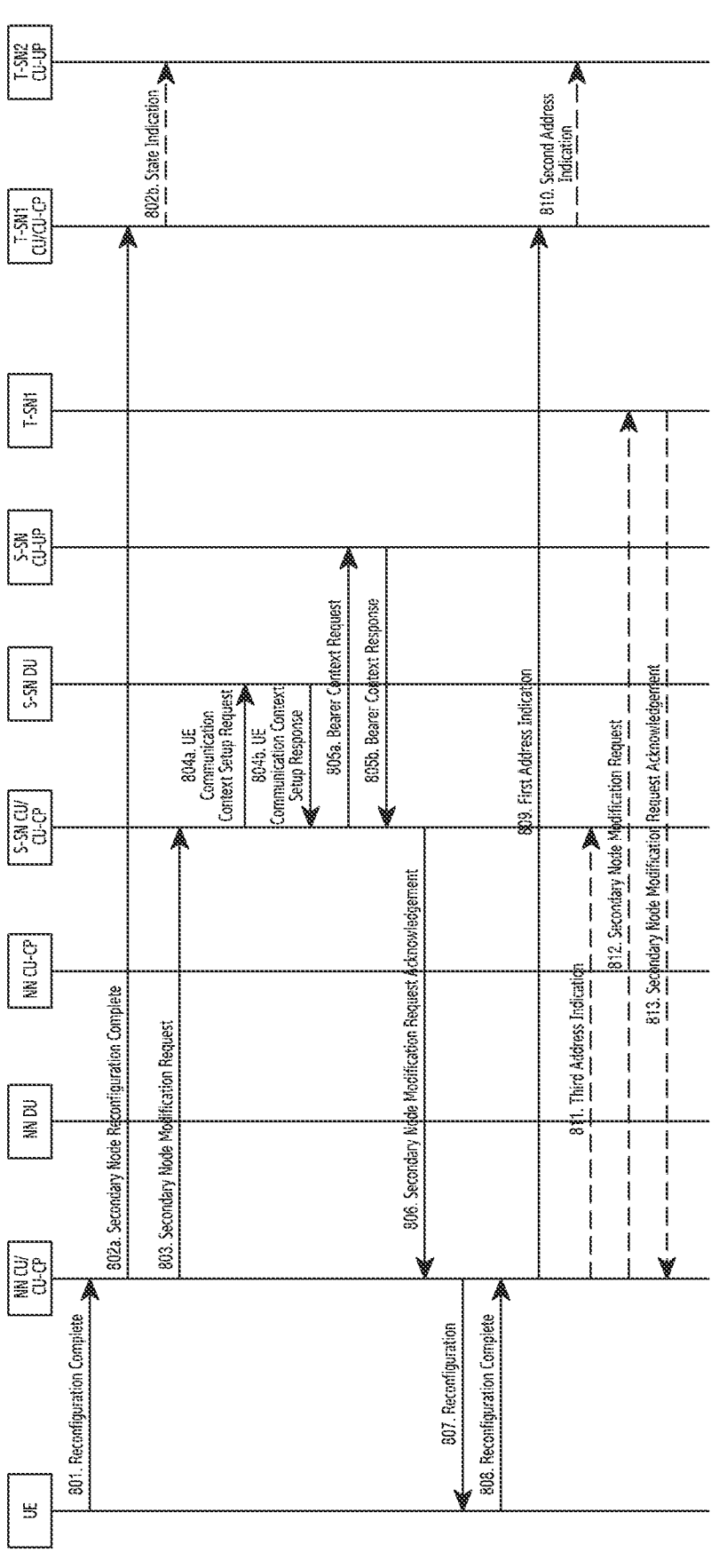
FIG. 8 is a schematic diagram of a process for indicating candidate cell states after a secondary node change with a CU/DU split structure according to an embodiment of the disclosure.

FIG. 8 shows a process for indicating the PSCell state when a serving PSCell change causes a candidate PSCell state change with a CU/DU split structure.

After the UE selects a new PSCell and connects to the target secondary node T-SN2, the serving secondary node of the UE changes. The MN CU/CU-CP needs to indicate to the target secondary node whether CPAC comes into effect directly. If early data forwarding is supported, the MN also needs to transmit the data forwarding address to the target secondary node. If the MN regards the source secondary node as the candidate secondary node of UE, the MN CU/CU-CP needs to instruct the source secondary node to configure candidate PSCell, CPC configuration information and data forwarding address for the UE. The MN CU/CU-CP transmits the candidate PSCell list information and CPC configuration information provided by the source secondary node to the UE, and transmits the data forwarding address information to the target secondary node for data forwarding. If the state of the candidate PSCell changes, the MN CU/CU-CP also needs to transmit the state indication information of the candidate PSCells to the UE and/or another secondary node, and transmit the data forwarding indication information to the new secondary node. Through this process, unnecessary reconfiguration processing and RRC signaling overhead by network equipment and UE are avoided, while unnecessary network processing overhead caused by data forwarding is reduced, energy of UE is saved, and efficient utilization of resources is improved.

Operations 801-803 and 806 are the same as operations 501-504. When the candidate PSCell fulfills the CPC execution conditions, the UE transmits a reconfiguration complete message to the MN CU/CU-CP, indicating the selected target PSCell and the SN reconfiguration complete message to be transmitted to the target secondary node. The MN CU/CU-CP forwards the received SN reconfiguration complete message to the target secondary node T-SN2, indicating to the T-SN2 whether the CPC keeps valid or not, whether the original configured candidate PSCell list information is to be retained, as well as the candidate PSCell state information. The MN CU/CU-CP also instructs the SN (S-SN) to stop transmitting data to the UE through operation 803. If the S-SN is selected as the candidate secondary node of the UE, the source secondary node will be also instructed to select the candidate PSCell for the UE, and allocate and provide configuration information for CPC and a data forwarding address. Through operation 806, the MN CU/CU-CP obtains the candidate PSCell selected by the S-SN for the UE, CPC configuration information, state information of the candidate cell and a data forwarding address. The specific message content is the same as that in operations 501-504, and will not be detailed here.

When a CU/DU split structure is applied, T-SN2 needs to execute operation 802*b* to provide indication information of the candidate PSCell state to the T-SN2 CU/CU-CP and the T-SN2 DU. The S-SN needs to execute operations 804-806, and the S-SN CU/CU-CP instructs the S-SN CU-UP and the S-SN DU to perform selection of candidate PSCell for the CPC of the UE, as well as provision of CPC configuration information, candidate cell state and data forwarding address.

Operation 802*b*: The T-SN2 CU/CU-CP transmits a state indication message to the T-SN2 DU, providing indication information of the candidate PSCell state. If the target secondary base station configures other candidate PSCells for the UE in addition to the target PSCell, if such candidate cells will continue to act as the candidate PSCells for the UE, the T-SN2 CU/CU-CP will decide whether to transmit indication information to the T-SN2 DU according to the candidate PSCell state indication information received from operation 802*a*. If the received candidate PSCell state is different from the stored state, then operation 802*b* needs to be executed. This message contains at least one piece of the following information:

Candidate PSCell Identification Information, which may be a PSCell ID or a CGI or cellIndex or other identification information.

Candidate PSCell State Indication Information, indicating a state of a candidate PSCell. According to this information, the T-SN2 DU obtains the state of the candidate PSCell and determines whether the reserved resources for the UE may be temporarily allocated to other users. If an activated state is indicated, the T-SN2 DU saves the context information and configuration of the UE in this candidate PSCell, and the resources reserved for the UE cannot be allocated to other Ues. If a deactivated state is indicated, the T-SN2 DU saves the context information and configuration of the UE in this PSCell, and the resources reserved for the UE in this candidate PSCell may be temporarily allocated to other users.

The state indication message may be a UE CONTEXT MODIFICATION REQUEST message, or another message.

Operation 804a: The S-SN CU/CU-CP transmits a UE communication context setup request/modification message (UE CONTEXT SETUP REQUEST or UE CONTEXT MODIFICATION REQUEST) or another message to the S-SN DU, indicating to the S-SN DU the candidate PSCell ID for CPC, and indicating the S-SN DU to allocate resources the UE, as well as to setup communication context and setup bearer information, or to provided a candidate PSCell state indication. This message contains at least one piece of the following information:

Candidate PSCell Information, indicating an identity of PSCell, which may be a PSCell ID, a CGI or another identity.

State Indication Information of the Candidate PSCell, indicating whether a state of PSCell is activated or deactivated. If an activated state is indicated, the candidate secondary node T-SN1 DU sets up context information and configuration for the UE in this candidate PSCell, and the resources reserved for the UE cannot be allocated to other Ues. If a deactivated state is indicated, the T-SN1 DU sets up context information and configuration for the UE on this PSCell, and the resources reserved for the UE may be temporarily allocated to other users.

Operation 804b: The S-SN DU transmits a UE communication context setup/modification response message (UE CONTEXT SETUP RESPONSE or UE CONTEXT MODIFICATION RESPONSE) or another message to the S-SN CU/CU-CP, for transmitting the CG configuration information for the UE in the candidate PSCells as well as state information of respective candidate PSCells. This message contains at least one piece of the following information:

Candidate PSCell Information, indicating an identity of PSCell, which may be a PSCell ID, a CGI or another identity.

RRC information from DU to CU, including information such as CG configuration of the UE in the candidate PSCell.

Candidate PSCell Load State Information, indicating the load state of the candidate PSCell. For example, the load state may indicate a level of load, a percentage of load and capacity, and whether it is overloaded or not.

Operation 805a: The S-SN CU/CU-CP transmits a bearer context setup request message (BEARER CONTEXT SETUP REQUEST) or another message to the S-SN CU-UP, requesting the S-SN CU-UP to provide traffic plane configuration, data forwarding address information and CU-UP's state.

Operation 805b: The S-SN CU-UP transmits a bearer context setup response message (BEARER CONTEXT SETUP RESPONSE) or another message to the S-SN CU/CU-CP, for transmitting traffic plane configuration, as well as information of data forwarding address and CU-UP's load state. This message contains at least one piece of the following information:

Data Forwarding Address Information, indicating transport layer address information for data forwarding, including an IP address and a tunnel identity.

Load State Information, indicating the load state of the CU-UP. For example, the load state may indicate a level of load, a percentage of load and capacity, and whether it is overloaded or not.

Operations 807-808: The MN CU/CU-CP reconfigures the UE and transmits the PSCell, CPC configuration and PSCell state information provided by the source secondary node SN CU/CU-CP to the UE. Operations 807-808 are the same as operations 505-506, and will not be detailed here.

Operation 809: The MN CU/CU-CP transmits a first address indication message to the T-SN2 CU/CU-CP. When the MN CU/CU-CP receives a reconfiguration complete message from the UE, it provides the target secondary node T-SN2 CU/CU-CP with address information for data forwarding, indicating to initiate the CPC process. If early data forwarding is supported, the target secondary node T-SN2 performs data forwarding according to the received address information.

If direct data forwarding is applied in data forwarding, that is, T-SN2 directly transmits to the candidate secondary node, the MN transmits the data forwarding address information and data forwarding indication information of the candidate secondary nodes to T-SN2 through this message, and the T-SN2 CU/CU-CP executes operation 810 to transmit the address information to the T-SN2 CU-UP, the T-SN2 CU-UP transmits the data to the corresponding candidate secondary nodes according to the address information and the forwarding indication information. If indirect data forwarding is applied in data forwarding, that is, the data of T-SN2 is forwarded to the candidate secondary node through the MN, then the MN transmits the data forwarding address information of the MN to T-SN2 through this message, and the MN CU/CU-CP executes operation 811 to transmit the data forwarding address information and data forwarding indication information of the candidate secondary nodes to the MN CU-UP, the MN CU-UP forwards the data forwarded by T-SN2 to the corresponding candidate secondary nodes according to the address information and the forwarding indication information.

Operation 810: The T-SN2 CU/CU-CP transmits a second address indication message to the T-SN2 CU-UP, indicating the data forwarding address and the data forwarding state indication information. This message contains at least one piece of the following information:

Data Forwarding Address Information, indicating transport layer address information for data forwarding, including an IP address and a tunnel identity.

Data Forwarding Indication Information, indicating whether it is needed to perform data forwarding to this address. If the indication information is Stop, data forwarding to the address is not needed to be performed, or if the indication information is Trigger, data forwarding to the address needs to be performed.

The second address indication message may be a BEARER CONTEXT MODIFICATION REQUEST message, or another message.

Operation 811: The MN CU/CU-CP transmits a third address indication message to the MN CU-UP, indicating the data forwarding address and the data forwarding indication information. If indirect data forwarding is applied in the data forwarding of the S-SN, the forwarding is performed to the candidate target secondary node through the MN. Then the MN CU-UP will decide whether to forward the data from the S-SN to a node to which the candidate cell belongs according to the state of the candidate cell. This message contains at least one piece of the following information:

Data Forwarding Address Information, indicating transport layer address information for data forwarding, including an IP address and a tunnel identity.

Data Forwarding Indication Information, indicating whether it is needed to perform data forwarding to this address. If the indication information is Stop, data forwarding to the address is not needed to be performed, or if the indication information is Trigger, data forwarding to the address needs to be performed.

The third address indication message may be a BEARER CONTEXT MODIFICATION REQUEST message, or another message.

Operations 812-813: When the PSCell of the UE changes, if the candidate PSCell state changes, the MN CU/CU-CP transmits PSCell state indication information to the candidate secondary node to which the candidate PSCell belongs. Operations 812-813 are the same as operations 508-509, and will not be detailed here. Wherein, in operation 812, when the T-SN1 receives the target cell identify and/or the data discarding or deleting indication, if the T-SN1 applies the CU/DU split structure, the T-SN1 CU-CP will transmit an instruction information to the T-SN1 CU-UP to indicate the T-SN1 CU-UP to discard or delete stored UE data. The indication information may be transmitted through a BEARER CONTEXT MODIFICATION REQUEST or other messages.

Example 7: Process for Indicating Candidate Cell State During CHO Configuration FIG. 9 is a schematic diagram of a process for indicating candidate cell states during a CHO configuration according to an embodiment of the disclosure.

Figure 9:
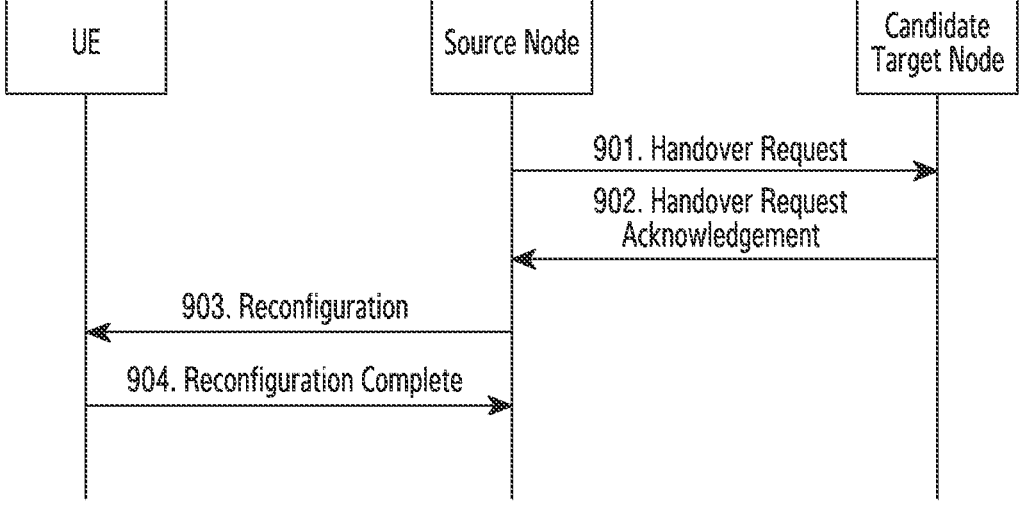
FIG. 9 is a schematic diagram of a process for indicating candidate cell states during a CHO configuration according to an embodiment of the disclosure.

FIG. 9 shows a method in which a source node indicates Pcell state information and/or CHO Keep-Valid indication information to a candidate target node and a UE during CHO preparation stage, and describes a process for the source node to configure the candidate target node. During this process, the source node decides whether candidate Pcell state and/or CHO keeps valid, and transmits such information to the candidate target node and/or the UE. By this method, unnecessary reconfiguration processing and RRC signaling overhead by network equipment and UE may be avoided, measurements by the UE may be reduced, and energy for the UE may be saved.

Operation 901: The source node transmits a handover request message (HANDOVER REQUEST) or another message to the candidate target node, requesting for candidate target Pcell from the candidate target node for the UE to execute CHO, and requesting the candidate target node to allocate a CG configuration. This message contains at least one piece of the following information:

Identification Information of the UE, indicating the identity of the UE at the source base station, i.e., a source NG-RAN node UE XNAP ID (Source NG-RAN node UE XNAP ID) allocated by the source base station.

Candidate Target Cell Identity, indicating identification information of the candidate target cell to which the source base station requests to switch, i.e., a Target Cell Global ID, which may be an E-UTRA CGI or a NR CGI.

CHO Trigger Indication Information, indicating whether the CHO mechanism is applied during the handover process of the candidate target node UE.

CHO Keep-Valid Indication Information. If this indication information exists and is set to Trigger, it indicates that the UE will continue to apply the CHO mechanism for Pcell changing after completing the CHO execution and accessing the target node (or a new Pcell), and the network will not be needed to re-initiate the CHO process. If this indication information exists and is set to Stop, then the UE will not continue to apply the CHO mechanism for Pcell changing after completing the CHO execution and accessing the target node (or a new Pcell). If the target node needs to apply the CHO mechanism, configuration will be needed to re-initiate the CHO process.

State Indication Information of the Candidate Pcell, indicating state information of the candidate Pcell configured by the candidate target node for the UE. If an activated state is indicated, the candidate target secondary node sets up context information for the candidate PSCell selected for the UE and reserves resources for the UE, wherein the resources cannot be used by other Ues. If a deactivated state is indicated, the candidate target secondary node sets up context information for the candidate PSCell selected for the UE and reserves resources for the UE, wherein the resources may be temporarily used by other Ues.

Operation 902: The candidate target node transmits a handover request acknowledgement message (HANDOVER REQUEST ACKNOWLEDGE) or another message to the source node, for transmitting CHO-related information configured by the candidate target node for the UE and information of the load state of the candidate Pcell. This message contains at least one piece of the following information:

Identification Information of the UE, including an identity of UE on the source base station (Source NG-RAN node UE XnAP ID) and an identity of UE on the target base station (Target NG-RAN node UE XnAP ID) allocated by the target base station.

Requested Candidate Target Cell Identity, indicating an identity of a target cell to which a handover is requested, corresponding to the confirmation message, i.e., a Requested Target Cell ID, which may be an E-UTRA CGI or a NR CGI.

Information on the load state of Candidate Pcell, indicating load state of candidate PSCell. For example, the load state may indicate a level of load, a percentage of load and capacity, and whether it is overloaded or not.

Container for Target Node to Source Node, containing information such as CG configuration for the UE in the candidate Pcell by the target node. This is transmitted to the source node in a form of container by the target node, and then transmitted to the UE by the source node.

Data Forwarding Address Information, indicating transport layer address information for data forwarding, containing an IP address and a tunnel identity. This is used for the serving node to perform data forwarding to the candidate secondary node.

The source node may obtain the load state of the candidate Pcell through the state indication information provided by the candidate target node, and may obtain the location information of the UE through a measurement report of the UE or measurement of a UE uplink signal by the source node. Through such information, the source node may determine the state of the candidate Pcell, e.g. according to the current location of the UE. If the source node knows the geographical location of the candidate Pcell or the candidate target node, this geographical location is far away from the UE, and the UE will not select and change to this cell soon, then the source node may set this candidate cell state to deactivated, and the UE will not detect and evaluate signal quality of SSB or CSI-RS of this cell after receiving this state information, thus reducing processing by UE, and reducing power consumption for UE. Otherwise, if the geographic location of the candidate cell is close to the UE's current location, and the load of the candidate cell is not heavy, the source node sets this candidate cell state to an activated state. The source node transmits the determined state of the candidate cell to the UE and the candidate target node respectively.

Operation 903: The source node transmits a reconfiguration message to the UE, for transmitting CHO configuration information to the UE to inform it of information of the candidate Pcell state. This message contains at least one piece of the following information:

CHO Configuration Keep-Valid Indication Information. This CHO configuration refers to information of conditions that triggers execution of CHO and information of resources allocated by the candidate target node for the serving bearer of the UE in this candidate Pcell. If this indication information exists and is set to Trigger, it indicates that the UE will not delete the existing CHO-related configuration information, that is, continue to save the CHO configuration information at the UE side, after completing the CHO execution and switching from the source node to the target node. If this indication information exists and is set to Stop, it indicates that the UE will delete the existing CHO-related configuration information after completing the CHO execution and switching from the source node to the target node.

Identification Information of the Candidate Cell, including identification information of respective candidate Pcells, which may be a conditional configuration identity condReconfigId or Pcell ID or CGI or other identification information.

State Indication Information of the Candidate Pcell. The UE decides whether it is needed to monitor the candidate Pcell according to the state indication information. If this information indicates that the Pcell is in an activated state, the UE needs to perform CHO monitoring on this cell; or if the information indicates that the Pcell is in a deactivated state, the UE is not needed to perform CHO monitoring on this cell. Unnecessary detection and evaluation of signal quality of candidate cells by UE, thus reducing power consumption for UE.

CHO Execution Conditions, indicating conditions that measurement results of candidate cells need to fulfill when the UE executes CHO.

Configuration Information for CG, including CG configuration information corresponding to respective candidate Pcells. This information is transmitted in a form of container by the target node to the source node, and then transmitted to the UE by the source node.

The reconfiguration message may be an RRCReconfiguration message, an RRCConnectionReconfiguration message, or another message.

Operation 904: The UE transmits a reconfiguration complete message to the source node, indicating that the UE has completed the configuration except for CHO according to the configuration information transmitted by the source node, and saved the configuration information for CHO.

The reconfiguration complete message may be an RRCReconfigurationComplete message, an RRCConnectionReconfigurationComplete message, or another message.

Example 8: Process for Indicating Candidate Pcell State Update

Figure 10:
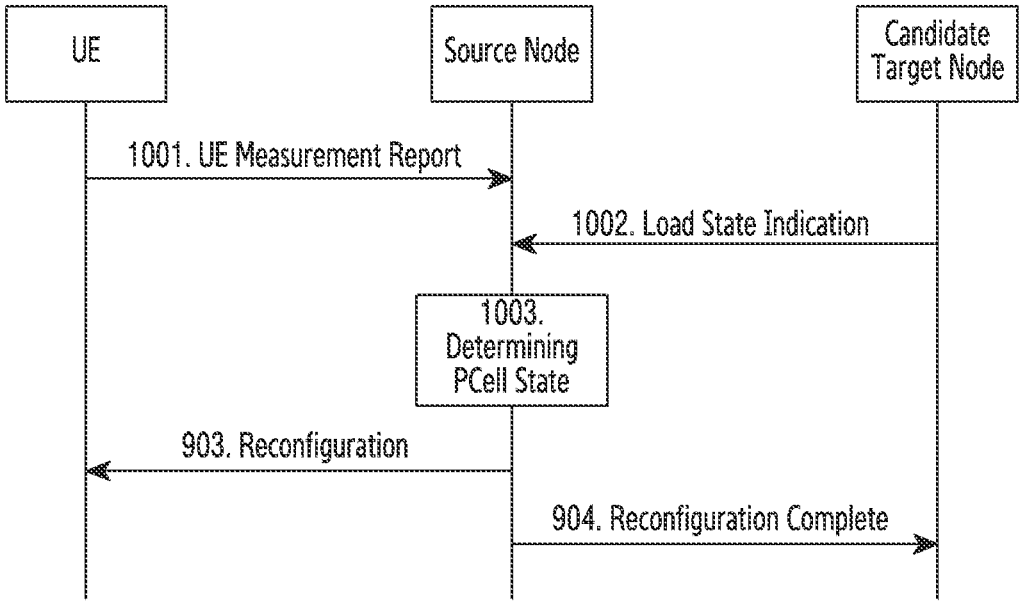
FIG. 10 is a schematic diagram of a process for indicating cell state updates for a candidate PCell according to an embodiment of the disclosure.

FIG. 10 is a schematic diagram of a process for indicating cell state updates for a candidate PCell according to an embodiment of the disclosure.

FIG. 10 shows a schematic diagram of a process in which a source node indicates Pcell state information to a candidate target node and a UE when the location of the UE changes or the load of the candidate target Pcell or the load state of the candidate target node changes, and describes a method in which the source node determines the location of the UE according to a measurement result transmitted by the UE or measurement of a UE uplink signal by the source node, determines the distance between UE and the candidate target node or candidate Pcell according to the location information of the UE, determines a possibility for UE to access to the candidate Pcell, thereby determining the state of the candidate Pcell, and transmits this state information to the candidate target node and/or the UE. By this method, unnecessary network processing overhead caused by data forwarding is reduced, measurements by the UE are reduced, energy of the UE is saved, and efficient utilization of cell resources is also improved.

If the source node merely changes the candidate cell state based on the UE's location information, then operation 1001 will be executed, and then operations 1003-1004 will be executed. If the source node merely changes the candidate cell state based on the load state of the candidate cell, operations 1002-1004 will be executed.

Operation 1001: The UE transmits a UE measurement report message to a source node, providing a measurement result of the candidate cell. According to the measurement result of the candidate cell provided by the UE, the source node determines the current location of the UE from the candidate target cell, estimates a probability for UE to access to the candidate target cell, and determines whether it is needed to change the state of the candidate Pcell. This message contains at least one piece of the following information:

Cell List Information, containing identities of respective candidate cells, which may be a physical cell identity PhysCellId or another identity.

Cell Measurement Result, which may be an SSB measurement result of the cell or a CSI-RS measurement result of the cell.

The UE measurement report message may be a MeasurementReport message, or another message.

Operation 1002: The candidate target node transmits a load state indication message to the source node, indicating the Cell load state of the candidate target node. The MN determines the state of the candidate Pcell of the UE in the candidate target node according to the Cell load state of the candidate target node. This message contains at least one piece of the following information:

Cell Identification Information, which may be a Cell ID or a Global NG-RAN Cell Identity or other identification information, including information of a PLMN Identity and an NR Cell Identity.

Cell Load State Information, which indicates the load state of the Cell. For example, the load state may indicate a level of load, a percentage of load and capacity, and whether it is overloaded or not.

The load state indication message may be a RESOURCE STATUS UPDATE message, or another message.

Operation 1003: The source node determines the state of the candidate Pcell according to the location information of the UE and/or the load state of the candidate target cell or candidate target node, and decides whether it is needed to transmit a message to the UE and/or the candidate target node to indicate the state of the candidate Pcell.

The source node may, through operation 1001, directly obtain the measurement result of the UE and determine the location information of the UE, or alternatively, the source node may determine the location information of the UE by measuring the uplink signal of the UE. According to the location information of the UE, the source node determines the locations of the UE and the candidate Pcell or the candidate target node, and determines the state of the candidate Pcell. The source node may also obtain the cell load state or node load state of the candidate target node according to operation 1002, so as to obtain the load state of the candidate Pcell of the UE or the load state of the candidate target node. The source node determines the state of the candidate Pcell according to the location of the UE and/or the load state of the candidate Pcell or the candidate target node, and decides whether it is needed to transmit a message to the UE and/or the candidate target node to indicate the state of the candidate PSCell. If the UE is not far from the candidate cell or the candidate target base station, and this cell is not heavily loaded at present, then the state of this cell is set to the activated state. If the UE is far away from the candidate cell or the candidate target base station, or the current load of the cell is heavy, then the state of the cell may be set as deactivated.

Operation 1004: The source node transmits a first state indication information to the UE, indicating state Information of the Candidate Pcell. This message contains at least one piece of the following information:

Candidate Pcell List Information, including identification information of respective candidate Pcells, which may be a conditional configuration identity condReconfigId or a Cell Index or a CGI or other identification information.

State Indication Information of the Candidate Pcell, indicating the state of the Pcell. The UE decides whether it is needed to monitor the candidate Pcell according to the state indication information. If this information indicates that the Pcell is in an activated state, the UE needs to perform CHO monitoring on this cell; or if the information indicates that the Pcell is in a deactivated state, the UE is not needed to perform CHO monitoring on this cell. Unnecessary detection and evaluation of signal quality of candidate cells by UE, thus reducing power consumption for UE.

The first state indication information may be transmitted either through an RRC message or through MAC.

If it is transmitted through an RRC message, an RRCReconfiguration message, an RRCConnectionReconfiguration message or another message may be applied.

If it is transmitted through MAC, a MAC control element (MAC CE) may be applied to transfer candidate cell state information. The specific structure of MAC CE is given in "A Method of Indicating Candidate Cell State to UE".

Operation 1005: The source node transmits a second state indication message to the candidate target node, indicating state information of the candidate Pcell. This message contains at least one piece of the following information:

CHO Trigger Indication Information. If this indication information exists and is set to Replace, it indicates that the CHO configuration of the candidate target node UE has been modified.

Candidate Pcell List Information, including identification information of respective candidate Pcells, which may be a Pcell ID or a CGI or other identification information.

State Indication Information of the Candidate Pcell, indicating the state of the candidate Pcell. If an activated state is indicated, the candidate target node saves the context information and configuration of the UE in this candidate Pcell, and the resources reserved for the UE cannot be allocated to other Ues. If a deactivated state is indicated, the candidate secondary node saves the context information and configuration of the UE in this Pcell, and the resources reserved for the UE inn this candidate Pcell may be temporarily allocated to other users. If there is buffered data of the UE, the buffered data will be deleted.

CHO Keep-Valid Indication Information. If this indication information exists and is set to Trigger, it indicates that the UE will continue to apply the CHO mechanism for Pcell changing after completing the CHO execution and accessing to the target node (or a new Pcell), and the network will not be needed to re-initiate the CHO process. If this indication information exists and is set to Stop, then the UE will not continue to apply the CHO mechanism for Pcell changing after completing the CHO execution and accessing to the target node (or a new Pcell). If the target node needs to apply the CHO mechanism, configuration will be needed to re-initiate the CHO process.

The second state indication message may be a HANDOVER REQUEST message, or another message.

Example 9: Process for Indicating Candidate Cell State after Pcell Changes

Figure 11:
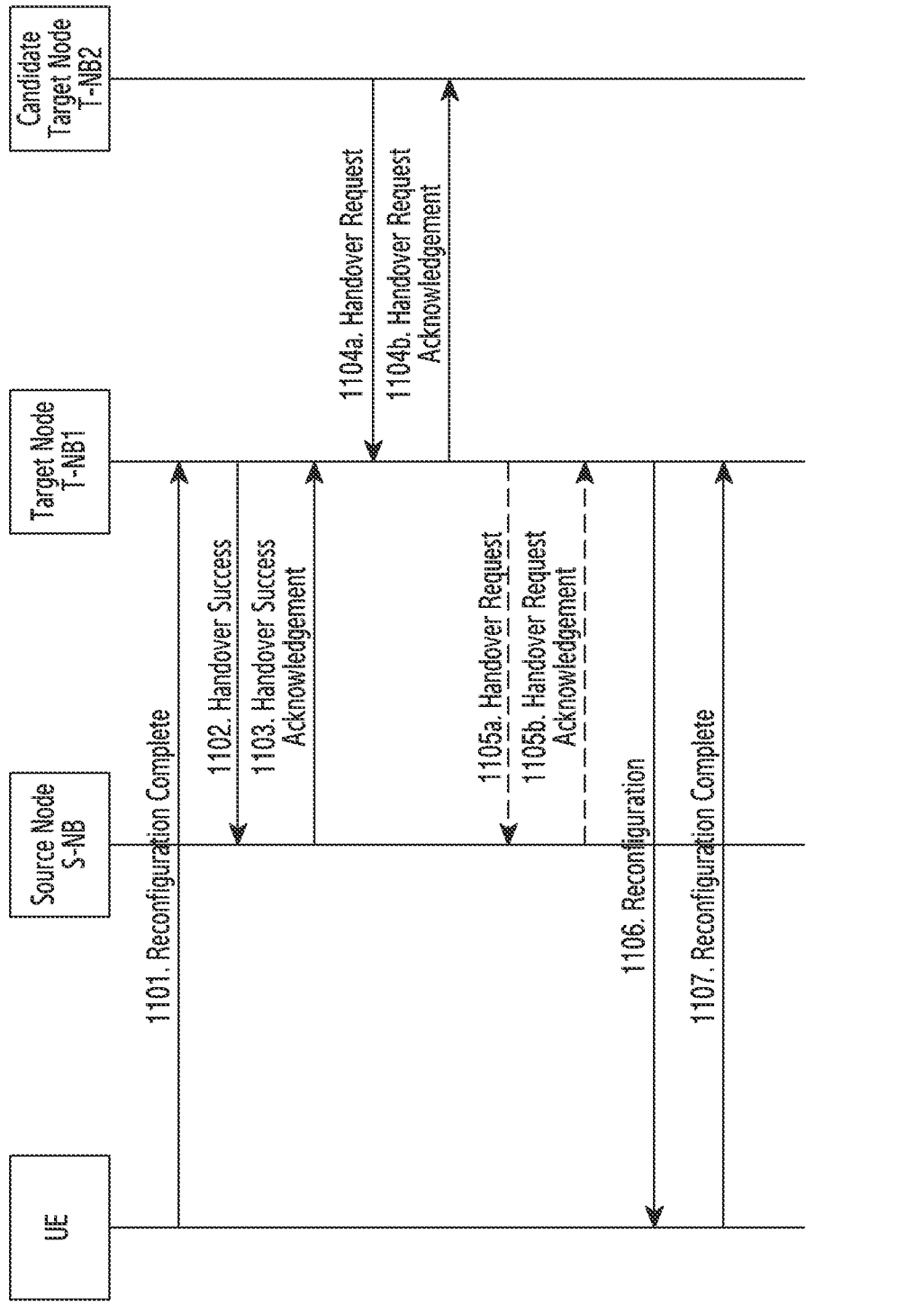
FIG. 11 is a schematic diagram of a process for indicating candidate cell states after a change in PCell according to an embodiment of the disclosure.

FIG. 11 is a schematic diagram of a process for indicating candidate cell states after a change in PCell according to an embodiment of the disclosure.

FIG. 11 shows a process for indicating the Pcell state when a serving Pcell change causes a candidate Pcell state change.

After the CHO execution conditions are fulfilled, and the UE selects a new Pcell and transmits a reconfiguration complete message to the target node, the target node needs to indicate the handover success to the source node, and obtain the candidate cell information and CHO execution conditions currently configured for the UE from the source node. The target node also needs to establish a connection with other candidate target nodes, for subsequent interaction of UE-related information between nodes, and to indicate that the UE has switched to a new node. If the target node regards the source node as a candidate target node of the UE, the target node needs to transmit a handover request to the source node, requesting for candidate target Pcell for the UE, and requesting the source node to allocate resources for CHO for the UE. At the same time, when the target node receives a path switch request acknowledgement message (PATH SWITCH REQUEST ACKNOWLEDGE) from the core network, it is not needed to transmit a UE context release request message (UE CONTEXT RELEASE) to the source node. If the candidate Pcell state is changed, the target node also needs to transmit Pcell state indication information to the candidate target node to which the candidate Pcell with state changed belongs. The target node also needs to transmit Pcell state indication information to the UE. Through this process, unnecessary reconfiguration processing and RRC signaling overhead for network equipment and UE are avoided, and at the same time, unnecessary network processing overhead caused by data forwarding is reduced, energy of UE is saved, and efficient utilization of resources is improved.

Operation 1101: The UE transmits a reconfiguration complete message to the target node, indicating that the UE has selected and accessed the target Pcell.

The reconfiguration complete message may be an RRCReconfigurationComplete message, an RRCConnectionReconfigurationComplete message, or another message.

Operation 1102: The target node T-NB1 transmits a handover success message to the source node, indicating that the UE has completed a Pcell change and switched to the target node. The handover success message may be a HANDOVER SUCCESS message, or another message.

Operation 1103: The source node transmits a handover success acknowledgement message to the target node. After the UE accesses to the target node, the target node transmits a handover success message to the source node, and the source node transmits a message to the target node, including candidate cell information of the UE, UE identification information list and CHO execution condition information, or potentially including CHO keeping valid indication information and/or data forwarding information as well. The target node may avoid re-initiating CHO process upon receiving the CHO keeping valid indication information. The target node may receive the handover success acknowledgement message from the source node actively, or alternatively in operation 901, through CHO keeping valid indication information contained in the handover request message transmitted by the source node to the target node. This message contains at least one piece of the following information:

Candidate Cell List Information, including identities of respective candidate cells, which may be a condReconfigId or a PSCell ID or a CGI or other identification information.

UE Identification Information List, including identities of Ues in respective candidate cells. The identity of the UE may be a NG-RAN node UE XnAP ID allocated to the UE by the source node S-NB, corresponding to this candidate cell, or may be a NG-RAN node UE XnAP ID allocated to the UE by the candidate target node to which the candidate cell belongs, which correspond to identities allocated to the UE by the source node and the candidate target node in operations 901 and 902 respectively.

CHO Execution Conditions, indicating conditions that measurement results of candidate cells need to fulfill when the UE executes CHO.

CHO Keep-Valid Indication Information. If this indication information exists and is set to Trigger, it indicates that the UE will continue to apply the CHO mechanism for Pcell changing after completing the CHO execution and accessing to the target node (or a new Pcell), and the network will not be needed to re-initiate the CHO process. If this indication information exists and is set to Stop, then the UE will not continue to apply the CHO mechanism for Pcell changing after completing the CHO execution and accessing to the target node (or a new Pcell). If the target node needs to apply the CHO mechanism, configuration will be needed to re-initiate the CHO process.

Data forwarding information, containing at least one piece of the following information:

Data forwarding address information, indicating the transport layer address information for data forwarding, including an IP address and a tunnel identification. It is used in performing data forwarding to said address by the target node when early data forwarding is supported.

Data forwarding indication information, indicating whether the target node needs to perform data forwarding to said address. If the indication information is "stop", then the target node will not perform data forwarding to said address. If the indication information is "trigger", then the target node will perform data forwarding to said address.

The handover success acknowledgement message may be a HANDOVER SUCCESS ACKNOWLEDGE message, or another message.

Operation 1104*a*: The target node transmits a handover request message to other candidate target nodes, indicating that the UE has switched to a new node T-SN1, and a connection between T-SN1 and the candidate target node is established for subsequent interaction of UE-related information between nodes, and indicating whether the CHO keeps valid or not and/or indicating that the UE has accessed the target cell, and indicating the T-NB2 to discard or delete the stored UE data. If the candidate Pcell state of the candidate target changes, it is also needed to transmit the candidate Pcell state to the candidate target node. This message contains at least one piece of the following information:

UE Identification Information 1, indicating the identity of the UE at the target node, i.e., an NG-RAN node UE XnAP ID of T-NB1.

UE Identification Information 2, indicating the identity of the UE at the source node, i.e., NG-RAN node UE XnAP ID of the S-NB. According to the identification information of the UE at the source node, T-NB2 may identify the UE identity of this UE at T-NB2, so as to determine communication context of this UE and information of resources allocated to the UE by T-NB2.

Identification Information of the Candidate Cell, including identification information of respective candidate Pcells, which may be a condReconfigId or a PSCell ID or a CGI or other identification information.

State Indication Information of the Candidate Pcell, indicating the state of the candidate Pcell. If an activated state is indicated, the candidate target node sets up context information for the UE in this candidate Pcell and reserves resources for the UE, wherein the resources cannot be used by other Ues. If a deactivated state is indicated, the candidate target node sets up context information for the UE in this candidate Pcell and reserves resources for the UE, wherein the resources may be temporarily used by other Ues.

CHO Trigger Indication Information, indicating the candidate target node whether the CHO mechanism is applied to UE during the handover process.

CHO Keep-Valid Indication Information. If this indication information exists and is set to Trigger, it indicates that the UE will continue to apply the CHO mechanism for Pcell changing after completing the CHO execution and accessing the target node (or a new Pcell), and the network will not be needed to re-initiate the CHO process. If this indication information exists and is set to Stop, then the UE will not continue to apply the CHO mechanism for Pcell changing after completing the CHO execution and accessing the target node (or a new Pcell). If the target node needs to apply the CHO mechanism, configuration will be needed to re-initiate the CHO process.

Target Cell Identity, indicating that the UE has accessed to the target Pcell, indicating that the T-NB2 may discard or delete the stored UE data;

Data Discarding or Deleting Indication, indicating that the T-NB2 may discard or delete the stored UE data The handover request message may be a HANDOVER REQUEST message, or another message.

Operation 1104*b*: The candidate target node T-NB2 transmits a handover request acknowledgement message to the target node T-NB1, for T-NB2 to provide identification information of the UE at T-NB2, information of the load state of candidate cell, etc. This message contains at least one piece of the following information:

Identification Information of the UE, including identity of UE on the target node T-NB1 (NG-RAN node UE XnAP ID) and identity of UE on the candidate target node T-NB2 (NG-RAN node UE XnAP ID).

Identification Information of the Candidate Cell, including identification information of respective candidate Pcells, which may be a condReconfigId or a PSCell ID or a CGI or other identification information.

Information on the load state of Candidate Pcell, indicating load state of candidate PSCell. For example, the load state may indicate a level of load, a percentage of load and capacity, and whether it is overloaded or not.

The handover request acknowledgement message may be a HANDOVER REQUEST ACKNOWLEDGE message, or another message.

Operations 1105*a* and 1105*b*: The target node (T-NB1) acts as the new source node of the UE, and the source node (S-NB) acts as the new candidate target node of the UE, then T-NB1 may transmit a handover request message to the S-NB, requesting for candidate target cells for the UE to execute CHO and for providing CG configuration. As a candidate target node, the S-NB determines whether to agree to the requested candidate target cell as the candidate cell of the UE, and provides the information of the load state of the candidate Pcell.

Operation 1105*a*: The new source node (T-NB1) transmits a handover request message (HANDOVER REQUEST) or another message to the new candidate target node (S-NB). T-NB1, as the current new source node of the UE, selects the S-NB to be the new candidate target node of the UE, so as to request to the S-NB for candidate target Pcells for the UE to execute CHO, and for allocating CG configuration. This message contains at least one piece of the following information:

Identification Information of the UE, indicating the identity of the UE at a new source node and the identity of UE at a new candidate target node, e.g., a NG-RAN node UE XnAP ID of T-NB1 and a NG-RAN node UE XnAP ID of the S-NB.

Candidate Target Cell Identity, indicating identification information of the candidate target cell to which the new source node T-NB1 requests the new candidate target node S-NB for switching, i.e., a Target Cell Global ID, which may be an E-UTRA CGI or a NR CGI.

State Indication Information of the Candidate Pcell, indicating the state of the candidate Pcell. If an activated state is indicated, the candidate target node sets up context information for the UE in this candidate Pcell and reserves resources for the UE, wherein the resources cannot be used by other Ues. If a deactivated state is indicated, the candidate target node sets up context information for the UE in this candidate Pcell and reserves resources for the UE, wherein the resources may be temporarily used by other Ues.

CHO Trigger Indication Information, indicating the S-NB whether the CHO mechanism is applied in a handover process of the UE, as the candidate target node.

CHO Keep-Valid Indication Information. If this indication information exists and is set to Trigger, it indicates that the UE will continue to apply the CHO mechanism for Pcell changing after completing the CHO execution and accessing to the target node (or a new Pcell), and the network will not be needed to re-initiate the CHO process. If this indication information exists and is set to Stop, then the UE will not continue to apply the CHO mechanism for Pcell changing after completing the CHO execution and accessing to the target node (or a new Pcell). If the target node needs to apply the CHO mechanism, configuration will be needed to re-initiate the CHO process.

Operation 1105*b*: The new candidate target node S-NB transmits a handover request acknowledgement message (HANDOVER REQUEST ACKNOWLEDGE) or another message to the new source node T-NB1, for transmitting CHO-related information configured for the UE by the S-NB as a candidate target node, as well as information of the load state of candidate Pcell. This message contains at least one piece of the following information:

Identification Information of the UE, including an identity of UE on the candidate target node and an identity of UE on the source node, i.e., NG-RAN node UE XnAP ID of the S-NB and NG-RAN node UE XnAP ID of T-NB1.

Requested Candidate Target Cell Identity, indicating an identity of a target cell to which a handover is requested, corresponding to the confirmation message, i.e., Requested Target Cell ID, which may be an E-UTRA CGI or a NR CGI.

Information on the load state of Candidate Pcell, indicating load state of candidate PSCell. For example, the load state may indicate a level of load, a percentage of load and capacity, and whether it is overloaded or not.

Container for Target Node to Source Node, containing information such as CG configuration for the UE on the candidate Pcell by the S-NB. This is transmitted to the source node in a form of container by the target node, and then transmitted to the UE by the source node.

As a new source node, the target node T-NB1 may determine the state of the candidate cell according to the load information of the candidate cell received from the candidate target node and the location information of the UE. The specific determining process is the same as that in operation 902, and will not be detailed here. The new source node T-NB1 transmits the state information of the cell to the UE. When the UE accesses to a new Pcell, if the configuration of CHO changes, such as the candidate cell changes or the candidate cell state changes, operations 1106 and 1107 will be executed, where the target node transmits CHO configuration information to the UE, and the UE transmits feedback information to the target node, indicating that the configuration except for CHO has been completed according to the transmitted configuration information, and the CHO configuration information has been saved. Operations 1106-1107 are the same as operations 1207-1208, and will not be detailed here.

If early data forwarding is supported, after determining the state of the candidate cell, the target node T-NB1 determines the candidate target node for which data forwarding needs to be performed, according to the candidate cell state. If the candidate cell state is an activated state, the target node performs data forwarding to the candidate target node to which this candidate cell belongs; or if the candidate cell state is a deactivated state, the target node is not needed to perform data forwarding to the candidate target node to which this candidate cell belongs.

Example 10: Process for Indicating Candidate Cell State During CHO Configuration with CU/DU Split Structure FIG. 12 is a schematic diagram of a process for indicating candidate cell states during a CHO configuration with a CU/DU split structure according to an embodiment of the disclosure.

Figure 12:
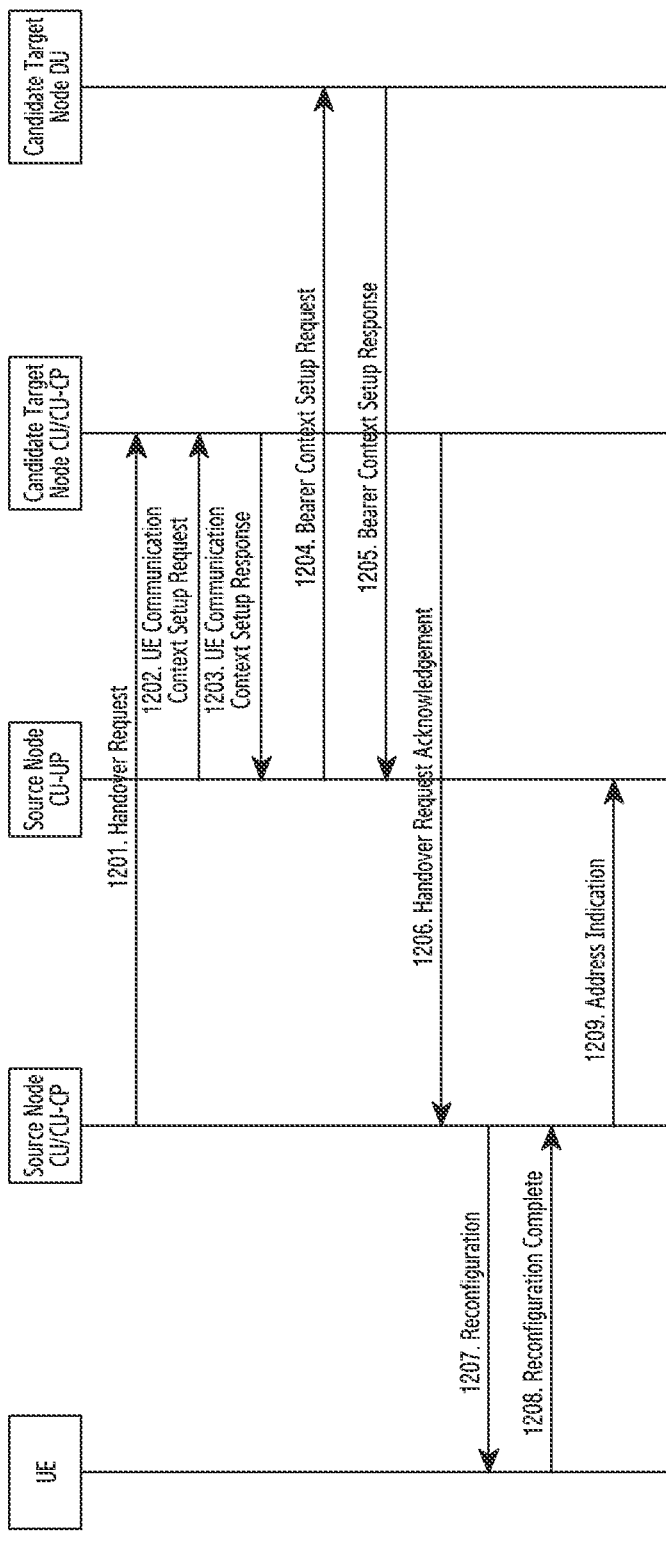
FIG. 12 is a schematic diagram of a process for indicating candidate cell states during a CHO configuration with a CU/DU split structure according to an embodiment of the disclosure.

FIG. 12 shows a method in which a source node indicates Pcell state information and/or CHO Keep-Valid indication information to a candidate target node and a UE during a CHO preparation stage, when the network node is in a CU/DU split structure, and describes a process to configure the candidate target node by the source node. During the process, the source node decides whether the candidate Pcell state and/or CHO keeps valid, and transmits such information to the candidate target node and/or UE. By this method, unnecessary reconfiguration processing and RRC signaling overhead by network equipment and UE may be avoided, measurements by the UE are reduced, and energy for the UE is saved.

Operation 1201: The source node CU/CU-CP transmits a handover request message (HANDOVER REQUEST) or another message to the candidate target node CU/CU-CP, requesting for candidate target Pcells from the candidate target node for the UE to execute CHO, and requesting the candidate target node to allocate CG configuration. The steps are the same as operation 901, and will not be detailed here.

If the candidate target node is a CU/DU split structure, operations 1202-1205 need to be executed, so as to complete the setup of UE communication context between the CU-CP and the DU, and the setup of bearer context between the CU-CP and the UP, to indicate a candidate cell state to the DU, and to obtain the information of the load state provided by the DU and the CU-UP.

Operation 1202: The candidate target node CU/CU-CP transmits a UE communication context setup request message (UE CONTEXT SETUP REQUEST) or another message to the candidate target node DU, indicating Pcell identity used by the candidate target node DU for CHO, and instructing the DU to set up a communication context and execute CG configuration for the UE, while indicating the state of the candidate cell to the DU, and instructing the DU to provide the information of the load state of the candidate cell. This message contains at least one piece of the following information:

Candidate Pcell information, indicating an identity of Pcell, which may be Pcell ID, CGI or another identity.

State Indication Information of the Candidate Pcell, indicating whether the state of the Pcell is activated or deactivated. If an activated state is indicated, the candidate target node DU sets up context information and configuration for the UE in this candidate Pcell, and the resources reserved for the UE cannot be allocated to other Ues. If a deactivated state is indicated, the candidate target node DU sets up context information and configuration for the UE in this Pcell, and the resources reserved for the UE may be temporarily allocated to other users.

Operation 1203: The candidate target node DU transmits a UE communication context setup response message (UE CONTEXT SETUP RESPONSE) or another message to the candidate target node CU/CU-CP, for transmitting the CG configuration information for the UE in the candidate Pcell and the information of the load state of the candidate Pcell. This message contains at least one piece of the following information:

Candidate Cell Information, indicating an identity of candidate Pcell, which may be Pcell ID, CGI or another identity.

RRC Information from DU to CU, including information such as CG configuration of UE in the candidate Pcell, etc.

Information on the load state of Candidate Cell, indicating load state of candidate Pcell. For example, the load state may indicate a level of load, a percentage of load and capacity, and whether it is overloaded or not.

Operation 1204: The candidate target node CU/CU-CP transmits a bearer context setup request message (BEARER CONTEXT SETUP REQUEST) to the candidate target node CU-UP, for requesting the candidate target node CU-UP to provide traffic plane configuration, information of forwarding address and the load state of the CU-UP.

Operation 1205: The candidate target node CU/CU-UP transmits a bearer context setup response message (BEARER CONTEXT SETUP RESPONSE) or another message to the candidate target node CU/CU-CP, for transmitting traffic plane configuration, information of data forwarding address and the load state of the CU-UP. This message contains at least one piece of the following information:

Data Forwarding Address Information, indicating transport layer address information for data forwarding, containing an IP address and a tunnel identity.

Load State Information, indicating the load state of the CU-UP. For example, the load state may indicate a level of load, a percentage of load and capacity, and whether it is overloaded or not.

Operation 1206: The candidate target node transmits a handover request acknowledgement message (HANDOVER REQUEST ACKNOWLEDGE) or another message to the source node, for transmit CG information of the candidate cell and information of the load state of the candidate Pcell, configured by the candidate target node for the UE. This operation is the same as operation 902, and will not be detailed here.

Operation 1207: The source node CU/CU-CP transmits a reconfiguration message to the UE, for transmitting CHO configuration information to the UE. The reconfiguration message may be an RRCReconfiguration message, an RRC-ConnectionReconfiguration message, or another message. This step is the same as operation 903, and will not be detailed here.

Operation 1208: The UE transmits a reconfiguration complete message to the source node CU/CU-CP, indicating that the UE has completed the configuration except for CHO according to the configuration information transmitted by the source node, and saved the configuration information for CHO.

The reconfiguration complete message may be an RRCReconfigurationComplete message, an RRCConnectionReconfigurationComplete message, or another message.

Operation 1209: The source node CU/CU-CP transmits an address indication message to the source node CU-UP, indicating data forwarding address and state indication information. According to the state of the candidate cell, the source node CU/CU-CP will indicate to the source node CU-UP whether to perform data forwarding to the address provided by the node to which the candidate cell belongs. This message contains at least one piece of the following information:

Data Forwarding Address Information, indicating transport layer address information for data forwarding, containing an IP address and a tunnel identity.

Data Forwarding Indication Information, indicating whether the source node CU-UP needs to perform data forwarding to this address. If the indication information is Stop, then the source node CU-UP does not perform data forwarding to this address, or if the indication information is Trigger, the source node CU-UP performs data forwarding to this address.

The address indication message may be a BEARER CONTEXT MODIFICATION REQUEST message, or another message.

Example 11: Process for Indicating Candidate Pcell State Update with CU/DU Split Structure FIG. 13 is a schematic diagram of a process for indicating cell state updates for a candidate PCell with a CU/DU split structure according to an embodiment of the disclosure.

Figure 13:
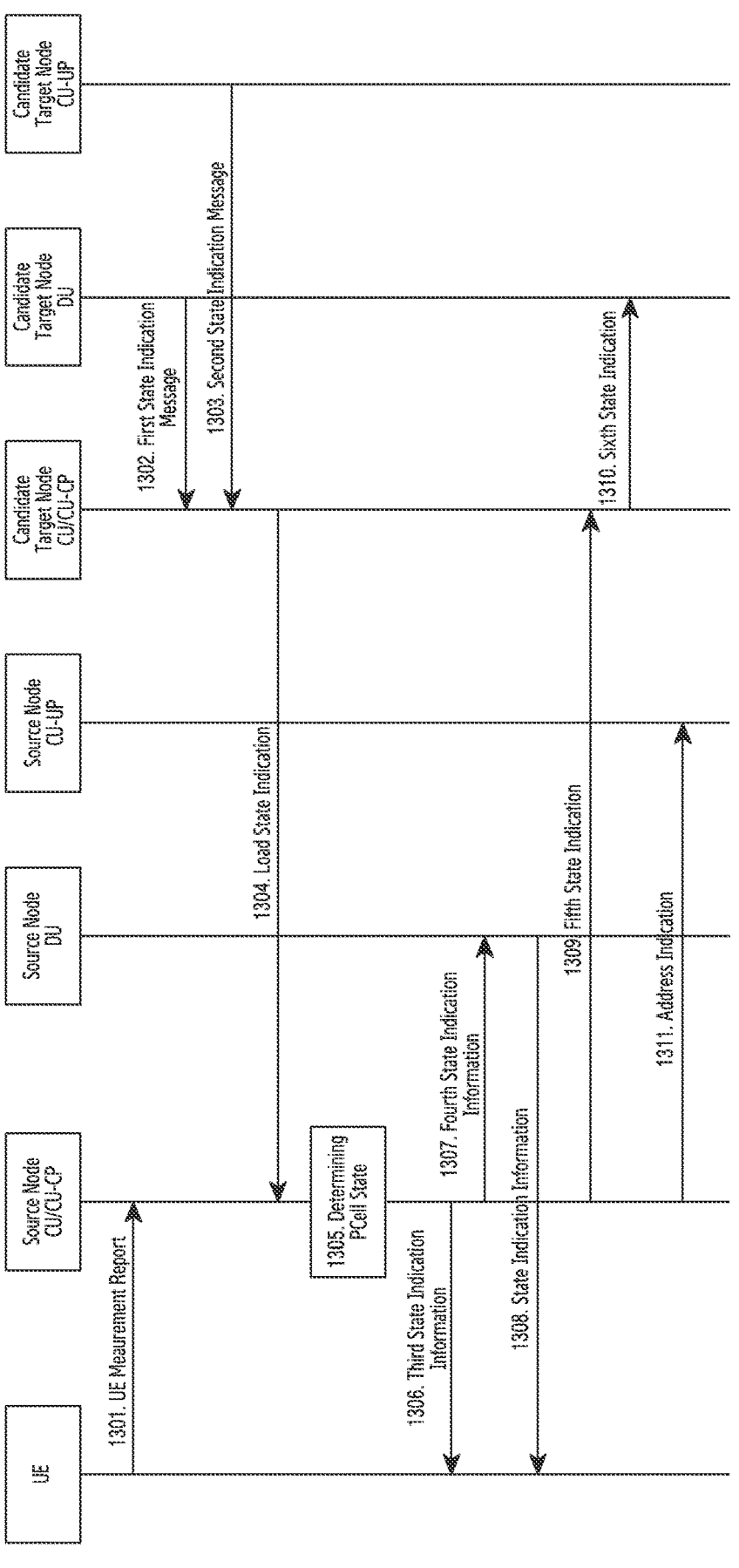
FIG. 13 is a schematic diagram of a process for indicating cell state updates for a candidate PCell with a CU/DU split structure according to an embodiment of the disclosure.

FIG. 13 gives a schematic diagram of a process in which the source node CU/CU-CP indicates Pcell state information to the candidate target node and the UE when the location of the UE changes or the load of the candidate target Pcell or the load state of the candidate target node changes, and describes a method in which the source node CU/CU-CP determines the location of the UE according to measurement result transmitted by the UE or through measurement of a UE uplink signal by the source node, determines the distance between UE and the candidate target node or candidate Pcell, and determines a possibility for UE to access to the candidate Pcell, thereby determining the state of the candidate Pcell, or alternatively, the source node CU/CU-CP receives the load information of the candidate Pcell or the candidate target node transmitted by the candidate target node, determines the state of the candidate Pcell, and transmits this state information to the candidate target node and/or the UE. By this method, unnecessary network processing overhead caused by data forwarding is reduced, measurements by the UE are reduced, energy for the UE is saved, and efficient utilization of cell resources is also improved.

If the source node/source node CU/source node CU-CP changes the candidate cell state only based on the UE location information, operation 1301 will be executed, and then operations 1305-1311 will be executed.

If the source node/source node CU/source node CU-CP changes the candidate cell state only based on the load state of the candidate cell, operations 1302-1311 will be executed.

Operation 1301: The UE transmits a UE measurement report message to the source node, providing measurement result of candidate cell. According to the measurement result of the candidate cell provided by the UE, the source node determines the current location of the UE from the candidate target cell, estimates a probability for UE to access to the candidate target cell, and determines whether it is needed to change the state of the candidate Pcell. This operation is the same as operation 1001, and will not be detailed here.

With a CU/DU split structure, the load of the candidate target node or the load state of the candidate cell is related to both the load states of the DU and the CU-UP. Therefore, with the CU/DU split structure, the CU/CU-CP of the candidate target node obtains the load state of the DU and/or the CU-UP through operations 1302-1303, and determines the load state of the candidate target node or the cell of the candidate target node.

Operation 1302: The candidate target node DU transmits a first state indication message to the candidate target node CU/CU-CP, for transmitting cell-related information of the load state of candidate target node. This message contains at least one piece of the following information:

Cell Identification Information, which may be a Cell ID or a Global NG-RAN Cell Identity or CGI or another identity, including information of a PLMN Identity and an NR Cell Identity.

Cell Load State Information, which indicates the load state of the Cell. For example, the load state may indicate a level of load, a percentage of load and capacity, and whether it is overloaded or not.

The first state indication message may be a RESOURCE STATUS UPDATE message, a GNB-DU STATUS INDI-CATION message, or another message.

Operation 1303: The candidate target node CU-UP transmits a second state indication message to the candidate target node CU/CU-CP, for transmitting the load information of the CU-UP. This message contains at least one piece of the following information:

Load State Information, indicating the load state of the CU-UP of the candidate target node. For example, the load state may indicate a level of load, a percentage of load and capacity, and whether it is overloaded or not.

The second state indication message may be a GNB-CU-UP STATUS INDICATION message, or another message.

Operation 1304: The candidate target node transmits a load state indication message to the source node, indicating the cell load information of the candidate target node. The source node determines the state of the candidate Pcell of the UE at the candidate target node according to the Cell load state of the candidate target node. This message contains at least one piece of the following information:

Cell List Information, which may be a Cell ID or a Global NG-RAN Cell Identity or CGI or another identity, containing information of a PLMN Identity and a NR Cell Identity.

Cell Load State Information, indicating the load state of the Cell. For example, the load state may indicate a level of load, a percentage of load and capacity, and whether it is overloaded or not.

The message may be a RESOURCE STATUS UPDATE message, or another message.

Operation 1305: The source node determines the state of the candidate Pcell according to the location information of the UE and/or the load state of the candidate target cell or candidate target node, and decides whether it is needed to transmit a message to the UE and/or the candidate target node to indicate the state of the candidate Pcell. This step is the same as operation 1003, and will not be detailed here.

There are two ways for the source node CU/CU-CP to transmit the state indication information of the candidate Pcell to the UE, either through an RRC message or through a MAC CE. If the state indication information of the candidate Pcell is transmitted to the UE through an RRC message, then operation 1306 will be executed. If the state indication information of the candidate PSCell is transmitted to the UE through a MAC CE, then operations 1307 and 1308 will be executed when the MN with the CU/DU split structure.

Operation 1306: The source node transmits a third state indication message to the UE, indicating the state of the candidate Pcell. This message contains at least one piece of the following information:

Candidate Pcell List Information, including identification information of respective candidate Pcells, which may be a conditional configuration identity condReconfigId or a Pcell ID or a CGI or other identification information.

State Indication Information of the Candidate Pcell, indicating the state of the Pcell. According to the state indication information, the UE decides whether it is needed to monitor the candidate Pcell. If this information indicates that the Pcell is in an activated state, the UE needs to perform CHO monitoring on this cell; or if the information indicates that the Pcell is in a deactivated state, the UE is not needed to perform CHO monitoring on this cell.

The third state indication message may be an RRCRecon-figuration message, an RRCConnectionReconfiguration message, or another message.

Operation 1307: The source node CU/CU-CP transmits a fourth state change indication message to the source node DU, indicating the candidate PSCell state. This message contains at least one piece of the following information:

Identification Information of the Candidate PSCell, which may be a conditional configuration identity condReconfigId or a Cell Index or a CGI PSCell ID or a CGI or other identification information.

State Indication Information of the Candidate PSCell, indicating whether the state of the PSCell is activated or deactivated.

The source node DU fills in corresponding information according to the format of the candidate cell state MAC CE.

The fourth state indication message may be a UE CON-TEXT MODIFICATION REQUEST message, or another message.

Operation 1308: The source node DU transmits state indication information to the UE, for transmitting indication information of the candidate Pcell state to the UE. This indication information is transmitted by a MAC CE, and the source node DU fills in corresponding information accord-ing to the format of the candidate cell state MAC CE, and the corresponding information includes:

Candidate Pcell List Information, including identification information of respective candidate PSCells, which may be a conditional configuration identity condReconfigId or a Cell Index or a CGI or other identification information.

State Indication Information of the Candidate Pcell, indi-cating the state of the Pcell. According to the state indication information, the UE decides whether it is needed to monitor the candidate PSCell. If this information indicates that the Pcell is in an activated state, the UE needs to perform CHO monitoring on this cell; or if this information indicates that the Pcell is in a deactivated state, the UE is not needed to perform CHO monitoring on this cell.

The specific structure of the format of the candidate cell state MAC CE is given in FIG. 2E.

Operation 1309: The source node transmits a fifth state indication message to the candidate target node, for trans-mitting changed candidate PCell state indication informa-tion. This step is the same as operation 1005, and will not be detailed here.

Operation 1310: The candidate target node CU/CU-CP transmits a sixth state indication message to the candidate target node DU, providing indication information of the candidate PCell state. This message contains at least one piece of the following information:

Candidate PCell Identification Information, which may be a PCell ID or a CGI or cellIndex or other identification information.

Candidate PCell State Indication Information, indicating the state of the candidate PCell. According to this informa-tion, the candidate target node DU obtains the state of the candidate PCell, and determines whether the reserved resources for the UE may be temporarily allocated to other users. If an activated state is indicated, the candidate target node DU saves the context information and configuration of the UE in this candidate PCell, and the resources reserved for the UE cannot be allocated to other UEs. If a deactivated state is indicated, the candidate target node DU saves the context information and configuration of the UE in this PCell, and the resources reserved for the UE in this candi-date PCell may be temporarily allocated to other users.

The sixth state indication message may be a UE CON-TEXT MODIFICATION REQUEST message, or another message.

Operation 1311: The source node CU/CU-CP transmits an address indication message to the source node CU-UP, for indicating data forwarding address and state indication information. According to the state of the candidate cell, the source node CU/CU-CP indicates to the source node CU-UP whether to perform data forwarding to the address provided by the node to which the candidate cell belongs. This message contains at least one piece of the following infor-mation:

Data Forwarding Address Information, indicating trans-port layer address information for data forwarding, includ-ing IP address and tunnel identity.

Data Forwarding Indication Information, indicating whether the source node CU-UP needs to perform data forwarding to this address. If the indication information is Stop, then the source node CU-UP does not perform data forwarding to this address, or if the indication information is Trigger, the source node CU-UP performs data forwarding to this address.

The address indication message may be a BEARER CONTEXT MODIFICATION REQUEST, or another mes-sage.

Example 12: Process for Indicating Candidate Cell State after PCell Change with CU/DU Split Structure FIG. 14 is a schematic diagram of a process for indicating candidate cell states after a change in PCell with a CU/DU split structure according to an embodiment of the disclosure.

Figure 14:
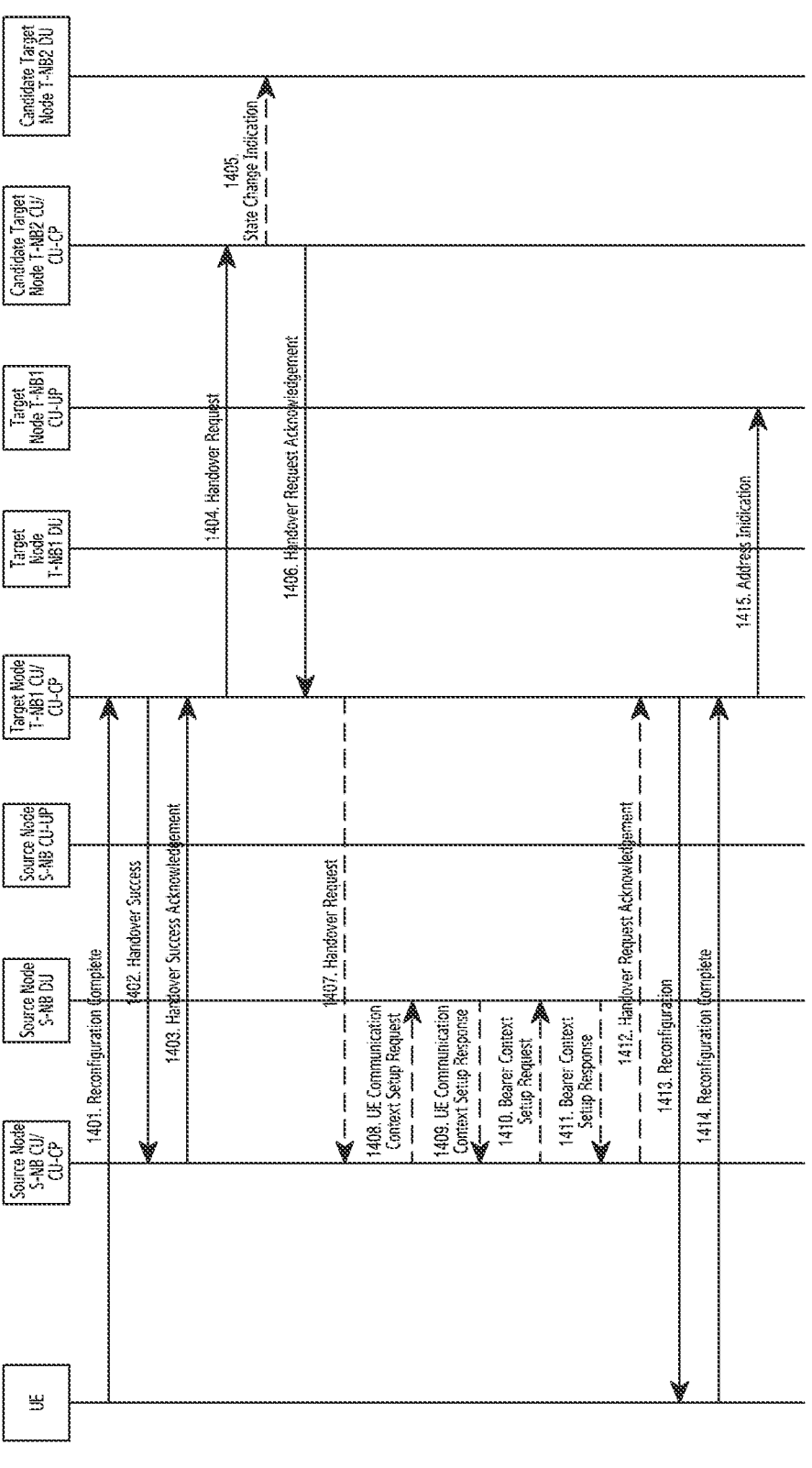
FIG. 14 is a schematic diagram of a process for indicating candidate cell states after a change in PCell with a CU/DU split structure according to an embodiment of the disclosure.

FIG. 14 shows a process for indicating PCell state when a serving PCell change causes a candidate PCell state change with a CU/DU split structure.

The basic idea of this process is the same as that in Example 9. After the CHO execution conditions are fulfilled, and the UE selects a new PCell and transmits a reconfigu-ration complete message to the target node, the target node CU/CU-CP needs to indicate the success of the handover to the source node CU/CU-CP, and obtain the candidate cell information and CHO execution conditions currently con-figured for the UE from the source node. The target node also needs to establish a connection with other candidate target nodes, for subsequent interaction of UE-related infor-mation between nodes, and to indicate that the UE has switched to a new node. If the target node regards the source node as a candidate target node of the UE, the target node CU/CU-CP needs to transmit a handover request to the source node CU/CU-CP, requesting for candidate target PCell for the UE, and requesting the source node to allocate resources for CHO for the UE. At the same time, when the target node receives a path switch request acknowledgement message (PATH SWITCH REQUEST ACKNOWLEDGE) from the core network, it is not needed to transmit a UE context release request message (UE CONTEXT RELEASE) to the source node. If the candidate PCell state is changed, the target node CU/CU-CP also needs to transmit PCell state indication information to the candidate target node CU/CU-CP to which the candidate PCell with state changed belongs. The target node CU/CU-CP also needs to transmit PCell state indication information to the UE. Through this process, unnecessary reconfiguration process-ing and RRC signaling overhead for network equipment and UE are avoided, and at the same time, unnecessary network processing overhead caused by data forwarding is reduced, energy of UE is saved, and efficient utilization of resources is improved.

Example 12 is a process of Example 9 in the CU/DU split mode, with same content and processes of information transmission between nodes, except that in Example 12, the interaction information between nodes CU/CU-CP and DU and CU-UP is further involved.

Operation 1401: The UE transmits a reconfiguration complete message to the target node, indicating that the UE has selected and accessed to the target PCell. This step is the same as operation 1101, and will not be detailed here.

Operations 1402-1403: The target node T-NB1 transmits a handover success message to the source node, indicating that the UE has completed the PCell change and switched to the target node. If the CHO keeping valid mechanism is supported, the source node will transmit information such as the candidate cell information of the UE and CHO execution conditions to the target node. Operations 1402-1403 are the same as operations 1102-1103, and will not be detailed here.

Operations 1404-1406: The target node transmits a handover request message to other candidate target nodes, indicating that the UE has switched to a new node T-NB1, and a connection has been established between T-NB1 and the candidate target node T-NB2 for subsequent interaction of UE-related information between nodes, and indicating whether the CHO keeps valid. Operations 1404 and 1406 are the same as operations 1104a-1104b, and will not be detailed here. The difference is that with the CU/DU split structure, the T-NB2 CU/CU-CP receives that the state of the candidate PCell has changed, and then the T-NB2 CU/CU-CP executes operation 1405, the T-NB2 CU/CU-CP transmits a state indication message to the T-NB2 DU, indicating the state information of the candidate PCell. This message contains at least one piece of the following information:

UE F1AP identity of CU/CU-CP, indicating a UE F1AP identity allocated to the UE by the CU/CU-CP of the candidate target node T-NB2, which may be a gNB-CU UE F1AP ID.

UE F1AP identity of DU, indicating a UE F1AP identity allocated to the UE by the DU of the candidate target node T-NB2, which may be a gNB-DU UE F1AP ID.

Candidate PCell Identification Information, which may be a PSCell ID or a CGI or cellIndex or other identification information.

Candidate PCell State Indication Information, indicating the state of the candidate PCell. According to this information, the T-NB2 DU obtains the state of the candidate PCell and determines whether the resources reserved for the UE may be temporarily allocated to other users. If an activated state is indicated, the T-NB2 DU saves the context information and configuration of the UE in this candidate PCell, and the resources reserved for the UE cannot be allocated to other UEs. If a deactivated state is indicated, the T-NB2 DU saves the context information and configuration of the UE in this PCell, and the resources reserved for the UE in this candidate PCell may be temporarily allocated to other users.

The state indication message may be a UE CONTEXT MODIFICATION REQUEST message, or another message.

If, in operation 1404, the T-NB2 CU/CU-CP receives the target cell identity and/or the data discarding or deleting indication, the T-NB2 CU-CP will further transmit indication information to the T-NB2 CU-UP, indicating the T-NB2 CU-UP to discard or delete the stored UE data. The indication information may be transmitted through a BEARER CONTEXT MODIFICATION REQUEST or other messages.

Operations 1407-1412: When the target node (T-NB1) acts as the new source node of the UE, and the source node (S-NB) acts as the new candidate target node of the UE, then T-NB1 may transmit a handover request message to the S-NB, requesting for candidate target cells for the UE to execute CHO and for providing CG configuration. Operations 1407 and 1412 are the same as operations 1105a-1105b, and will not be detailed here. The difference is that with the CU/DU split structure, operations 1408-1411 need to be executed inside the source node to complete the setup of communication context and bearer context for the UE between the DU and the CU-UP.

Operation 1408: The source node CU/CU-CP transmits a UE communication context setup/modification request message (UE CONTEXT SETUP REQUEST or UE CONTEXT MODIFICATION REQUEST) or another message to the source node DU, indicating the PCell identity for CHO to the source node DU, and instructing the DU to set up communication context and execute CG configuration for the UE, and at the same time indicating the state of the candidate cell to the DU, and instructing the DU to provide the information of the load state of the candidate cell. This message contains at least one piece of the following information:

Candidate PCell information, indicating an identity of the PCell, which may be a PCell ID, a CGI or another identity.

State Indication Information of the Candidate PCell, indicating whether the state of the PCell is activated or deactivated. If an activated state is indicated, the source node DU sets up context information and configuration for the UE in this candidate PCell, and the resources reserved for the UE cannot be allocated to other UEs. If a deactivated state is indicated, the source node DU sets up context information and configuration for the UE in this PCell, and the resources reserved for the UE may be temporarily allocated to other users.

Operation 1409: The source node DU transmits a UE communication context setup/modification response message (UE CONTEXT SETUP RESPONSE or UE CONTEXT MODIFICATION RESPONSE) or another message to the source node CU/CU-CP, for transmitting the CG configuration information for the UE on the candidate PCell and the information of the load state of the candidate PCell. This message contains at least one piece of the following information:

Candidate Cell Information, indicating an identity of the candidate PCell, which may be a PCell ID, a CGI or another identity.

RRC Information from DU to CU, including information such as CG configuration of UE on the candidate PCell, etc.

Information of the load state of Candidate Cell, indicating load state of the candidate PCell. For example, the load state may indicate a level of load, a percentage of load and capacity, and whether it is overloaded or not.

Operation 1410: The source node CU/CU-CP transmits a bearer context setup/modification request message (BEARER CONTEXT SETUP REQUEST or BEARER CONTEXT MODIFICATION REQUEST) to the source node CU-UP, for requesting the source node CU-UP to provide traffic plane configuration, information of forwarding address and the load state of the CU-UP.

Operation 1411: The source node CU/CU-UP transmits a bearer context setup/modification response message (BEARER CONTEXT SETUP RESPONSE or BEARER CONTEXT MODIFICATION RESPONSE) or another message to the source node CU/CU-CP, for transmitting traffic plane configuration, information of data forwarding address and the load state of the CU-UP. This message contains at least one piece of the following information:

Data Forwarding Address Information, indicating transport layer address information for data forwarding, containing an IP address and a tunnel identity.

Load State Information, indicating the load state of the CU-UP. For example, the load state may indicate a level of load, a percentage of load and capacity, and whether it is overloaded or not.

Operations 1413-1414: A process for the target node to transmit CHO configuration information to the UE. Operations 1413-1414 are the same as operations 1106-1107, and will not be detailed here.

If early data forwarding is supported, after determining the state of the candidate cell, according to the state of the candidate cell, the target node T-NB1 determines the candidate target node for which data forwarding needs to be performed. If the candidate cell state is an activated state, the target node performs data forwarding to the candidate target node to which this candidate cell belongs; or if the candidate cell state is a deactivated state, the target node is not needed to perform data forwarding to the candidate target node to which this candidate cell belongs. Therefore, in the CU/DU split mode, operation 1415 is further needed, where the target node CU/CU-CP transmits an address indication message to the target node CU-UP, indicating data forwarding address and state indication information. This message contains at least one piece of the following information:

UE E1AP identity of CU/CU-CP, indicating a UE E1AP identity allocated to the UE by the CU/CU-CP of the target node T-NB1, which may be a gNB-CU-CP UE E1AP.

UE E1AP identity of CU-UP, indicating a UE E1AP identity allocated to the UE by the CU-UP of the target node T-NB1, which may be a gNB-CU-UP UE E1AP ID.

Data Forwarding Address Information, indicating transport layer address information for data forwarding, containing an IP address and a tunnel identity.

Data Forwarding Indication Information, indicating whether the target node CU-UP needs to perform data forwarding to this address. If this indication information is Stop, then the target node CU-UP does not perform data forwarding to this address, or if this indication information is Trigger, the target node CU-UP performs data forwarding to this address.

The address indication message may be a BEARER CONTEXT MODIFICATION REQUEST message, or another message.

Figure 15:
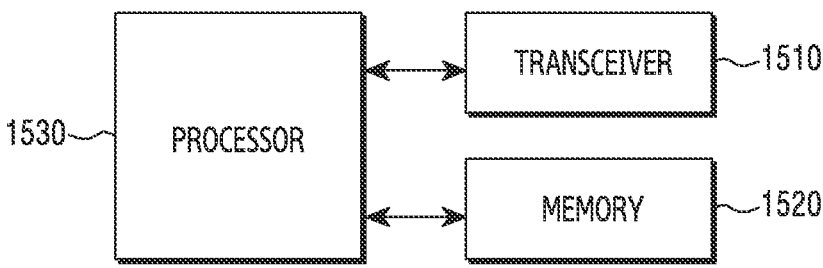
FIG. 15 illustrates various hardware components of a network entity, according to an embodiment of the disclosure.

FIG. 15 illustrates various hardware components of a network entity, according to an embodiment of the disclosure.

Referring to FIG. 15, the network entity includes a transceiver (1510), a memory (1520), and a processor (1530). The transceiver (1510), the memory (1520), and the processor (1530) of the network entity may operate according to a communication method of the network entity described above. However, the components of the terminal are not limited thereto. For example, the network entity may include fewer or a greater number of components than those described above. However, the components of the network entity are not limited thereto. For example, the network entity may include more or fewer components than those described above. In addition, the processor (1530), the transceiver (1510), and the memory (1520) may be implemented as a single chip. Also, the processor (1530) may include at least one processor.

In an embodiment, the network entity includes at least one entity of a core network. For example, the network entity includes an AMF, a session management function (SMF), a policy control function (PCF), a network repository function (NRF), a user plane function (UPF), a network slicing selection function (NSSF), an authentication server function (AUSF), a UDM and a network exposure function (NEF), but the network entity is not limited thereto.

The transceiver (1510) collectively refers to a network entity receiver and a network entity transmitter, and may transmit/receive a signal to/from a base station or a UE. The signal transmitted or received to or from the base station or the UE may include control information and data. In this regard, the transceiver (1510) may include an RF transmitter for up-converting and amplifying a frequency of a transmitted signal, and an RF receiver for amplifying low-noise and down-converting a frequency of a received signal. However, this is only an example of the transceiver (1510) and components of the transceiver (1510) are not limited to the RF transmitter and the RF receiver.

In an embodiment, the transceiver (1510) may receive and output, to the processor (1530), a signal through a wireless channel, and transmit a signal output from the processor (1530) through the wireless channel.

The memory (1520) may store a program and data required for operations of the network entity. Also, the memory (1520) may store control information or data included in a signal obtained by the network entity. The memory (1520) may be a storage medium, such as a read-only memory (ROM), a random access memory (RAM), a hard disk, a compact disc-ROM (CD-ROM), and a digital versatile disc (DVD), or a combination of storage media.

In an embodiment, the processor (1530) may control a series of processes such that the network entity operates as described above. For example, the transceiver (1510) may receive a data signal including a control signal, and the processor (1530) may determine a result of receiving the data signal.

Figure 16:
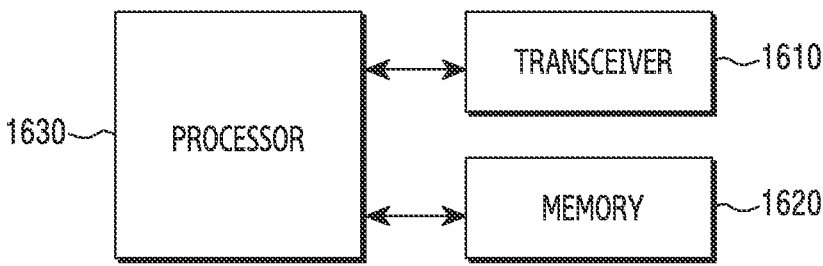
FIG. 16 illustrates various hardware components of a user equipment (UE), according to an embodiment of the disclosure.

FIG. 16 illustrates a structure of a base station according to an embodiment of the disclosure.

Referring to FIG. 16, the base station according to an embodiment may include a transceiver 1610, a memory 1620, and a processor 1630. The transceiver 1610, the memory 1620, and the processor 1630 of the base station may operate according to a communication method of the base station described above. However, the components of the base station are not limited thereto. For example, the base station may include more or fewer components than those described above. In addition, the processor 1630, the transceiver 1610, and the memory 1620 may be implemented as a single chip. Also, the processor 1630 may include at least one processor. Furthermore, the base station of FIG. 16 corresponds to the base station included in the NG-RAN 202 of the FIG. 2A.

The transceiver 1610 collectively refers to a base station receiver and a base station transmitter, and may transmit/receive a signal to/from a terminal (UE) or a network entity. The signal transmitted or received to or from the terminal or a network entity may include control information and data. The transceiver 1610 may include a RF transmitter for up-converting and amplifying a frequency of a transmitted signal, and a RF receiver for amplifying low-noise and down-converting a frequency of a received signal. However, this is only an example of the transceiver 1610 and components of the transceiver 1610 are not limited to the RF transmitter and the RF receiver.

The transceiver 1610 may receive and output, to the processor 1630, a signal through a wireless channel, and transmit a signal output from the processor 1630 through the wireless channel.

The memory 1620 may store a program and data required for operations of the base station. Also, the memory 1620 may store control information or data included in a signal obtained by the base station. The memory 1620 may be a storage medium, such as read-only memory (ROM), random access memory (RAM), a hard disk, a CD-ROM, and a DVD, or a combination of storage media.

The processor 1630 may control a series of processes such that the base station operates as described above. For example, the transceiver 1610 may receive a data signal including a control signal transmitted by the terminal, and the processor 1630 may determine a result of receiving the control signal and the data signal transmitted by the terminal.

Figure 17:
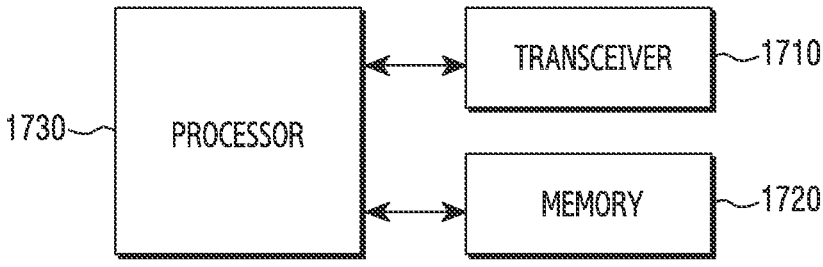
FIG. 17 illustrates various hardware components of a base station according to an embodiment of the disclosure.

FIG. 17 illustrates a structure of a UE according to an embodiment of the disclosure.

Referring to FIG. 17, the UE according to an embodiment may include a transceiver 1710, a memory 1720, and a processor 1730. The transceiver 1710, the memory 1720, and the processor 1730 of the UE may operate according to a communication method of the UE described above. However, the components of the UE are not limited thereto. For example, the UE may include more or fewer components than those described above. In addition, the processor 1730, the transceiver 1710, and the memory 1720 may be implemented as a single chip. Also, the processor 1730 may include at least one processor. Furthermore, the UE of FIG. 17 corresponds to the UE 201 of the FIG. 2A.

In an embodiment, the transceiver 1710 collectively refers to a UE receiver and a UE transmitter, and may transmit/receive a signal to/from a base station or a network entity. The signal transmitted or received to or from the base station or a network entity may include control information and data. The transceiver 1710 may include a RF transmitter for up-converting and amplifying a frequency of a transmitted signal, and a RF receiver for amplifying low-noise and down-converting a frequency of a received signal. However, this is only an example of the transceiver 1710 and components of the transceiver 1710 are not limited to the RF transmitter and the RF receiver.

Also, the transceiver 1710 may receive and output, to the processor 1730, a signal through a wireless channel, and transmit a signal output from the processor 1730 through the wireless channel.

The memory 1720 may store a program and data required for operations of the UE. Also, the memory 1720 may store control information or data included in a signal obtained by the UE. The memory 1720 may be a storage medium, such as read-only memory (ROM), random access memory (RAM), a hard disk, a CD-ROM, and a DVD, or a combination of storage media.

In an embodiment, the processor 1730 may control a series of processes such that the UE operates as described above. For example, the transceiver 1710 may receive a data signal including a control signal transmitted by the base station or the network entity, and the processor 1730 may determine a result of receiving the control signal and the data signal transmitted by the base station or the network entity.

Those skilled in the art will understand that the various illustrative logical blocks, modules, circuits, and steps described in this application may be implemented as hardware, software, or a combination of both. To clearly illustrate this interchangeability between hardware and software, various illustrative components, blocks, modules, circuits, and steps are generally described above in the form of their functional sets. Whether such function sets are implemented as hardware or software depends on the specific application and the design constraints imposed on the overall system. Technicians may implement the described functional sets in different ways for each specific application, but such design decisions should not be interpreted as causing a departure from the scope of this application.

In the above-described embodiments of the disclosure, all operations and messages may be selectively performed or may be omitted. In addition, the operations in each embodiment do not need to be performed sequentially, and the order of operations may vary. Messages do not need to be transmitted in order, and the transmission order of messages may change. Each operation and transfer of each message may be performed independently.

Although the figures illustrate different examples of user equipment, various changes may be made to the figures. For example, the user equipment may include any number of each component in any suitable arrangement. In general, the figures do not limit the scope of this disclosure to any particular configuration(s). Moreover, while figures illustrate operational environments in which various user equipment features disclosed in this patent document may be used, these features may be used in any other suitable system.

The various illustrative logic blocks, modules, and circuits described in this application may be implemented or performed by a general purpose processor, a Digital Signal Processor (DSP), an Application Specific Integrated Circuit (ASIC), a Field Programmable Gate Array (FPGA) or other programmable logic devices, discrete gates or transistor logics, discrete hardware components, or any combination thereof designed to perform the functions described herein. The general purpose processor may be a microprocessor, but in an alternative, the processor may be any conventional processor, controller, microcontroller, or state machine. The processor may also be implemented as a combination of computing devices, such as a combination of a DSP and a microprocessor, a plurality of microprocessors, one or more microprocessors cooperating with a DSP core, or any other such configuration.

The steps of the method or algorithm described in this application may be embodied directly in hardware, in a software module executed by a processor, or in a combination thereof. The software module may reside in RAM memory, flash memory, ROM memory, erasable programmable ROM (EPROM) memory, electrically erasable programmable ROM (EEPROM) memory, register, hard disk, removable disk, or any other form of storage medium known in the art. A storage medium is coupled to a processor to enable the processor to read and write information from/to the storage media. In an alternative, the storage medium may be integrated into the processor. The processor and the storage medium may reside in an ASIC. The ASIC may reside in a user terminal. In an alternative, the processor and the storage medium may reside in the user terminal as discrete components.

In one or more designs, the functions may be implemented in hardware, software, firmware, or any combination thereof. If implemented in software, each function may be stored as one or more pieces of instructions or codes on a computer-readable medium or delivered through it. The computer-readable medium includes both a computer storage medium and a communication medium, the latter including any medium that facilitates the transfer of computer programs from one place to another. The storage medium may be any available medium that may be accessed by a general purpose or special purpose computer.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a first node in a wireless communication system, the method comprising:

transmitting, to a user equipment (UE), a first message indicating that a conditional primary secondary cell group (SCG) cell (PSCell) addition or change (CPAC) configuration or a conditional handover (CHO) configuration keeps valid for re-initiating a CPAC or a CHO;

receiving, from the UE, a second message including a measurement result for a second node including identification information of the second node based on the first message, wherein measurement result includes information that whether the second node meets an execution condition for the CPAC or the CHO;

identifying to maintain information on the second node and the execution condition for the CPAC or the CHO based on the second message; and in response to identifying to maintain the information on the second node and the execution condition, transmitting, to the second node, a third message indicating that the CPCA configuration or the CHO configuration keeps valid, wherein the first node is a master node (MN) or a source node for the UE, and wherein the second node is a candidate target node configured by a network for the UE.

2. The method of claim 1, wherein the second message is transmitted after the second node is added to a set or list of candidate nodes.

3. The method of claim 1, wherein the third message is transmitted after the UE is switched to the second node or radio resource control (RRC) reconfiguration complete message received from the UE.

4. The method of claim 1, further comprising:

transmitting, to the second node, a fourth message including a secondary node (SN) addition request or a handover request with the second message.

5. The method of claim 1, further comprising:

transmitting, to the UE, a fifth message indicating at least one candidate cell state of the second node; and transmitting, to the second node, sixth message indicating the at least one candidate cell state of the second node.

6. The method of claim 1, further comprising:

transmitting, to a third node, a seventh message indicating that whether the third node needs to perform data forwarding, wherein the third node is a source SN (S-SN).

7. The method of claim 1, further comprising:

transmitting, to a fourth node, an eighth message indicating a delete stored UE context information, wherein the fourth node includes at least one candidate node.

8. A method performed by a user equipment (UE) in a wireless communication system, the method comprising:

receiving, from a first node, a first message indicating that a conditional primary secondary cell group (SCG) cell (PSCell) addition or change (CPAC) configuration or a conditional handover (CHO) configuration keeps valid for re-initiating a CPAC or a CHO;

identifying whether a second node meets an execution condition for the CPAC or the CHO;

transmitting, to the first node, a second message including a measurement result for a second node including identification information of the second node based on the first message; and keeping the CPAC configuration or the CHO configuration based on the first information, after connecting to the second node, wherein whether to maintain information on the second node and the execution condition for the CPAC or the CHO in the first node is based on the second message, wherein the first node is a master node (MN) or a source node for the UE, and wherein the second node is a candidate target node configured by a network for the UE.

9. The method of claim 8, further comprising:

receiving, from the first node, candidate cell information associated with a set of candidate nodes after all candidate nodes are added to the set or list of candidate nodes.

10. A first node comprising:

at least one transceiver;

at least one processor communicatively coupled to the at least one transceiver; and at least one memory, communicatively coupled to the at least one processor, storing instructions executable by the at least one processor individually or in any combination to, cause the first node to:

transmit, to a user equipment (UE), a first message indicating that a conditional primary secondary cell group (SCG) cell (PSCell) addition or change (CPAC) configuration or a conditional handover (CHO) configuration keeps valid for re-initiating a CPAC or a CHO, receive, from the UE, a second message including a measurement result for a second node including identification information of the second node based on the first message, wherein measurement result includes information that whether the second node meets an execution condition for the CPAC or the CHO, identify to maintain information on the second node and the execution condition for the CPAC or the CHO based on the second message, and in response to identifying to maintain the information on the second node and the execution condition, transmit, to the second node, a third message indicating that the CPCA configuration or the CHO configuration keeps valid, wherein the first node is a master node (MN) or a source node for the UE, and wherein the second node is a candidate target node configured by a network for the UE.

11. The first node of claim 10, wherein the second message is transmitted after the second node is added to a set or list of candidate nodes.

12. The first node of claim 10, wherein the third message is transmitted after the UE is switched to the second node or a radio resource control (RRC) reconfiguration complete message received from the UE.

13. The first node of claim 10, wherein the instructions further cause the first node to:

transmit, to the second node, a fourth message including a secondary node (SN) addition request or a handover request with the second message.

14. The first node of claim 10, wherein the instructions further cause the first node to:

transmit, to the UE, a fifth message indicating at least one candidate cell state of the second node, and transmit, to the second node, sixth message indicating the at least one candidate cell state of the second node.

15. The first node of claim 10, wherein the instructions further cause the first node to:

transmit, to a third node, a seventh message indicating that whether the third node needs to perform data forwarding, and wherein the third node is a source SN (S-SN).

16. The first node of claim 10, wherein the instructions further cause the first node to:

transmit, to a fourth node, an eighth message indicating a delete stored UE context information, and wherein the fourth node includes at least one candidate node.

17. A user equipment (UE) comprising:

at least one transceiver;

at least one processor communicatively coupled to the at least one transceiver; and at least one memory, communicatively coupled to the at least one processor, storing instructions;

executable by the at least one processor individually or in any combination to, cause the UE to:

receive, from a first node, a first message indicating that a conditional primary secondary cell group (SCG) cell (PSCell) addition or change (CPAC) configuration or a conditional handover (CHO) configuration keeps valid for re-initiating a CPAC or a CHO, identify whether a second node meets an execution condition for the CPAC or the CHO, transmit, to the first node, a second message including a measurement result for a second node including identification information of the second node based on the first message, and keep the CPAC configuration or the CHO configuration based on the first information, after connecting to the second node, wherein whether to maintain information on the second node and the execution condition for the CPAC or the CHO in the first node is based on the second message, wherein the first node is a master node (MN) or a source node for the UE, and wherein the second node is a candidate target node configured by a network for the UE.

18. The UE of claim 17, wherein the instructions further cause the UE to:

receive, from the first node, candidate cell information associated with a set of candidate nodes after all candidate nodes are added to the set or list of candidate nodes.

* * * * *